US006008598A

United States Patent [19]

Luff et al.

[11] Patent Number: 6,008,598

[45] Date of Patent: Dec. 28, 1999

[54] HAND-HELD CONTROLLER FOR BED AND MATTRESS ASSEMBLY

[75] Inventors: Lawrence E. Luff, Batesville; Ryan A. Reeder, Brookville, both of Ind.

[73] Assignee: PaTMarK Company, Inc., Wilmington, Del.

[21] Appl. No.: 09/064,472

[22] Filed: Apr. 22, 1998

[51] Int. Cl.[6] .............................. G09G 3/20; H04B 3/60; A47C 27/10

[52] U.S. Cl. ...................................... 318/16; 5/618; 5/713

[58] Field of Search .................................. 318/16; 5/600, 5/612, 613, 616, 658, 935, 713, 618

[56] References Cited

U.S. PATENT DOCUMENTS

| | | |
|---|---|---|
| D. 363,552 | 10/1995 | Teo et al. . |
| 3,137,773 | 6/1964 | Black . |
| 3,644,946 | 2/1972 | Swatt . |
| 3,711,664 | 1/1973 | Benolt et al. . |
| 3,716,876 | 2/1973 | Petzon et al. . |
| 3,781,927 | 1/1974 | Zakaras . |
| 3,846,857 | 11/1974 | Weinstock . |
| 3,865,430 | 2/1975 | Tanus . |
| 3,872,526 | 3/1975 | Betts . |
| 3,913,153 | 10/1975 | Adams et al. . |
| 3,923,300 | 12/1975 | Tanus . |
| 3,932,903 | 1/1976 | Adams et al. . |
| 3,972,081 | 8/1976 | Stern et al. . |
| 4,014,344 | 3/1977 | Gutierrez et al. . |
| 4,044,286 | 8/1977 | Adams et al. . |
| 4,062,075 | 12/1977 | Stern et al. . |
| 4,211,998 | 7/1980 | Junginger et al. . |
| 4,218,681 | 8/1980 | Hörmann . |
| 4,231,019 | 10/1980 | Junginger et al. . |
| 4,232,901 | 11/1980 | Harrington et al. . |
| 4,294,048 | 10/1981 | Sutter . |
| 4,435,862 | 3/1984 | King et al. . |
| 4,639,959 | 2/1987 | Roca . |
| 4,680,790 | 7/1987 | Packard et al. . |
| 4,712,105 | 12/1987 | Köhler . |
| 4,745,647 | 5/1988 | Goodwin . |

(List continued on next page.)

FOREIGN PATENT DOCUMENTS

| | | |
|---|---|---|
| 0 178 951 | 4/1986 | European Pat. Off. . |
| 0 220 708 | 5/1987 | European Pat. Off. . |
| 0 228 233 | 7/1987 | European Pat. Off. . |
| 0 261 830 | 3/1988 | European Pat. Off. . |
| 0 302 579 | 2/1989 | European Pat. Off. . |
| 0 316 643 | 5/1989 | European Pat. Off. . |
| 0 341 358 | 11/1989 | European Pat. Off. . |
| 0 341 570 | 11/1989 | European Pat. Off. . |
| 0 348 726 | 1/1990 | European Pat. Off. . |
| 0 373 912 | 6/1990 | European Pat. Off. . |
| 0 453 363 | 10/1991 | European Pat. Off. . |
| 0 455 852 | 11/1991 | European Pat. Off. . |
| 0 488 552 | 6/1992 | European Pat. Off. . |
| 0 505 847 | 9/1992 | European Pat. Off. . |
| 0 505312 | 9/1992 | European Pat. Off. . |
| 26 30 334 | 12/1978 | Germany . |
| 31 19876 | 12/1982 | Germany . |
| 3109166 | 1/1983 | Germany . |
| 54-45472 | 4/1979 | Japan . |
| 54-45473 | 4/1979 | Japan . |
| 4-322611 | 11/1992 | Japan . |

(List continued on next page.)

*Primary Examiner*—Bentsu Ro

*Attorney, Agent, or Firm*—Barnes & Thornburg

[57] ABSTRACT

A hand-held controller is provided for controlling at least one function of a bed and mattress assembly. The hand-held controller includes a button engageable to control the at least one function of the bed and mattress assembly, and a display configured to provide feedback to a user regarding the at least one function. The display simultaneously displays a graphical image and numerical data when the button is engaged.

51 Claims, 45 Drawing Sheets

U.S. PATENT DOCUMENTS

| | | | |
|---|---|---|---|
| 4,769,584 | 9/1988 | Irigoyen et al. . | |
| 4,787,104 | 11/1988 | Grantham . | |
| 4,798,197 | 1/1989 | Nippoldt et al. . | |
| 4,825,200 | 4/1989 | Evans et al. . | |
| 4,850,040 | 7/1989 | Teich et al. . | |
| 4,999,622 | 3/1991 | Amano et al. . | |
| 5,044,029 | 9/1991 | Vrzalik . | |
| 5,053,636 | 10/1991 | Zelina . | |
| 5,058,871 | 10/1991 | Congin et al. . | |
| 5,062,167 | 11/1991 | Thomas et al. . | |
| 5,063,623 | 11/1991 | Bathrick et al. . | |
| 5,063,624 | 11/1991 | Smith et al. . | |
| 5,072,463 | 12/1991 | Willis . | |
| 5,073,999 | 12/1991 | Thomas et al. . | |
| 5,098,089 | 3/1992 | Harrington et al. . | |
| 5,107,554 | 4/1992 | Garakani . | |
| 5,239,300 | 8/1993 | Berger et al. . | |
| 5,437,608 | 8/1995 | Cutler | 601/49 |
| 5,509,154 | 4/1996 | Shafer et al. . | |
| 5,540,651 | 7/1996 | Risch et al. | 601/148 |
| 5,544,376 | 8/1996 | Fromson . | |
| 5,627,531 | 5/1997 | Posso et al. | 341/22 |
| 5,627,584 | 5/1997 | Nishikori et al. . | |
| 5,652,484 | 7/1997 | Shafer et al. . | |
| 5,678,568 | 10/1997 | Uchikubo et al. . | |
| 5,682,631 | 11/1997 | Weismiller et al. . | |
| 5,771,511 | 6/1998 | Kummer et al. | 5/600 |

FOREIGN PATENT DOCUMENTS

| | | |
|---|---|---|
| 5-095978 | 4/1993 | Japan . |
| 675936 | 11/1990 | Netherlands . |
| 8902202 | 3/1991 | Netherlands . |
| 1 404 038 | 8/1975 | United Kingdom . |
| 2 210 554 | 6/1989 | United Kingdom . |
| WO/06739 | 6/1990 | WIPO . |

HAND-HELD CONTROLLER FOR BED AND MATTRESS ASSEMBLY

BACKGROUND AND SUMMARY OF THE INVENTION

The present invention relates to a hand-held controller, and particularly to a hand-held controller for a bed and mattress assembly. More particularly the present invention relates to a hand-held controller having buttons that are pressed to control one or more functions of the bed and mattress assembly.

Beds including hand-held controllers that are used to control functions of the bed, such as, articulation of bed frame sections, vibration of bed frame sections, and inflation of air bladders included in a mattress of the bed, are known. Signals are either sent along wires or are transmitted remotely between the hand-held controller and a control box of the bed that is spaced apart from the hand-held controller. Typical hand-held controllers are provided with a plurality of buttons that are pressed to control different functions of the bed. Some hand-held controllers, such as that shown, for example, in U.S. Pat. No. 5,509,154, provide numerical feedback to a user.

According to the present invention, a hand-held controller is provided for controlling at least one function of a bed and mattress assembly to which the hand-held controller is coupled electrically. The hand-held controller includes a button that is engageable to control the at least one function of the bed and mattress assembly. The hand-held controller further includes a display that is configured to provide feedback to a user regarding the at least one function. The display simultaneously displays a graphical image and numerical data when the button is engaged.

In preferred embodiments, the hand-held controller includes a plurality of buttons and the display enables a user to view various screens having various images and data when the user presses a respective button that corresponds with an associated function of the bed and mattress assembly. Also in preferred embodiments, the display defaults to a clock showing a time-of-day when none of the plurality of buttons are pressed. In addition, some of the plurality of buttons permit the user to program a selected function of the bed and mattress assembly to occur at a programmed time.

Additional features and advantages of the present invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 6 is a front view of the display screen of the hand-held controller of FIG. 1 showing a first scene of the display screen including an articulating section icon, first and second bar graphs adjacent to opposite ends of the articulating section icon, a pair of down arrows indicating that the respective bed frame sections are being lowered, and a pair of numbers that correlate to angular positions of the respective bed frame sections and also showing mode indicators that are spaced so as to vertically align with the mode indicia of the hand-held controller;

FIG. 7 is a front view of the display screen similar to FIG. 6 showing the bar graphs and numerical values displaying lower relative elevations of the respective bed frame sections than those displayed in FIG. 6 and showing the pair of down arrows indicating that the respective bed frame sections are being lowered;

FIG. 8 is a front view of the display screen similar to FIG. 6 showing the bar graphs and numerical values displaying elevations of the respective bed frame sections that are equal to those displayed in FIG. 6 and showing a pair of up arrows indicating that the respective bed frame sections are being raised;

FIG. 9 is a front view of the display screen similar to FIG. 7 showing the bar graphs and numerical values displaying elevations of the respective bed frame sections that are equal to those displayed in FIG. 6 and showing the up arrows indicating that the respective bed frame sections are being raised;

FIG. 16 is a front view of the display screen of the hand-held controller of FIG. 1 showing a second scene of the display screen including a triangular head-end graph, a head-end massage intensity number, a triangular foot-end graph, and a foot-end massage intensity number;

FIG. 17 is a front view of the display screen similar to FIG. 16 showing that the head-end and foot-end massage intensities are less than those displayed in FIG. 16;

FIG. 18 is a front view of the display screen similar to FIG. 16 showing that the head-end massage intensity is greater than that of FIG. 17 but less than that of FIG. 16 and showing that the foot-end massage intensity is equal to that of FIG. 16;

FIG. 24 is a front view of the display screen of the hand-held controller of FIG. 1 showing a third scene of the display screen including a triangular head-end graph, a head-end massage intensity number, a triangular foot-end graph, a foot-end massage intensity number, the word "wave" between the graphs, and a wave speed number above the word "wave" between the graphs;

FIG. 25 is a front view of the display screen similar to FIG. 24 showing that the head-end and foot-end massage intensities are less than those displayed in FIG. 24 and showing that the wave speed is slower than that of FIG. 24;

FIG. 26 is a front view of the display screen similar to FIG. 24 showing that the head-end massage intensity is greater than that of FIG. 25 but less than that of FIG. 24, showing that the foot-end massage intensity is equal to that of FIG. 24, and showing that the wave speed is equal to that of FIG. 25;

DETAILED DESCRIPTION OF THE DRAWINGS

Figure 1:
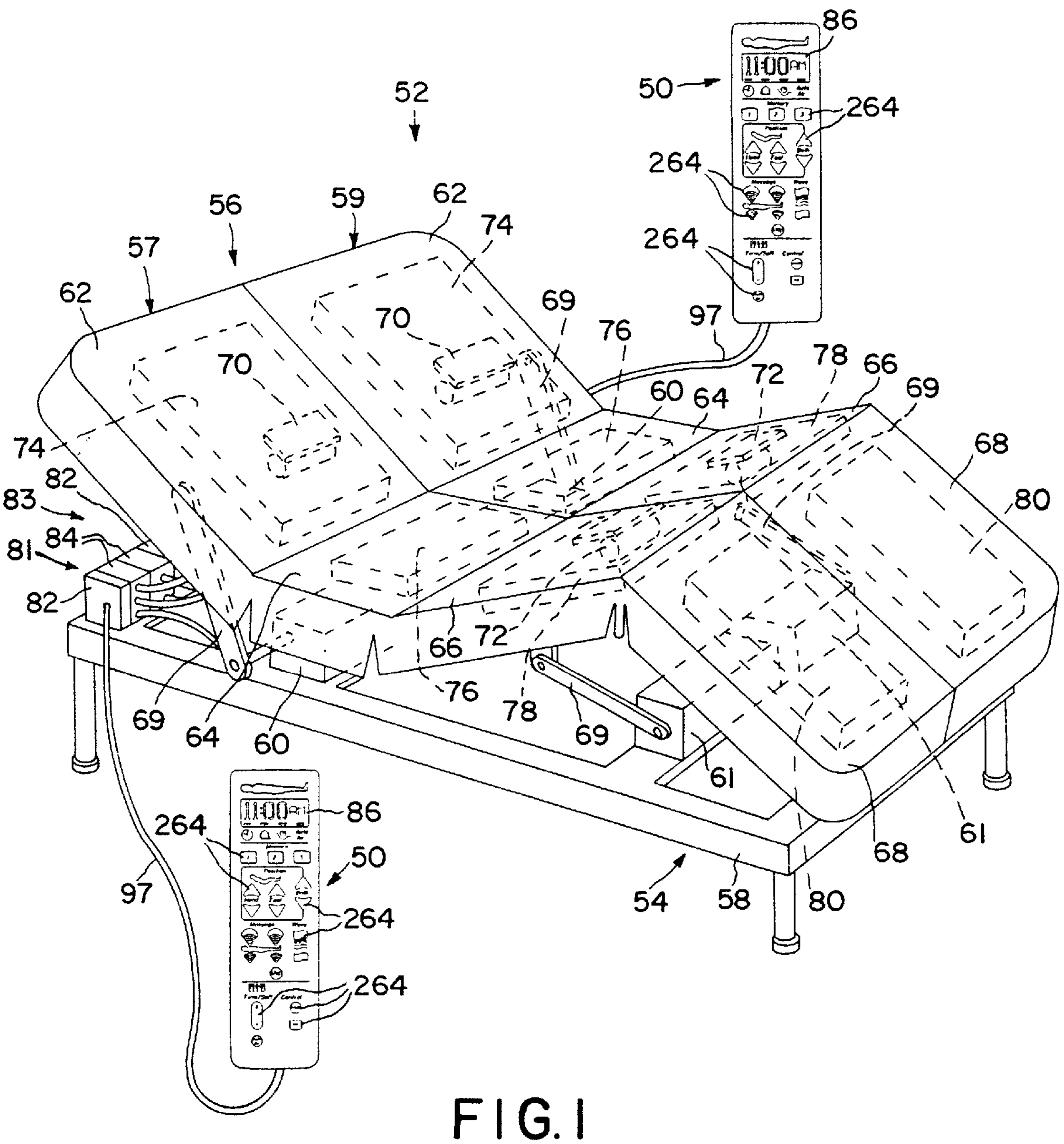
FIG. 1 is a diagrammatic view of a king-size bed and mattress assembly showing a bed frame having articulating sections, a set of actuators for articulating the bed frame sections, a set of massage motors for vibrating the bed frame sections, a mattress supported by the bed frame and having first and second sets of inflatable bladders, and a pair of hand-held controllers in accordance with the present invention coupled to a control system to control articulation and vibration of the bed frame sections and to control inflation and deflation of the respective sets of air bladders.

A pair of hand-held controllers 50 in accordance with the present invention are used to control various functions of a bed and mattress assembly 52 which is shown diagrammatically in FIG. 1 as a king-size bed. Bed and mattress assembly 52 includes a frame 54 and a mattress 56 supported by frame 54. Frame 54 includes a floor-supported base 58, shown in FIG. 1, and a pair of side-by-side articulating decks 90, each having head, seat, thigh, and foot frame sections 91, 92, 93, 94 as shown diagrammatically in FIG. 1*a*. Mattress 56 includes a right-side half 57 supported by one of articulating decks 90 and a left-side half 59 supported by the other of articulating decks 90.

Bed and mattress assembly 52 includes a respective pair of first and second articulation actuators or motors 60, 61 that operate to articulate the associated frame sections 91, 92, 93, 94 relative to base frame 58 to adjust the position of right-side and left-side halves 57, 59 of mattress 56. Motors 60, 61 associated with right-side half 57 are operable independently of motors 60, 61 associated with left-side half 59 so that right-side half 57 articulates independently of left-side half 59. Thus, the articulating decks 90 of frame 54 cooperate with mattress 56 to provide bed and mattress assembly 50 with a pair of side-by-side head, seat, thigh, and foot sections 62, 64, 66, 68, respectively as shown in FIG. 1.

Motors 60, 61 are shown diagrammatically in FIG. 1 as being connected to the pair of articulating decks by a set of links 69. However, it will be understood by those skilled in the art that many different types of mechanical mechanisms and force-transmission elements may be used to articulate sections of a bed frame and thus, each of the mechanical connections between motors 60, 61 and respective frame sections 91, 93 is shown diagrammatically in FIG. 1*a* as a dotted line.

Bed and mattress assembly 52 further includes a pair of head-end massage motors 70 coupled to respective head sections 62 and a pair of foot-end massage motors 72 coupled to respective thigh sections 66. Massage motors 70, 72 each include an eccentric weight (not shown), the rotation of which vibrates the associated head section 62 and thigh section 66, respectively. The speed at which the eccentric weight rotates determines the intensity of the vibration. Motors 70, 72 are operated simultaneously when in a massage mode and are operated alternately when in a wave mode. In addition, motors 70, 72 associated with right-side half 57 are operable independently of motors 70, 72 associated with left-side half 59. Although illustrative motors 70, 72 are mounted directly to respective frame sections 91, 93, it within the scope of the invention as presently perceived for massage motors 70, 72 to transmit vibrations to frame sections 91, 93 through alternative mechanisms (not shown) and thus, each of the mechanical connections between motors 70, 72 and respective frame sections 91, 93 is shown diagrammatically in FIG. 1 a as dotted line.

Figure 1A:
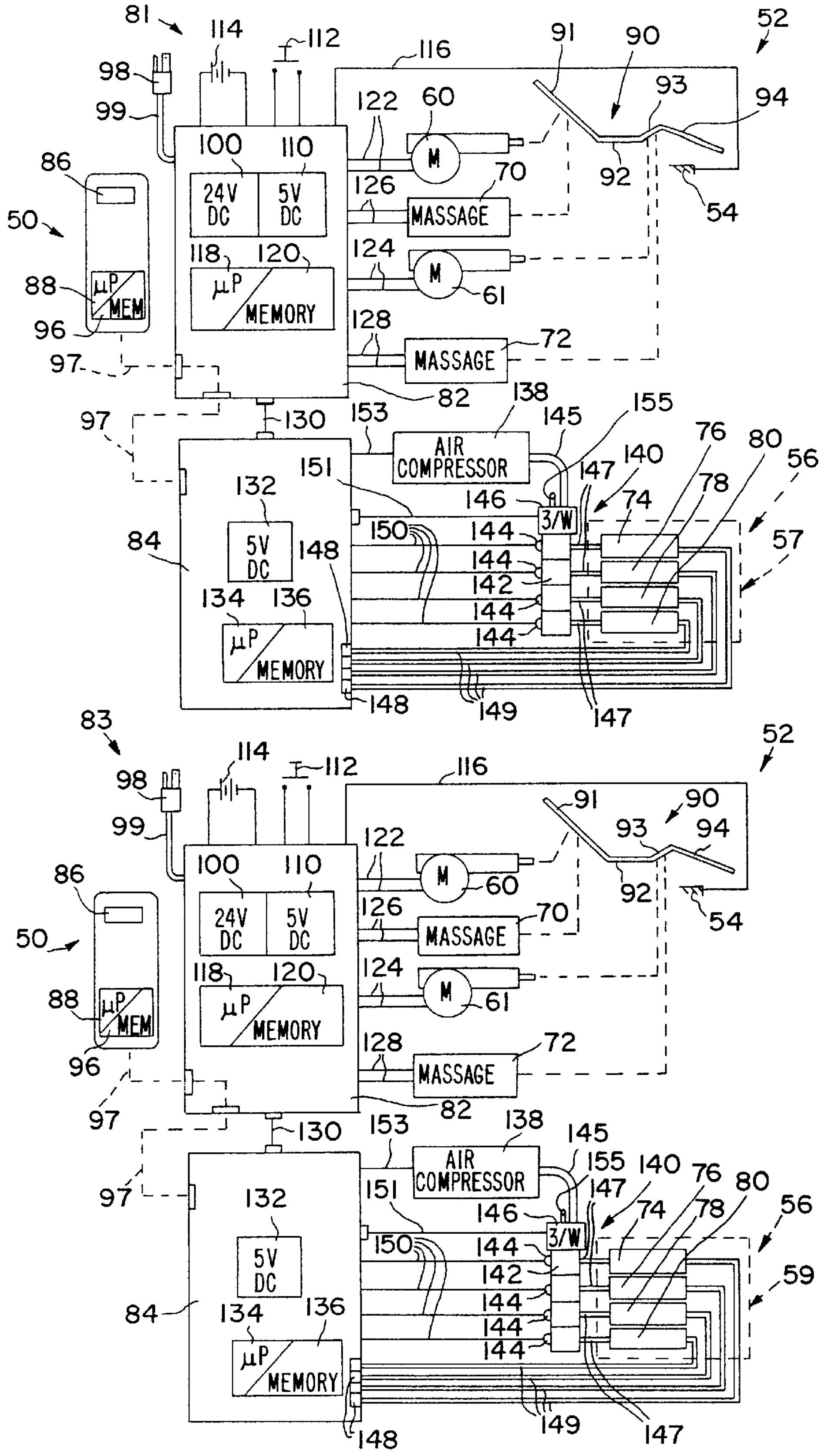
FIG. 1*a* is a block diagram of the king-size bed and mattress assembly of FIG. 1 showing each of the hand-held controllers including a microprocessor and memory, each of the hand-held controllers being coupled to a respective frame control box of the control system, each frame control box being coupled electrically to respective actuators and massage motors, each hand-held controller being coupled through the respective frame control box to a respective air control box, and each air control box including an air compressor for pumping air through a respective manifold and valve assembly into the associated air bladders.

Right-side half 57 and left-side half 59 of mattress 56 each include respective head, seat, thigh, and foot air bladders 74, 76, 78, 80 as shown in FIGS. 1 and 1*a* (shown in phantom in FIG. 1). Each of air bladders 74, 76, 78, 80 is separately inflatable and deflatable to control the firmness and support characteristics of the associated mattress section 62, 64, 66, 68. Mattress 56 further includes foam elements (not shown) that surround one or more sides of air bladders 74, 76, 78, 80. However, it is within the scope of the invention as presently perceived for mattresses with only air bladders or with air bladders and supporting structures other than foam elements to be included in bed and mattress assembly 52 instead of mattress 56.

Bed and mattress assembly 52 includes a first control system 81 to which one of hand-held controllers 50 is coupled to control articulation and vibration of the articulating deck 90 associated with right-side half 57 and to control inflation and deflation of air bladders 74, 76, 78, 80 associated with right-side half 57 as shown best in FIG. 1*a*. In addition, bed and mattress assembly 52 includes a second control system 83 to which the other of hand-held controllers 50 is coupled to control articulation and vibration of the articulating deck 90 associated with left-side half 59 and to control inflation and deflation of air bladders 74, 76, 78, 80 associated with left-side half 59 as also shown in FIG. 1*a*. Control system 81 and the operation of control system 81 is substantially the same as control system 83 and the operation of control system 83. Thus, the description below of control system 81 and the operation of control system 81 applies as well to control system 83 and the operation of control system 83 unless specifically noted otherwise.

Control system 81 includes a frame control module or box 82 and a regulated air module or box 84 as shown in FIG. 1*a*. Hand-held controller 50 is coupled electrically to control box 82 and is coupled electrically through control box 82 to air box 84 via lines 97, such as an RS-485 bus. Hand-held controller 50 transmits command signals to and receives feedback signals from each of boxes 82, 84 on lines 97 to control the various functions of bed and mattress assembly 52. Hand-held controller 50 contains electric circuitry including a display screen 86, a microprocessor 88, and memory 96. In addition, hand-held controller 50 includes other electrical components (not shown) that are well known to those skilled in the art and that supplement the operation of display screen 86, microprocessor 88, and memory 96. Examples of such other electrical components include a clock or oscillator, resistors, and a display driver.

Control box 82 includes a plug 98 that couples to an electrical outlet (not shown) to receive standard 110 V, 60 Hz AC electric power which is supplied through a power cord 99 to the other components of control system 81. Control box 82 further includes a first voltage regulator 100 and a second voltage regulator 110 as shown in FIG. 1*a*. Voltage regulator 100 converts the supplied AC power to 5 V DC power suitable for operating various integrated circuit components of control box 82 and voltage regulator 110 converts the supplied AC power to 24 V DC power suitable for operating articulation motors 60, 61, which in the illustrated embodiment of bed and mattress assembly 52 are DC motors. Massage motors 70, 72 are AC motors in the illustrated embodiment of bed and mattress assembly 52.

Control box 82 includes a power-down switch 112 that may be used instead of hand-held controller 50 to lower sections 62, 66, 68 to a flat, horizontal position. In addition, control box 82 includes a battery, capacitor, or other device for holding electric potential, hereinafter referred to as battery 114, that provides auxiliary power to articulation motors 60, 61 so that pressing power-down switch 112 lowers sections 62, 66, 68 to the flat, horizontal position when power supplied via plug 98 and power cord 99 is interrupted. Control system 81 is grounded to frame 54 of bed and mattress assembly 52 by a ground wire 116.

Control box 82 contains an electric circuit including a microprocessor 118 and memory 120 as shown diagrammatically in FIG. 1*a*. In addition, control box 82 includes other electrical components (not shown) that are well known to those skilled in the art and that supplement the operation of microprocessor 118 and memory 120. Examples of such other electrical components include a clock or oscillator, resistors, and relays. Microprocessor 118 receives inputs from hand-held controller 50 and sends feedback information to hand-held controller 50 via lines 97.

The electric circuit of control box 82 is coupled electrically via lines 122 to articulation motor 60, via lines 124 to articulation motor 61, via lines 126 to massage motor 70, and via lines 128 to massage motor 72. Control signals are transmitted on lines 97 from hand-held controller 50 through the electric circuit of control box 82 to motors 60, 61, 70, 72 on respective lines 122, 124, 126, 128 to control the operation of motors 60, 61, 70, 72. In addition, feedback signals are transmitted on lines 122, 124, 126, 128 from respective motors 60, 61, 70, 72 through the electric circuit of control box 82 to hand-held controller 50 on lines 97. Based on the feedback signals received by the electric circuit of hand-held controller 50, graphical images are displayed on display screen 86 to provide visual feedback to a user. The displayed images are discussed below in detail with reference to FIGS. 6–42.

Hand-held controller 50 is coupled electrically by lines 97 to regulated air box 84 as previously described. A power coupling cable 130 couples the electric circuit of control box 82 to air box 84. The electric circuit of control box 82 is configured so that some of the electric power received by control box 82 through plug 98 and power cord 99 is diverted to air box 84. Air box 84 includes a voltage regulator 132 that converts the AC power received on cable 130 to 5 V DC power.

Air box 84 contains an electric circuit including a microprocessor 134 and memory 136 as shown diagrammatically in FIG. 1*a*. In addition, air box 84 includes other electrical components (not shown) that are well known to those skilled in the art and that supplement the operation of microprocessor 134 and memory 136. Examples of such other electrical components include a clock or oscillator, resistors, and analog-to-digital converters. Microprocessor 134 receives input signals from hand-held controller 50 and sends feedback signals to hand-held controller 50 via lines 97.

Air box 84 includes an air compressor 138 and a manifold and valve assembly 140 as shown diagrammatically in FIG. 1*a*. Compressor 138 and manifold and valve assembly 140 are shown in FIG. 1*a* as being outside of air box 84 only for the sake of clarity. Therefore, it should be understood that, in commercial embodiments, both compressor 138 and manifold and valve assembly 140 are contained inside air box 84, although alternative embodiments having some portions or all of either compressor 138 or manifold and valve assembly 140 outside of air box 84, are possible without exceeding the scope of the invention as presently perceived.

Manifold and valve assembly 140 includes a manifold block 142, a set of zone valves 144, and a three-way valve 146 as shown diagrammatically in FIG. 1*a*. Manifold block 142 is formed to include internal passages (not shown), portions of which are opened and closed by zone valves 144 and by three-way valve 146. Air compressor 138 is coupled pneumatically to three-way valve 146 by a hose 145 and the internal passages of manifold block 142 are pneumatically coupled to air bladders 74, 76, 78, 80 by respective pressure-control hoses 147. Air box 84 includes a set of pressure sensors 148 that are coupled pneumatically to air bladders 74, 76, 78, 80 by respective pressure-sensor hoses 149. Pressure sensors 148 sense the pressure in respective hoses 149 and, based on the pressure sensed, generate electric signals to provide control system 81 with pressure feedback so that the pressures in air bladders 74, 76, 78, 80 are adjusted accordingly by operation of compressor 138 and by manipulation of the position of zone valves 144 and three-way valve 146.

Three-way valve 146 is movable between first and second positions. When three-way valve 146 is in the first position, the internal passages of manifold block 142 are coupled pneumatically to hose 145 but are decoupled pneumatically from the atmosphere. When three-way valve 146 is in the second position, the internal passages of manifold block 142 are decoupled pneumatically from hose 145 but are coupled pneumatically to the atmosphere. When valve 146 is de-energized, valve 146 is in the first position and when valve 146 is energized, valve 146 is in the second position.

The electric circuit of air box 84 is coupled electrically via lines 153 to compressor 138, via lines 150 to respective zone valves 144, and via lines 151 to three-way valve 146. Control signals are transmitted on lines 97 from hand-held controller 50, through the electric circuit of control box 82, through the electric circuit of air box 84 to zone valves 144 on respective lines 150 to control opening and closing of zone valves 144. In addition, control signals are transmitted on lines 97 from hand-held controller 50, through the electric circuit of control box 82, through the electric circuit of air box 84 to three-way valve 146 on lines 151 to control movement of the three-way valve 146 between the first and second positions.

When air bladders 74, 76, 78, 80 are all at a desired pressure, zone valves 144 are all closed, three-way valve 146 is in the first position, and compressor 138 is turned off. When one or more of air bladders 74, 76, 78, 80 require inflation to reach a respective desired pressure, the associated zone valves 144 are opened, three-way valve 146 is left in the first position, and compressor 138 is turned on to pump air from the atmosphere through hose 145, through three-way valve 146, through the appropriate internal passages of manifold block 142, through the respective pressure-control hoses 147, and into the respective air bladders 74, 76, 78, 80 requiring inflation. When one or more of air bladders 74, 76, 78, 80 require deflation to reach a respective desired pressure, the associated valves 144 are opened, compressor 138 is turned off, and three-way valve 146 is moved to the second position so that air from the respective air bladders 74, 76, 78, 80 requiring deflation bleeds through the respective pressure-control hoses 147, through the appropriate internal passages of manifold block 142, through three-way valve 146, and through an exhaust 155 into the atmosphere.

As previously described, king-size bed and mattress assembly 52 includes two sets of side-by-side mattress sections 62, 64, 66, 68 having respective sets of air bladders 74, 76, 78, 80; two sets of motors 60, 61, 72, 74; first and second control systems 81, 83; and two hand-held controllers 50 for articulating and vibrating respective decks 90 and for inflating and deflating respective air bladders 74, 76, 78, 80. In accordance with the present invention, a single hand-held controller 50 is used to control either a twin-size bed and mattress assembly (not shown) or a full-size bed and mattress assembly (not shown), each of which are substantially equivalent to half of king-size bed and mattress assembly 52. Thus, the description above of control system 81 of bed and mattress assembly is descriptive of the control systems associated with twin-size and full-size bed and mattress assemblies.

Figure 2:
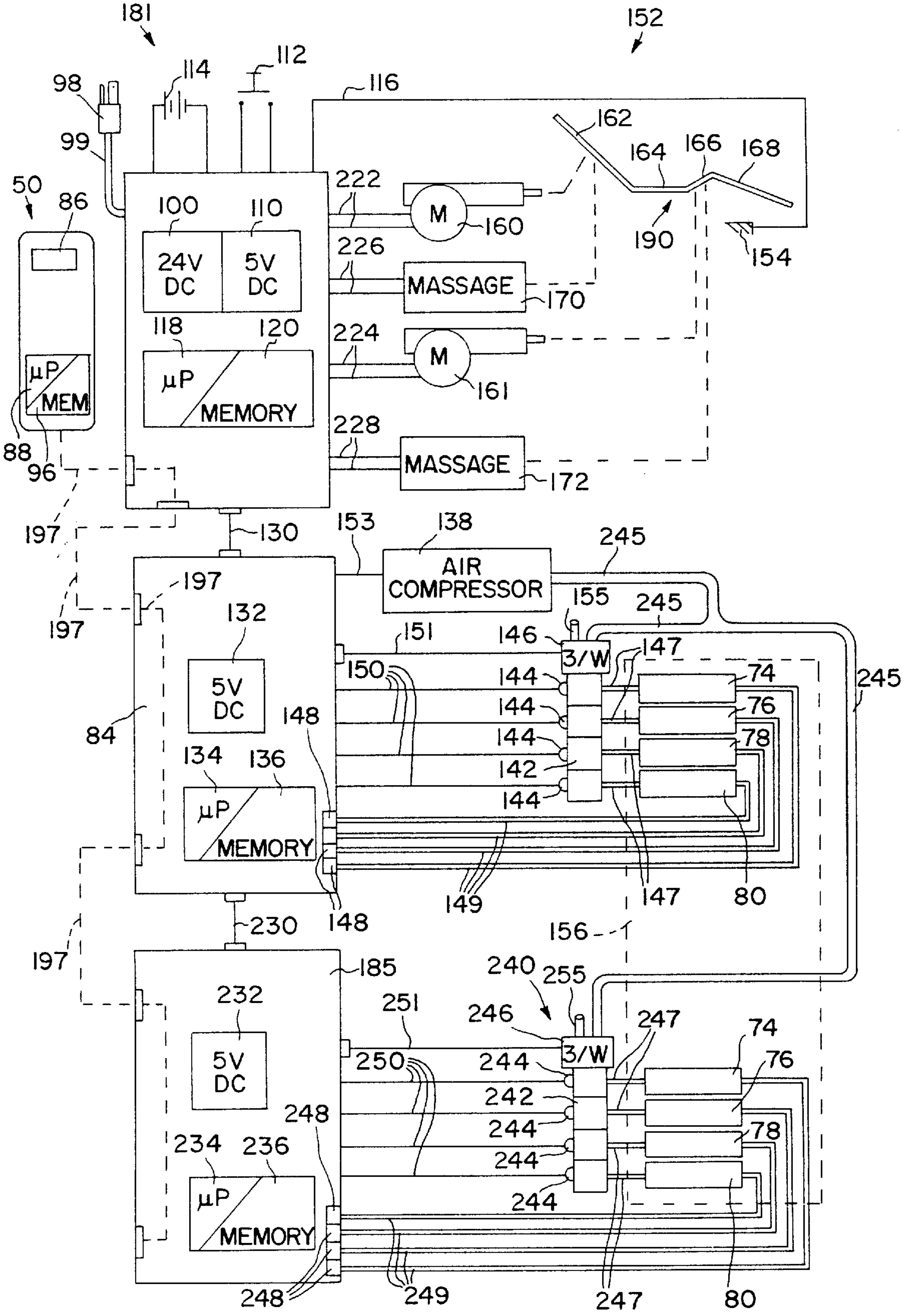
FIG. 2 is a block diagram of a queen-size bed and mattress assembly showing a hand-held controller in accordance with the present invention being coupled electrically to a frame control box and to first and second air control boxes, the frame control box being coupled electrically to a set of actuators and massage motors of the queen-size bed and mattress assembly, the first air control box being coupled electrically to valves of a first manifold and valve assembly, the second air control box being coupled electrically to valves of a second manifold and valve assembly, and the first control box being coupled electrically to an air compressor which is coupled pneumatically to first and second sets of air bladders of the queen-size bed and mattress assembly through the respective first and second manifold and valve assemblies.

An illustrative queen-size bed and mattress assembly 152, shown diagrammatically in FIG. 2, includes a frame 154 and a single articulating deck 190 having head, seat, thigh, and foot frame sections 162, 164, 166, 168 as shown diagrammatically in FIG. 2. Bed and mattress assembly 152 further includes a first articulation motor 160 coupled mechanically to head frame section 162 and a second articulation motor 161 coupled mechanically to thigh frame section 166. In addition, bed and mattress assembly 152 includes a first vibratory motor 170 coupled to head frame section 162 and a second vibratory motor 172 coupled to thigh frame section 166. Illustrative bed and mattress assembly 152 includes a mattress 156 having two sets of head, seat, thigh, and foot air bladders 74, 76, 78, 80 contained therein. Thus, although bed and mattress assembly 152 includes only one articulating deck 190, whereas bed and mattress assembly 52 includes two articulating decks 90, bed and mattress assembly 152 includes two sets of air bladders 74, 76, 78, 80, as was the case with bed and mattress assembly 52, which allows two people sleeping on bed and mattress assembly 152 to adjust the firmness and support characteristics of their respective half of mattress 156 in a desired manner.

Queen-size bed and mattress assembly 152 includes a single hand-held controller 50 that is coupled electrically to a control system 181 which is essentially the same as control system 81 of bed and mattress assembly 52 but which includes an additional regulated air box 185 as shown diagrammatically in FIG. 2. Components of control system 181 that are substantially the same as like components of control system 81 are labeled with like reference numerals and the above description of the like components with reference to control system 81 applies to control system 181 unless specifically noted otherwise. For example, control systems 81, 181 both include a frame control box 82 and a regulated air box 84. However, one difference between control system 181 and control system 81 is that the hand-held controller 50 associated with control system 181 is coupled to each of control box 82, regulated air box 84, and additional regulated air box 185 of control system 181 via lines 197, such as an RS-485 bus, whereas the hand-held controller associated with control system 81 is coupled electrically to control box 82 and air box 84 via lines 97. Another difference between control system 181 and control system 81 is that air compressor 138 associated with control system 181 is coupled pneumatically to two sets of air bladders 74, 76, 78, 80, whereas air compressor 138 associated with control system 81 is coupled pneumatically to only one set of air bladders 74, 76, 78, 80.

Hand-held controller 50 associated with control system 181 transmits command signals to and receives feedback signals from each of boxes 82, 84, 185 on lines 197 to control the various functions of bed and mattress assembly 152. Control box 82 of control system 181 contains an electric circuit including microprocessor 118 and memory 120 as was the case with control box 82 of control system 81. The electric circuit of control box 82 of control system 181 is coupled electrically via lines 222 to articulation motor 160, via lines 224 to articulation motor 161, via lines 226 to massage motor 170, and via lines 228 to massage motor 172. Control signals are transmitted on lines 197 from hand-held controller 50 through the electric circuit of control box 82 to motors 160, 161, 170, 172 on respective lines 222, 224, 226, 228 to control the operation of motors 160, 161, 170, 172. In addition, feedback signals are transmitted on lines 222, 224, 226, 228 from respective motors 160, 161, 170, 172 through the electric circuit of control box 182 to hand-held controller 50 on lines 197.

Air box 84 of control system 181 includes voltage regulator 132, an electric circuit which includes microprocessor 134 and memory 136, air compressor 138, pressure sensors 148, and manifold and valve assembly 140 which includes manifold block 142, zone valves 144, and three-way valve 146 as was the case with air box 84 of control system 81. Control system 181 includes a second power coupling cable 230 that couples the electric circuit of air box 84 to an electric circuit of air box 185. Air box 185 includes a voltage regulator 232 that converts the AC power received on cable 230 to 5 V DC power. Air box 185 contains an electric circuit including a microprocessor 234 and memory 236 as shown diagrammatically in FIG. 2. In addition, air box 185 includes other electrical components (not shown) that are well known to those skilled in the art and that supplement the operation of microprocessor 234 and memory 236. Examples of such other electrical components include a clock or oscillator, resistors, and analog-to-digital converters. Microprocessor 234 receives inputs from hand-held controller 50 and sends feedback information to hand-held controller 50 via lines 197.

Air box 185 includes a manifold and valve assembly 240 which is substantially similar to manifold and valve assembly 140 as shown diagrammatically in FIG. 2. Thus, manifold and valve assembly 240 includes a manifold block 242, a set of zone valves 244, and a three-way valve 246 that are substantially similar to manifold block 142, zone valves 144, and three-way valve 146 of air box 84, respectively. Manifold block 242 is formed to include internal passages (not shown), portions of which are opened and closed by zone valves 244 and by three-way valve 246.

Air compressor 238 is coupled pneumatically by a split hose assembly 245 to three-way valve 146 of air box 84 and to three-way valve 246 of air box 185 as shown diagrammatically in FIG. 2. The internal passages of manifold block 142 are pneumatically coupled to the associated sets of air bladders 74, 76, 78, 80 by respective pressure-control hoses 147 and the internal passages of manifold block 242 are pneumatically coupled to the associated set of air bladders 74, 76, 78, 80 by respective pressure-control hoses 247. Air box 185 includes a set of pressure sensors 248 that are coupled pneumatically to the associated set of air bladders 74, 76, 78, 80 by respective pressure-sensor hoses 249. Pressure sensors 148 of air box 84 and pressure sensors 248 of air box 185 sense the pressure in respective hoses 149, 249 and, based on the pressures sensed, generate electric signals to provide control system 181 with pressure feedback so that the pressures in each of the associated air bladders 74, 76, 78, 80 is adjusted accordingly.

The electric circuit of air box 185 is coupled electrically via lines 250 to respective zone valves 244 and via lines 251 to three-way valve 246. Control signals are transmitted on lines 197 from hand-held controller 50 through the electric circuit of control box 82, through the electric circuit of air box 84, and though the electric circuit of air box 185 to zone valves 244 on respective lines 250 to control opening and closing of zone valves 244. In addition, control signals are transmitted on lines 197 from hand-held controller 50 through the electric circuit of control box 82, through the electric circuit of air box 84, and through the electric circuit of air box 185 to three-way valve 246 on lines 251 to control movement of the three-way valve 246.

Three-way valve 246 operates in substantially the same manner as three-way valve 146, and therefore, three-way valve 246 is movable between first and second positions. When three-way valve 246 is in the first position, the internal passages of manifold block 242 are coupled pneumatically both to hose 245 but are decoupled pneumatically from the atmosphere. When three-way valve 246 is in the second position, the internal passages of manifold block 242 are decoupled pneumatically from hose 245 but are coupled pneumatically to the atmosphere. When valve 246 is de-energized, valve 246 is in the first position and when valve 246 is energized, valve 246 is in the second position.

When the air bladders 74, 76, 78, 80 associated with either of air boxes 84, 185 are all at a desired pressure, the respective zone valves 144, 244 are closed, the respective three-way valves 146, 246 are in the corresponding first positions, and compressor 238 is turned off. When one or more of air bladders 74, 76, 78, 80 associated with either of air boxes 84, 185 require inflation to reach the respective desired pressures, the respective zone valves 144, 244 are opened, the respective three-way valves 146, 246 are left in the corresponding first positions, and compressor 238 is turned on to pump air from the atmosphere through hose 245, through three-way valves 146, 246, through the appropriate internal passages of manifold blocks 142, 242, through the respective pressure-control hoses 147, 247, and into the respective air bladders 74, 76, 78, 80 requiring inflation. When one or more of air bladders 74, 76, 78, 80 associated with either of air boxes 84, 185 require deflation to reach the respective desired pressures, the respective valves 144, 244 are opened, compressor 238 is turned off, and the respective three-way valves 146, 246 are moved to the corresponding second positions so that air from the respective air bladders 74, 76, 78, 80 requiring deflation bleeds through the respective pressure-control hoses 147, 247, through the appropriate internal passages of manifold blocks 142, 242, through the respective three-way valves 146, 246, and through an exhaust 255 into the atmosphere.

Figure 3:
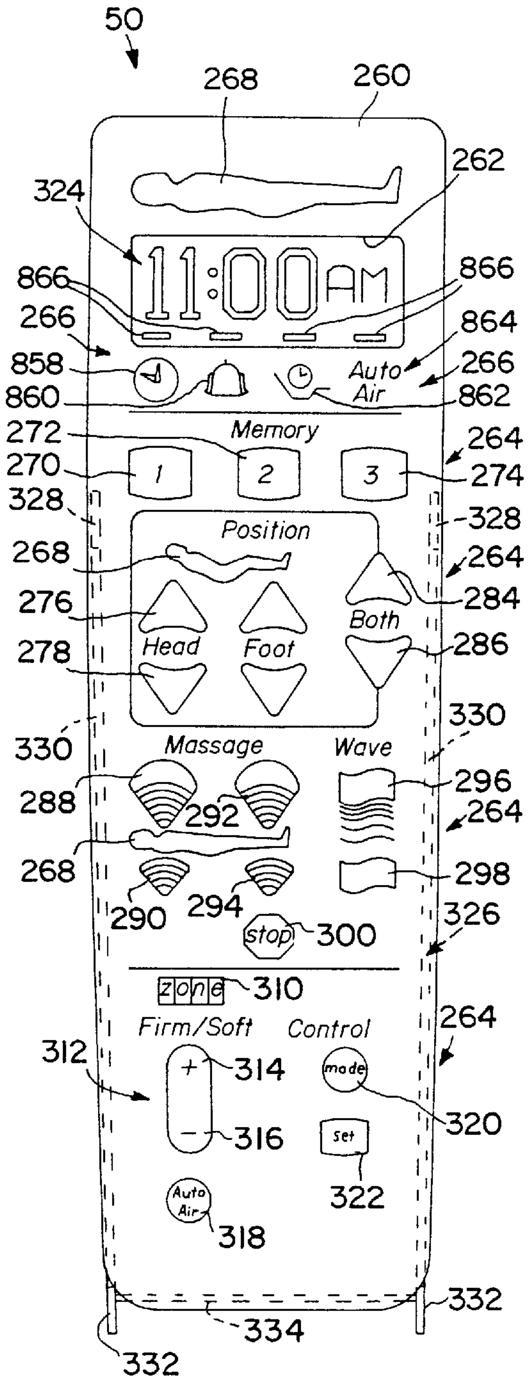
FIG. 3 is front view of the hand-held controller of FIG. 1 showing the hand-held controller including a display screen at the top of the hand-held controller, a set of mode indicia beneath the display screen, three memory buttons beneath the mode indicia, six articulation buttons beneath the memory buttons, four massage buttons and two wave buttons beneath the articulation buttons, a stop button beneath the massage and wave buttons, a zone-selection button beneath and to the left of the stop button, a three-way firm/soft button beneath the zone-selection button, an auto air button beneath the firm/soft button, a mode button beneath and to the right of the stop button, and a set button beneath the mode button, and showing the display screen in a default mode displaying a time-of-day.

Hand-held controller 50 includes display screen 86 and an electric circuit which includes microprocessor 88 and memory 96 as previously described. Hand-held controller 50 further includes a casing 260, shown best in FIGS. 3 and 4, that houses microprocessor 88, memory 96, and the electrical components that supplement the operation of microprocessor 88 and memory 96. In addition, display screen 86 is viewable through a window 262 formed in casing 260 as shown in FIG. 3. Hand-held controller 50 includes a plurality of buttons 264 that are pressed to either control or program the various functions of the associated bed and mattress assembly, such as bed and mattress assembly 52 or bed and mattress assembly 152 (hereinafter referred to as bed and mattress assembly 52).

Hand-held controller 50 is provided with a set of mode indicia 266 on casing 260 as shown in FIG. 3. Hand-held controller 50 may also include one or more decorative images 268 adjacent to respective buttons 264 to assist a user in understanding the particular function performed by buttons 264. The plurality of buttons 264 includes first, second, and third memory buttons 270, 272, 274 beneath mode indicia 266. Memory buttons 270, 272, 274 are pressed at appropriate instances to program and recall positional settings of the associated articulating deck 90 and to program and recall pressure settings of the associated air bladders 74, 76, 78, 80. The plurality of buttons 264 further includes a set of six articulation buttons including a head-up button 276, a head-down button 278, a foot-up button 280, a foot-down button 282, a both-up button 284, and a both-down button 286. In the illustrated embodiment of hand-held controller 50 shown in FIG. 3, articulation buttons 276, 278, 280, 282, 284, 286 are located beneath memory buttons 270, 272, 274. Articulation buttons 276, 278, 280, 282, 284, 286 are pressed to actuate one or both of motors 60, 61 to control articulation of the associated articulating deck 90.

The plurality of buttons 264 of hand-held controller 50 includes a set of massage buttons including a head massage increase button 288, a head massage decrease button 290, a foot massage increase button 292, and a foot massage decrease button 294 as shown in FIG. 3. In the illustrated embodiment of hand-held controller 50, massage buttons 288, 290, 292, 294 are located beneath articulation buttons 276, 278, 280, 282, 284, 286. Momentary presses of either of massage buttons 288, 290 turns on head-end massage motor 70 and continued pressing of either of massage buttons 288, 290 adjusts the intensity at which head-end massage motor 70 operates. Momentary presses of either of massage buttons 292, 294 turns on foot-end massage motor 72 and continued pressing of either of massage buttons 292, 294 adjusts the intensity at which foot-end massage motor 72 operates.

The plurality of buttons 264 of hand-held controller 50 further includes a pair of wave buttons including a wave increase button 296 and a wave decrease button 298 as shown in FIG. 3. In the illustrated embodiment of hand-held controller 50, wave buttons 296, 298 are located beneath articulation buttons 276, 278, 280, 282, 284, 286 and to the right of massage buttons 288, 290, 292, 294. Momentary presses of either of wave buttons 296, 298 turns on massage motors 70, 72 so as to operate in a wave mode in which the operational intensity of massage motors 70, 72 rises to an adjustable peak intensity level and then falls to a preset minimum intensity level in an alternating manner to produce a wave-effect motion. Continued pressing of either of wave buttons 296, 298 adjusts the wave speed, which is the time period between the occurrences of the peak intensity levels of the respective massage motors 70, 72. When massage motors 70, 72 are operating in the wave mode, pressing any of massage buttons 288, 290, 292, 294 adjusts the peak intensity level of the associated massage motor 70, 72. Hand-held controller 50 includes a stop button 300 beneath massage buttons 288, 290, 292, 294 and wave buttons 296, 298. Pressing stop button 300 stops the operation of massage motors 70, 72.

The plurality of buttons 264 includes a zone-selection button 310 which is located beneath and to the left of stop button 300 as shown in FIG. 3. Pressing zones-election button 310 causes one or more of air bladders 74, 76, 78, 80 to be selected for pressure adjustment. The plurality of buttons 264 includes a firm(+)/soft(−) button 312 beneath zone-selection button 310. Button 312 is a dual function button and therefore, the function performed in response to pressing either a plus side 314 or minus side 316 of button 312, depends upon which of the plurality of buttons 264 were pressed prior to pressing button 312. For example, after zone-selection button 310 is pressed to select one or more of air bladders 74, 76, 78, 80 for pressure adjustment, pressing plus side 314 of button 312 causes the selected air bladder(s) to be inflated and pressing minus side 316 of button 312 causes the selected air bladder(s) to be deflated.

The plurality of buttons 264 includes an auto air button 318 which, in the illustrated embodiment of FIG. 3, is located beneath firm(+)/soft(−) button 312. When auto air button 318 is pressed, the pressure in air bladders 74, 76, 78, 80 is monitored and air bladders 74, 76, 78, 80 are either inflated or deflated, as necessary, to maintain selected pressure levels therein. The plurality of buttons 264 further includes a mode button 320 beneath and to the right of stop button 300 and a set button 322 beneath mode button 320. Multiple presses of mode button 320 scrolls through the various programming options of hand-held controller 50. Pressing set button 322 at appropriate times during the programming of hand-held controller 50 causes various parameters to be stored in memory 96 of hand-held controller 50 as is discussed in detail below with reference to the flow charts of FIGS. 5, 10–15, 19–23, 27, 28, and 30–42.

Figure 4:
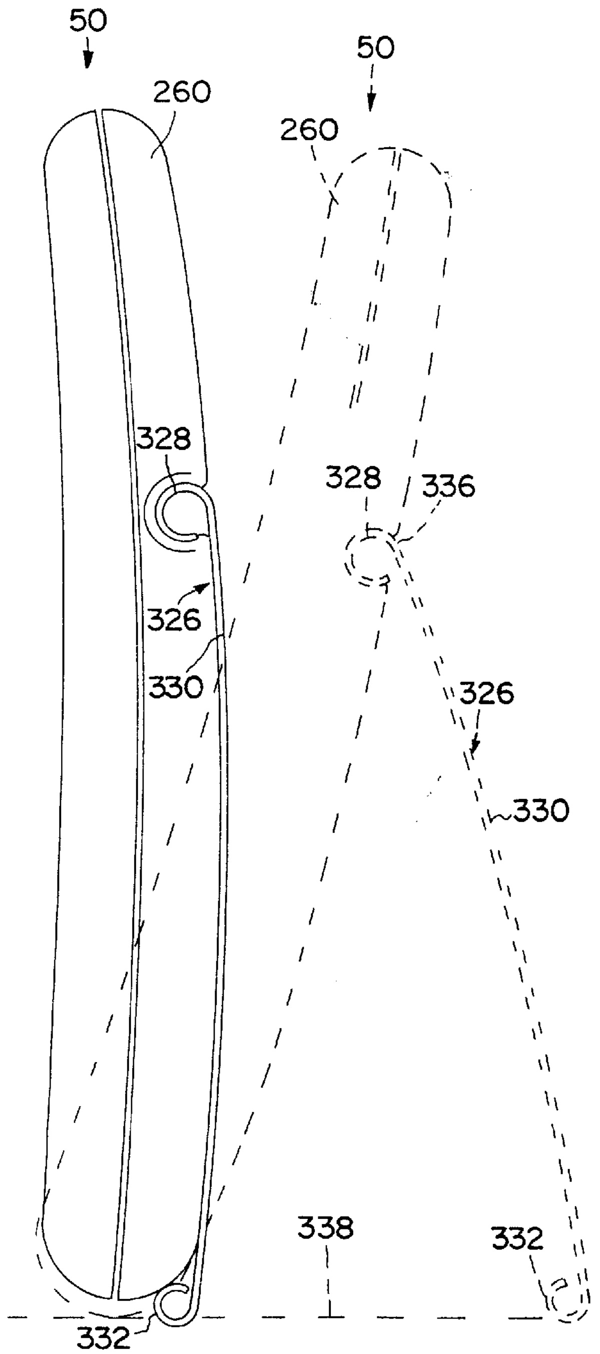
FIG. 4 is a side view of the hand-held controller of FIG. 1 showing a pivotable stand of the hand-held controller coupled to a casing of the hand-held controller for movement between a first position (in solid) in which a bottom portion of the stand is adjacent to the casing and a second position (in phantom) in which the bottom portion of the stand is spaced apart from the casing to support the hand-held controller in a substantially upright position.

When none of the plurality of buttons 264 are being pressed to control or program the various functions of bed and mattress assembly 52, hand-held controller 50 defaults to a clock mode in which a time-of-day 324 appears automatically on display screen 86 as shown in FIG. 3. Hand-held controller 50 includes a stand 326 which, in the illustrated embodiment of hand-held controller 50 shown in FIGS. 3 and 4, is a U-shaped wire including a pair of top loops 328, a pair of leg portions 330 extending downwardly from respective top loops 328, a pair of lower loops 332, and a bight portion 334 extending between lower loops 332. Top loops 328 are coupled to casing 260 so that stand 326 is pivotable relative to casing 260 between a first position, shown in FIG. 4 (in solid) having leg portions 330 and bight portion 334 adjacent to casing 260 and a second position, shown in FIG. 4 (in phantom) having leg portions angling away from casing 260 and having bight portion 334 spaced apart from casing 260.

When stand 326 is pivoted from the first position to the second position, a pair of stop edges 336 of casing 260 engage stand 326 to prevent stand 326 from pivoting away from the first position past the second position. When stand 326 is in the second position, casing 260 cooperates with stand 326 to allow hand-held controller 50 to be supported on a flat surface 338, such as a night stand located beside and mattress assembly 52, so that a person resting on bed and mattress assembly 52 can view the time-of-day 324 displayed on display screen 86 more easily.

A software program is stored in memory 96 of hand-held controller 50 and microprocessor 88 of hand-held controller 50 executes the software. The software program is written so that various graphical images and numerical data appear on display screen 86 when the plurality of buttons 264 are pressed to control or program the functions of bed and mattress assembly 52. The graphical images and numerical data that appear on display screen 86 when buttons 264 are pressed are discussed below in detail with reference to FIGS. 6–9, 16–18, 24–26, and 29. In addition, the software program is discussed below in detail with reference to the flow charts of FIGS. 5, 10–15, 19–23, 27, 28, and 30–42.

Figure 5:
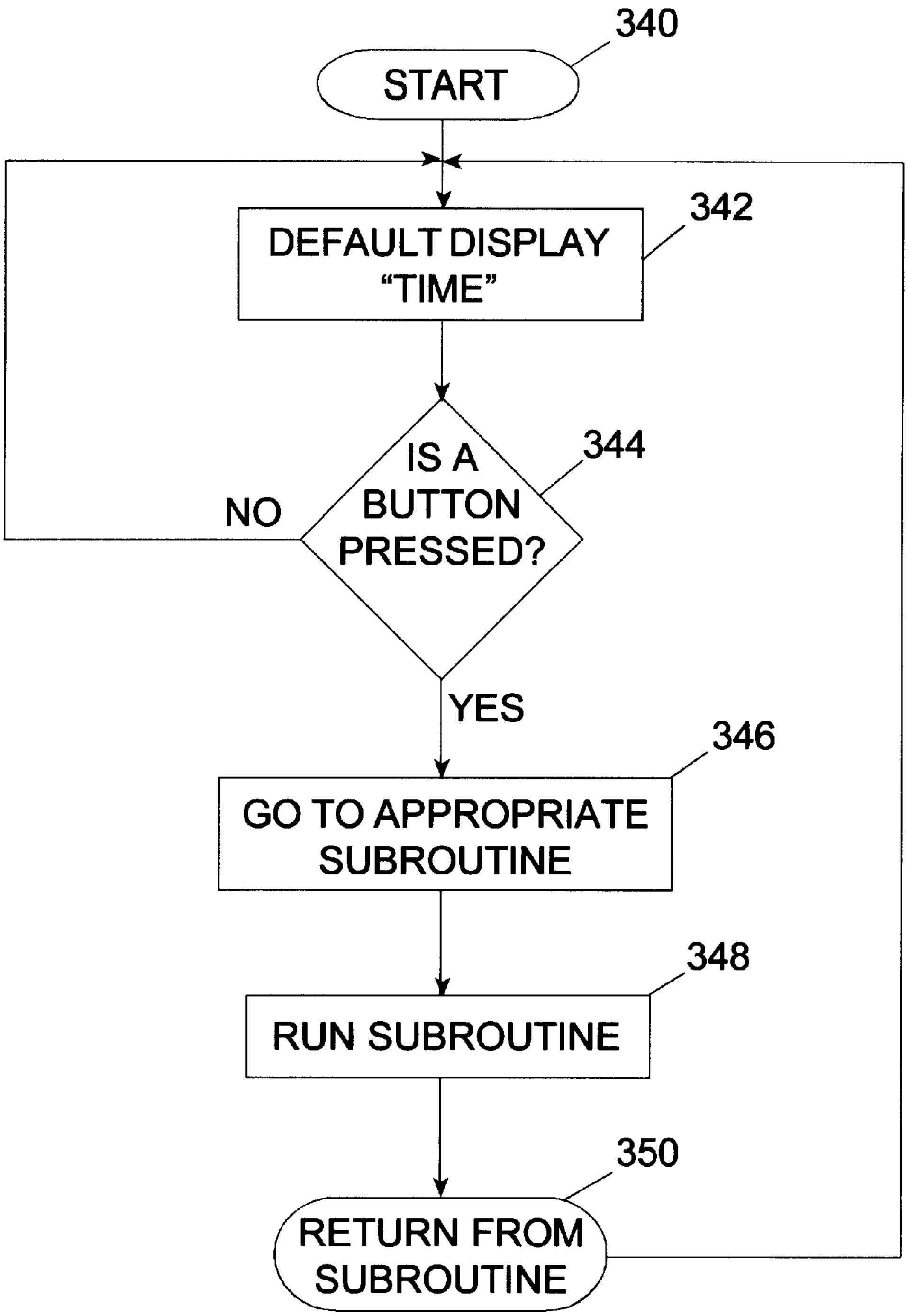
FIG. 5 is a flow chart showing steps of a main program that is executed during operation of the bed and mattress assembly.

FIG. 5 is a flow chart showing steps performed by microprocessor 88 when a main program is executed during operation of the control system, such as control system 81, associated with bed and mattress assembly 52. After the start of the main program, indicated by block 340 in FIG. 5, microprocessor 88 sends appropriate output signals so that the time-of-day 324 appears on display screen 86 as indicated at block 342. Microprocessor 88 then determines whether any of the plurality of buttons 264 are pressed as indicated at block 344. If none of the plurality of buttons 264 are pressed, microprocessor 88 loops back to block 342 so that the time-of-day 324 continues to appear on display screen 86.

If microprocessor 88 determines at block 344 that one of buttons 264 is pressed, microprocessor 88 goes to the subroutine associated with the pressed button 264, as indicated at block 346, and runs the subroutine, as indicated at block 348. After the subroutine associated with the pressed button 264 is executed, microprocessor 88 returns from the subroutine, as indicated at block 350, and loops back to block 342 so that the time-of-day 324, once again, appears on display screen 86. Hand-held controller 50 includes one or more batteries, capacitors, or other devices (not shown) for holding electric potential that provide a sufficient amount of power to allow time to be kept track of by hand-held controller when the control system associated with hand-held controller 50 is disconnected from standard AC power.

When any of articulation buttons 276, 278, 280, 282, 284, 286 are pressed, microprocessor 88 sends appropriate signals so that a bed position display screen, examples of which are shown in FIGS. 6-9, appears on display screen 86. The bed position display screen includes a bed articulation icon 352 which is representative of sections 62, 64, 66, 68 of bed and mattress assembly 52. The bed position display screen further includes a head-end bar graph 354 and a foot-end bar graph 356, each of which, in the illustrated embodiment, include ten bars 358 that become visible to indicate the relative position of head section 62 and thigh section 66 between respective raised and lowered positions. In addition, the bed position display screen further includes a head-end position number 360 and a foot end position number 362, each of which vary between a lower limit, such as zero, when the head section 62 and thigh section 66 are in a respective horizontal lowered position, and an upper limit, such as one hundred, when head section 62 and thigh section 66 are in a respective maximum raised position.

Figure 6:
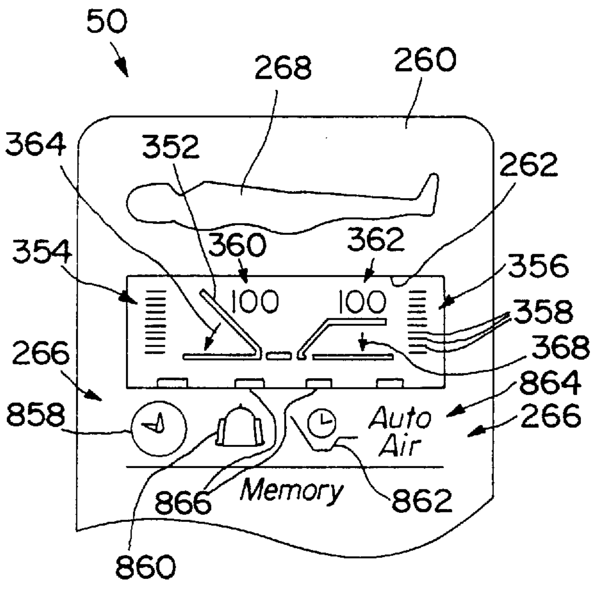
FIGS. 6–9 are each front views of the display screen of the hand-held controller showing various examples of graphical images and numerical data displayed on the display screen when any of the articulation buttons are pressed to articulate the associated bed frame sections.
Figure 7:
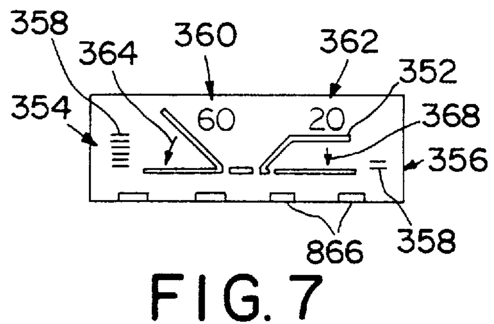
Figure 8:
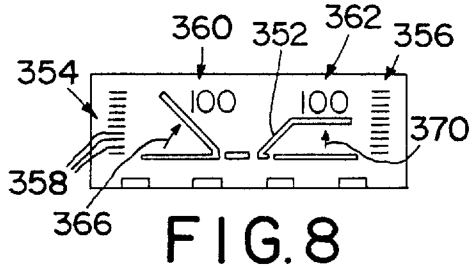
Figure 9:
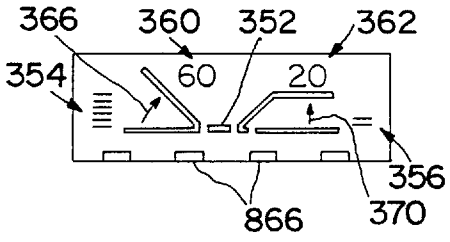

The bed position display screen further includes a set of arrows that indicate whether sections 62, 66 are being raised or lowered. When head section 62 is lowering, a head-down arrow 364 appears on display screen 86 and when thigh section 66 is lowering, a foot-down arrow 368 appears on display screen 86 as shown in FIGS. 6 and 7. When head section 62 is raising, a head-up arrow 366 appears on display screen 86 and when thigh section 66 is raising a foot-up arrow 370 appears on display screen 86 as shown in FIGS. 8 and 9. Arrows 364, 368 appear simultaneously on display screen 86 when both-down button 286 is pressed and arrows 366, 370 appear simultaneously on display screen 86 when both-up button 284 is pressed. When any of head-up, head-down, foot-up, and foot-down buttons 276, 278, 280, 282 are pressed, the corresponding one of head-up, head-down, foot-up, and foot-down arrows 366, 364, 370, 368, respectively, appears on display screen 86 without the other arrows appearing. Thus, the bed position display screen includes graphical images 352, 354, 356, 364, 366, 368, 370 and numerical data 360, 362 that provide qualitative and quantitative feedback to the user regarding the position of sections 62, 64, 66, 68.

Although, bed articulation icon 352 is shown in FIGS. 6–8 as having a fixed appearance, it is within the scope of the invention as presently perceived for hand-held controller 50 to have appropriate software to cause each segment of bed articulation icon to move as the associated section 62, 64, 66, 68 moves. It should also be understood that microprocessor 88 may be programmed such that numbers 360, 362 vary within any desired range, including having numbers 360, 362 correlate to the angular position, in degrees, of respective sections 62, 66 above horizontal. In addition, microprocessor 88 may be programmed such that bar graphs 354, 356 have a pictorial representation different than bars 358.

Figure 10:
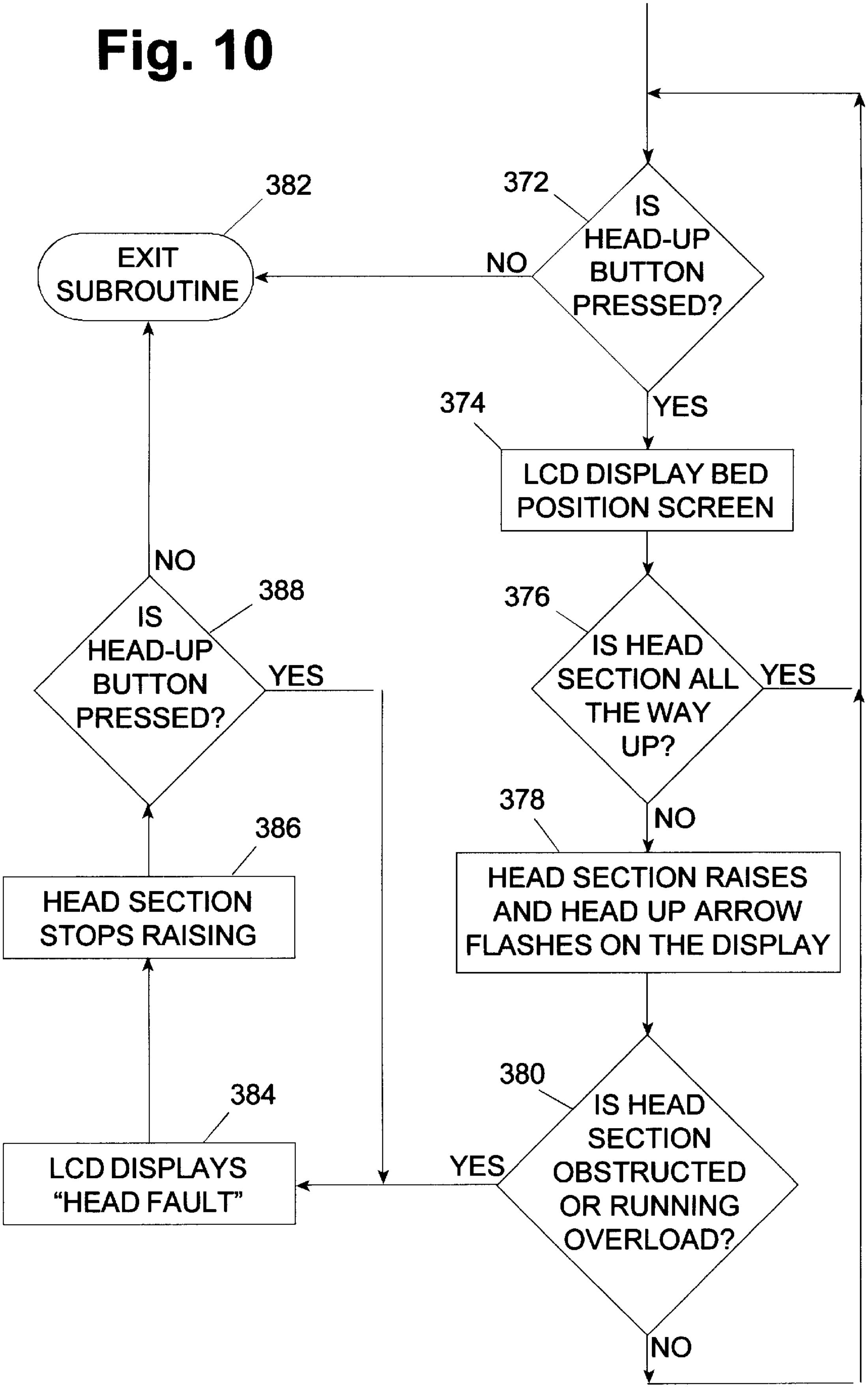
FIG. 10 is a flow chart showing the steps of a subroutine that is executed when a head-up button of the hand-held controller is pressed.

FIG. 10 is a flow chart showing steps that are performed by microprocessor 88 when head-up button 276 of hand-held controller 50 is pressed. As indicated at block 372, microprocessor 88 determines whether head-up button 276 is pressed, which will be the case when the head-up button subroutine of FIG. 10 is called initially, and thus, microprocessor 88 will send appropriate output signals so that the bed position screen will appear on display screen 86 showing icon 352, bar graphs 354, 356, and numbers 360, 362 as indicated at block 374. Microprocessor 88 then determines at block 376 whether head section 62 is all the way up to its raised position and if so, microprocessor 88 loops back to block 372 as shown in FIG. 10. If microprocessor 88 determines at block 376 that head section 62 is not all the way up to its maximum raised position, microprocessor 88 sends appropriate signals to raise head section 62 and to flash head-up arrow 366 on display screen 86 as indicated at block 378.

While head section 62 is raising, microprocessor 88 determines at block 380 whether head section 62 is obstructed or whether motor 60 associated with head section 62 is overloaded. If microprocessor 88 determines at block 380 that head section 62 is not obstructed and that motor 60 associated with head section 62 is not overloaded, then microprocessor loops back to block 372. Thus, while head-up button 276 is pressed, microprocessor loops continuously through blocks 372, 374, 376, 378, 380 to raise head section 62. If head-up button 276 is not being pressed, as determined by microprocessor 88 at block 372, microprocessor 88 exits the head-up button subroutine as indicated at block 382.

If microprocessor 88 determines at block 380 that head section 62 is obstructed or that motor 60 is overloaded, microprocessor 88 sends appropriate signals so that a "HEAD FAULT" message appears on display screen 86 as indicated at block 384 and so that motor 60 is deactivated causing head section 62 to stop raising as indicated at block 386. After microprocessor 88 stops head section 62 from raising at block 386, microprocessor 88 determines at block 388 whether head-up button 276 is still pressed. If microprocessor 88 determines at block 388 that head-up button 276 is still pressed, microprocessor 88 loops back to block 384 as shown in FIG. 10. Thus, while head-up button 276 is pressed and either head section 62 is obstructed or motor 60 is overloaded, microprocessor 99 loops continuously through blocks 384, 386, 388. If microprocessor 88 determines at block 388 that head-up button 276 is not pressed, microprocessor 88 exits the head-up button subroutine as indicated at block 382.

Figure 11:
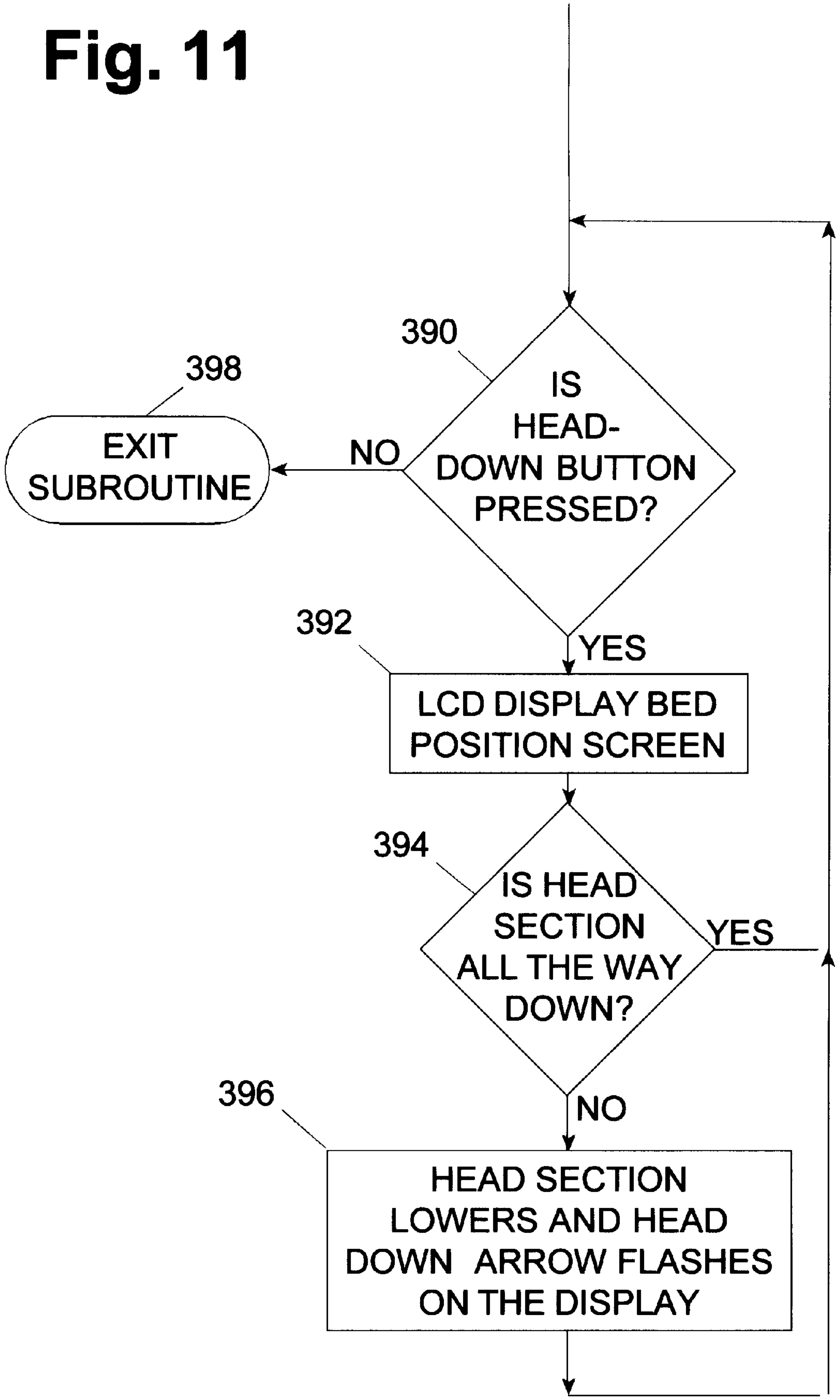
FIG. 11 is a flow chart showing the steps of a subroutine that is executed when a head-down button of the hand-held controller is pressed.

FIG. 11 is a flow chart of the steps performed by microprocessor 88 when head-down button 278 of hand-held controller 50 is pressed. As indicated at block 390, microprocessor 88 determines whether head-down button 278 is pressed, which will be the case when the head-down button subroutine of FIG. 11 is called initially, and thus, microprocessor 88 will send appropriate output signals so that the bed position screen will appear on display screen 86 showing icon 352, bar graphs 354, 356, and numbers 360, 362 as indicated at block 392. Microprocessor 88 then determines at block 394 whether head section 62 is all the way down to its lowered position and if so, microprocessor 88 loops back to block 390 as shown in FIG. 11.

If microprocessor 88 determines at block 394 that head section 62 is not all the way down to its lowered position, microprocessor 88 sends appropriate signals to lower head section 62 and to flash head-down arrow 364 on display screen 86 as indicated at block 396 and then, microprocessor 88 loops back to block 390. Thus, while head-down button 278 is pressed, microprocessor 88 loops continuously through blocks 390, 392, 394, 396 to lower head section 62. If head-down button 278 is not being pressed, as determined by microprocessor 88 at block 390, microprocessor 88 exits the head-down button subroutine as indicated at block 398. Actuator 60 is configured such that if head section 62 becomes obstructed while lowering, mechanical decoupling occurs within actuator 60 so that actuator 60 continues to operate but so that head section 62 is not moved any further toward the lowered position after becoming obstructed.

Figure 12:
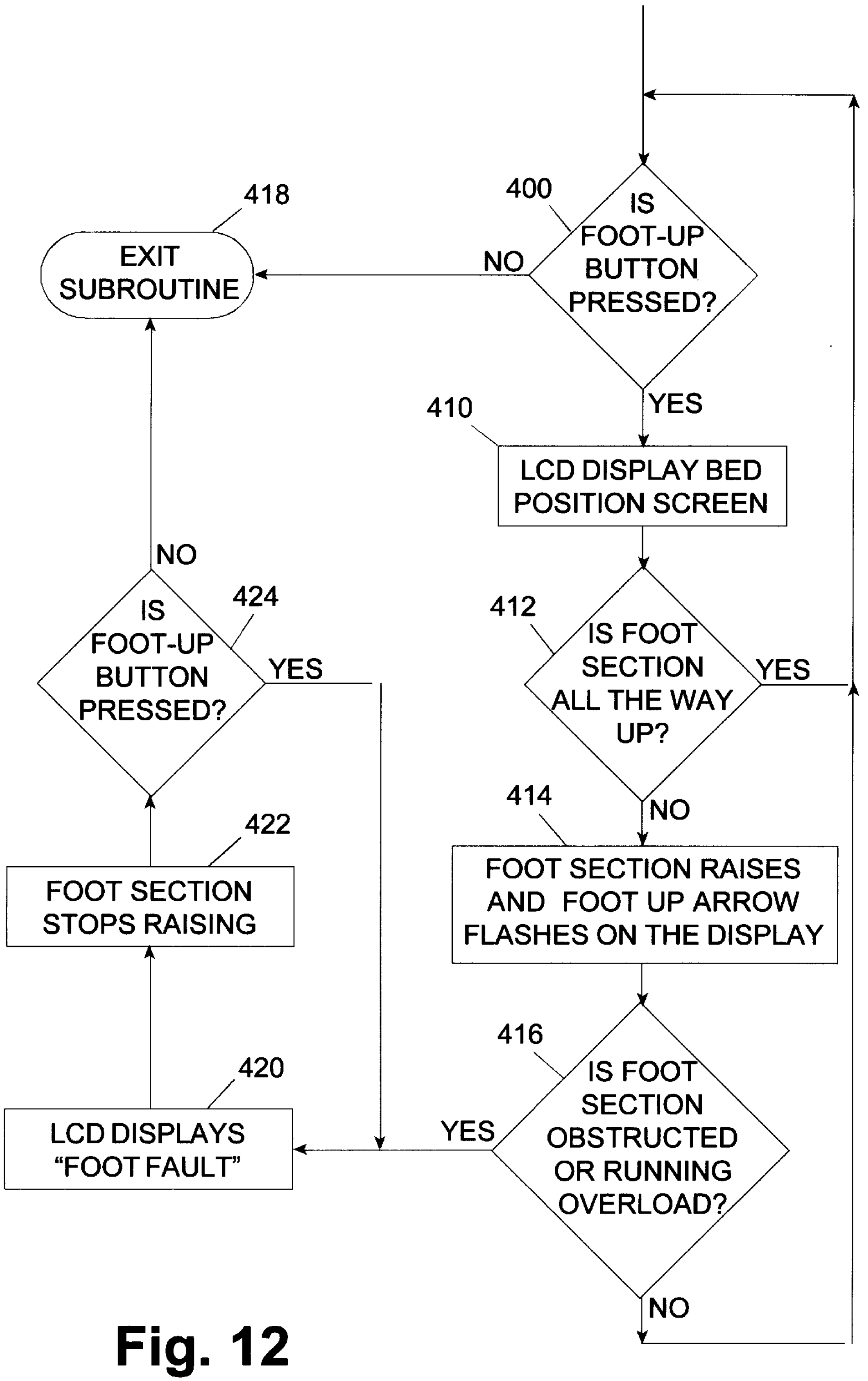
FIG. 12 is a flow chart showing the steps of a subroutine that is executed when a foot-up button of the hand-held controller is pressed.

FIG. 12 is a flow chart showing steps that are performed by microprocessor 88 when foot-up button 280 of hand-held controller 50 is pressed to raise thigh section 66 and foot section 68, hereinafter referred to as foot section 66. As indicated at block 400, microprocessor 88 determines whether foot-up button 280 is pressed, which will be the case when the foot-up button subroutine of FIG. 12 is called initially, and thus, mircroprocessor 88 will send appropriate output signals so that the bed position screen will appear on display screen 86 showing icon 352, bar graphs 354, 356, and numbers 360, 362 as indicated at block 410. Mircroprocessor 88 then determines at block 412 whether foot section 66 is all the way up to its raised position and if so, microprocessor 88 loops back to block 400 as shown in FIG. 12. If microprocessor 88 determines at block 412 that foot section 66 is not all the way up to its raised position, microprocessor 88 sends appropriate signals to raise foot section 66 and to flash foot-up arrow 370 on display screen 86 as indicated at block 414.

While foot section 66 is raising, microprocessor 88 determines at block 416 whether foot section 66 is obstructed or whether motor 61 associated with foot section 66 is overloaded. If microprocessor 88 determines at block 416 that foot section 66 is not obstructed and that motor 61 associated with foot section 66 is not overloaded, then microprocessor loops back to block 400. Thus, while foot-up button 280 is pressed, microprocessor 88 loops continuously through blocks 400, 410, 412, 414, 416 to raise foot section 66. If foot-up button 280 is not being pressed, as determined by microprocessor 88 at block 400, microprocessor 88 exits the foot-up button subroutine as indicated at block 418.

If microprocessor 88 determines at block 416 that foot section 66 is obstructed or that motor 61 is overloaded, microprocessor 88 sends appropriate signals so that a "FOOT FAULT" message appears on display screen 86 as indicated at block 420 and so that motor 61 is deactivated causing foot section 66 to stop raising as indicated at block 422. After microprocessor 88 stops foot section 66 from raising at block 422, microprocessor 88 determines at block 424 whether foot-up button 280 is still pressed. If microprocessor 88 determines at block 424 that foot-up button 280 is still pressed, microprocessor 88 loops back to block 420 as shown in FIG. 12. Thus, while foot-up button 280 is pressed and either foot section 66 is obstructed or motor 61 is overloaded, microprocessor 88 loops continuously through blocks 420, 422, 424. If microprocessor 88 determines at block 424 that foot-up button 280 is not pressed, microprocessor 88 exits the foot-up button subroutine as indicated at block 418.

Figure 13:
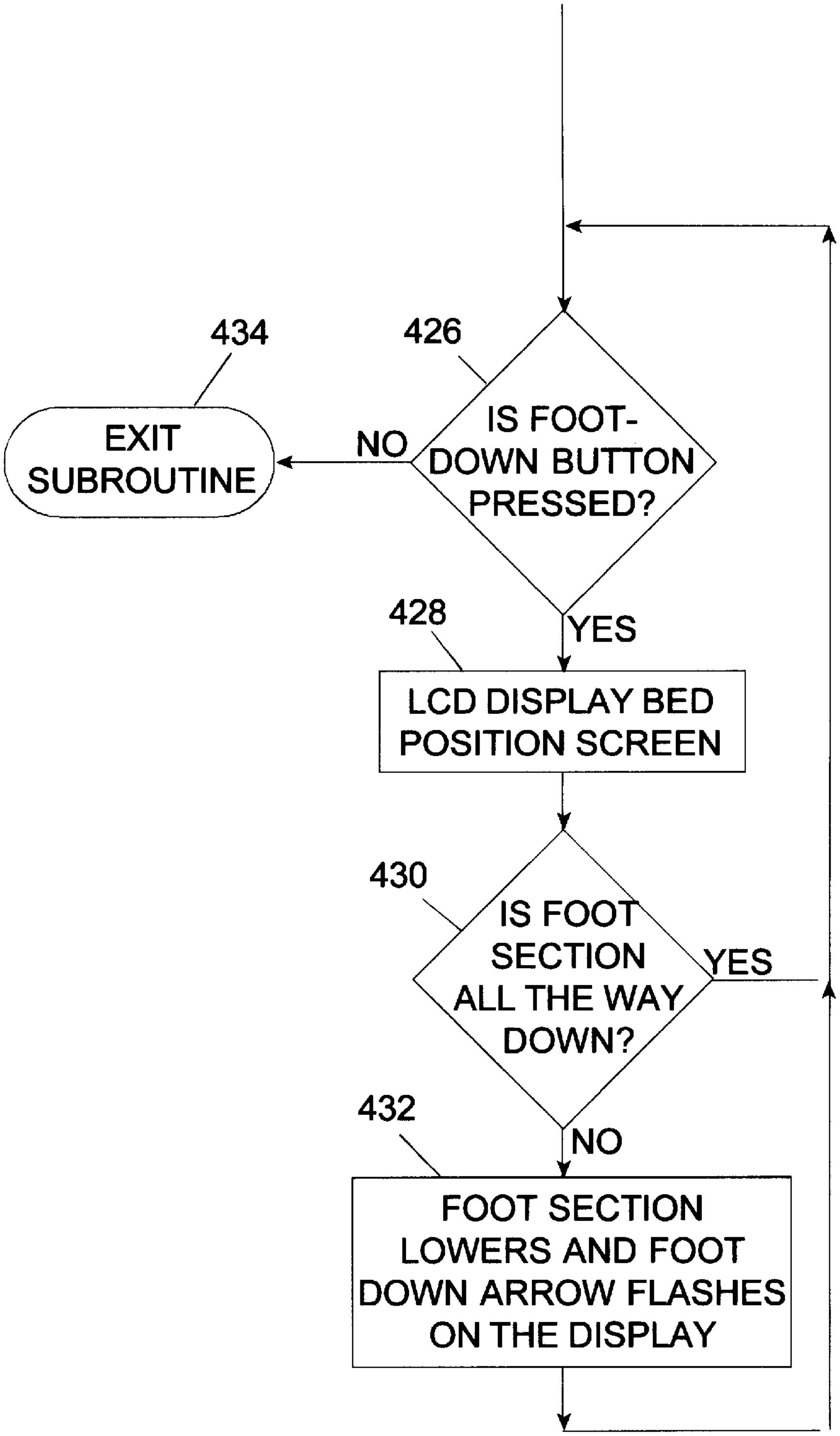
FIG. 13 is a flow chart showing the steps of a subroutine that is executed when a foot-down button of the hand-held controller is pressed.

FIG. 13 is a flow chart of the steps performed by microprocessor 88 when foot-down button 282 of hand-held controller 50 is pressed. As indicated at block 426, microprocessor 88 determines whether foot-down button 282 is pressed, which will be the case when the foot-down button subroutine of FIG. 13 is called initially, and thus, mircroprocessor 88 will send appropriate output signals so that the bed position screen will appear on display screen 86 showing icon 352, bar graphs 354, 356, and numbers 360, 362 as indicated at block 428. Mircroprocessor 88 then determines at block 430 whether foot section 66 is all the way down to its lowered position and if so, microprocessor 88 loops back to block 426 as shown in FIG. 13.

If microprocessor 88 determines at block 430 that foot section 66 is not all the way down to its lowered position, microprocessor 88 sends appropriate signals to lower foot section 66 and to flash foot-down arrow 368 on display screen 86 as indicated at block 432 and then, microprocessor 88 loops back to block 426. Thus, while foot-down button 282 is pressed, microprocessor 88 loops continuously through blocks 426, 428, 430, 432 to lower foot section 66. If foot-down button 282 is not being pressed, as determined by microprocessor 88 at block 426, microprocessor 88 exits the foot-down button subroutine as indicated at block 434. Actuator 61 is configured such that if foot section 66 becomes obstructed while lowering, mechanical decoupling occurs within actuator 61 so that actuator 62 continues to operate but so that foot section 66 is not moved any further toward the lowered position after becoming obstructed.

Figure 14A:
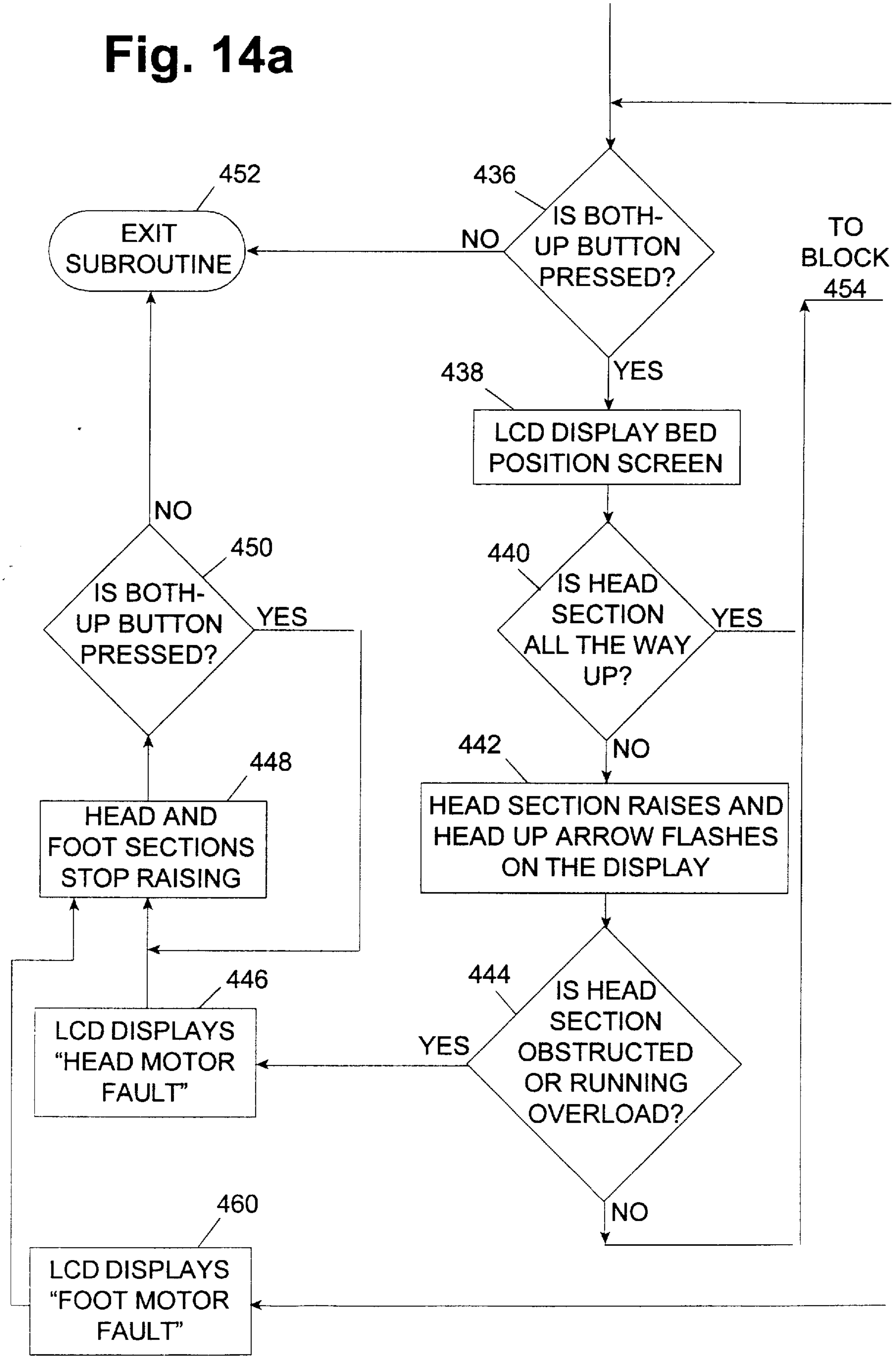
FIG. 14*a* is a first portion of a flow chart showing some of the steps of a subroutine that is executed when a both-up button of the hand-held controller is pressed.
Figure 14B:
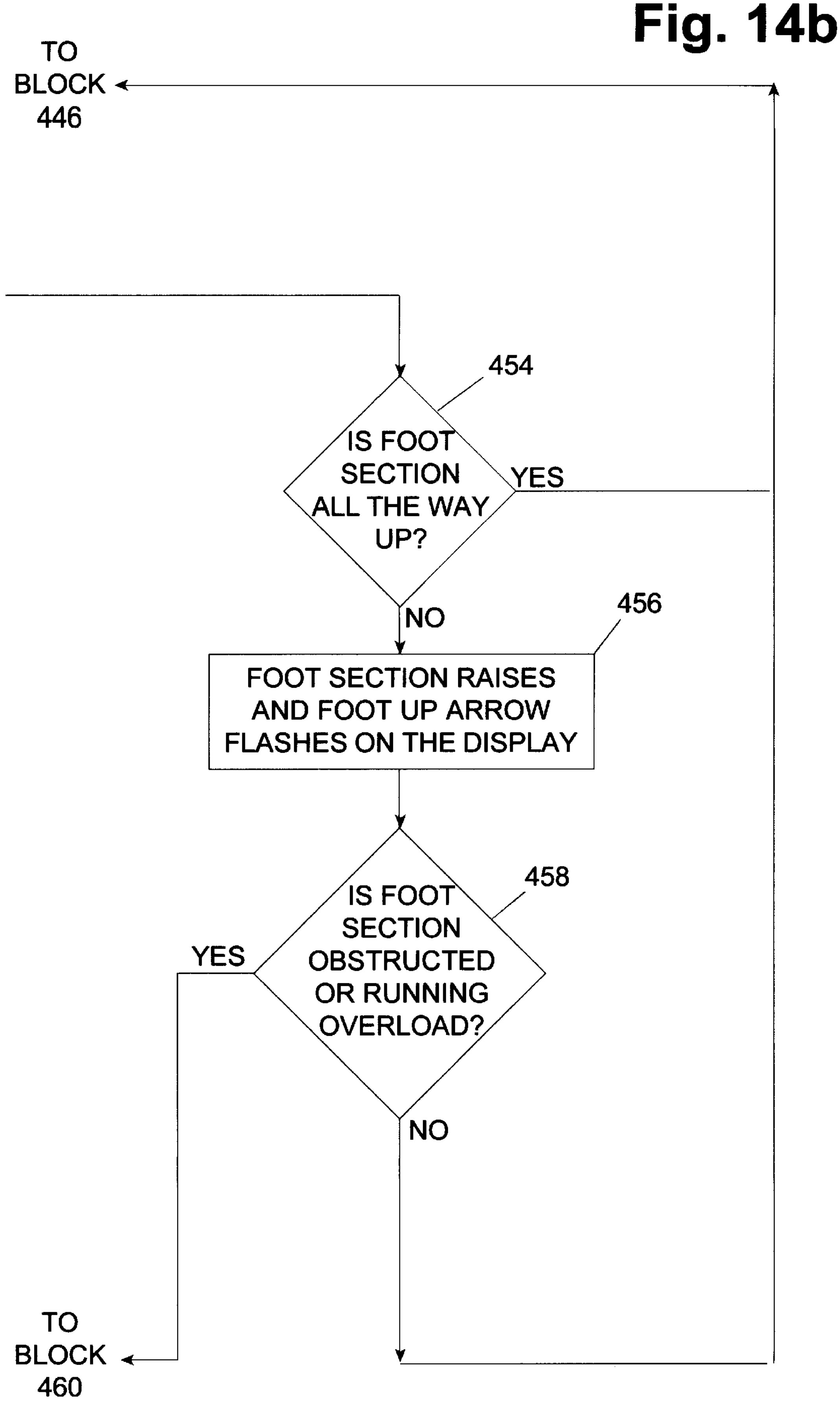
FIG. 14*b* is a second portion of a flow chart showing some of the steps of the subroutine that is executed when the both-up button of the hand-held controller is pressed.

FIGS. 14*a* and 14*b* together show a flow chart of steps that are performed by microprocessor 88 when both-up button 284 of hand-held controller 50 is pressed. As indicated at block 436, microprocessor 88 determines whether both-up button 284 is pressed, which will be the case when the head-up button subroutine of FIGS. 14*a* and 14*b* is called initially, and thus, mircroprocessor 88 will send appropriate output signals so that the bed position screen will appear on display screen 86 showing icon 352, bar graphs 354, 356, and numbers 360, 362 as indicated at block 438. Mircroprocessor 88 then determines at block 440 whether head section 62 is all the way up to its raised position and if not, microprocessor 88 sends appropriate signals to raise head section 62 and to flash head-up arrow 366 on display screen 86 as indicated at block 442.

While head section 62 is raising, microprocessor 88 determines at block 444 whether head section 62 is obstructed or whether motor 60 associated with head section 62 is overloaded. If microprocessor 88 determines at block 444 that head section 62 is obstructed or that motor 60 is overloaded, microprocessor 88 sends appropriate signals so that a "HEAD MOTOR FAULT" message appears on display screen 86 as indicated at block 446 and so that motors 60, 61 are deactivated causing both head section 62 and foot section 66 to stop raising as indicated at block 448. After microprocessor 88 stops head and foot sections 62, 66 from raising at block 448, microprocessor 88 determines at block 450 whether both-up button 284 is still pressed. If microprocessor 88 determines at block 450 that both-up button 284 is still pressed, microprocessor 88 loops back to block 448 as shown in FIG. 10. Thus, while both-up button 284 is pressed and either head section 62 is obstructed or motor 60 is overloaded, microprocessor 88 loops continuously through blocks 448, 450. If microprocessor 88 determines at block 450 that both-up button 284 is not pressed, microprocessor 88 exits the head-up button subroutine as indicated at block 452.

If microprocessor 88 determines at block 440 that head section 62 is all the way up in its raised position or if microprocessor 88 determines at block 444 that head section 62 is not obstructed and that motor 60 associated with head section 62 is not overloaded, then microprocessor 88 determines at block 454 of FIG. 14*b* whether foot section 66 is all the way up to its raised position and if so, microprocessor 88 loops back to block 446 of FIG. 14*a*. If microprocessor 88 determines at block 454 that foot section 66 is not all the way up to its raised position, microprocessor 88 sends appropriate signals to raise foot section 66 and to flash foot-up arrow 370 on display screen 86 as indicated at block 456.

While foot section 66 is raising, microprocessor 88 determines at block 458 whether foot section 66 is obstructed or whether motor 61 associated with foot section 66 is overloaded. If microprocessor 88 determines at block 458 that foot section 66 is not obstructed and that motor 61 associated with foot section 66 is not overloaded, then microprocessor loops back to block 446 of FIG. 14*a*. Thus, while both-up button 284 is pressed, microprocessor 88 loops continuously through blocks 436, 438, 440, 442, 444, 454, 456, 458 to raise head section 62 and foot section 66 simultaneously. If both-up button 284 is not being pressed, as determined by microprocessor 88 at block 436, microprocessor 88 exits the both-up button subroutine as indicated at block 452.

If microprocessor 88 determines at block 458 that foot section 66 is obstructed or that motor 61 is overloaded, microprocessor 88 sends appropriate signals so that a "FOOT MOTOR FAULT" message appears on display screen 86 as indicated at block 460 and so that motors 60, 61 are deactivated causing both head section 62 and foot section 66 to stop raising as indicated at block 448. After microprocessor 88 stops head and foot sections 62, 66 from raising at block 448, microprocessor 88 determines at block 450 whether both-up button 284 is still pressed. If microprocessor 88 determines at block 450 that both-up button 284 is still pressed, microprocessor 88 loops back to block 448 as shown in FIG. 10. Thus, while both-up button 284 is pressed and either foot section 66 is obstructed or motor 61 is overloaded, microprocessor 88 loops continuously through blocks 448, 450. If microprocessor 88 determines at block 450 that both-up button 284 is not pressed, microprocessor 88 exits the head-up button subroutine as indicated at block 452.

Figure 15:
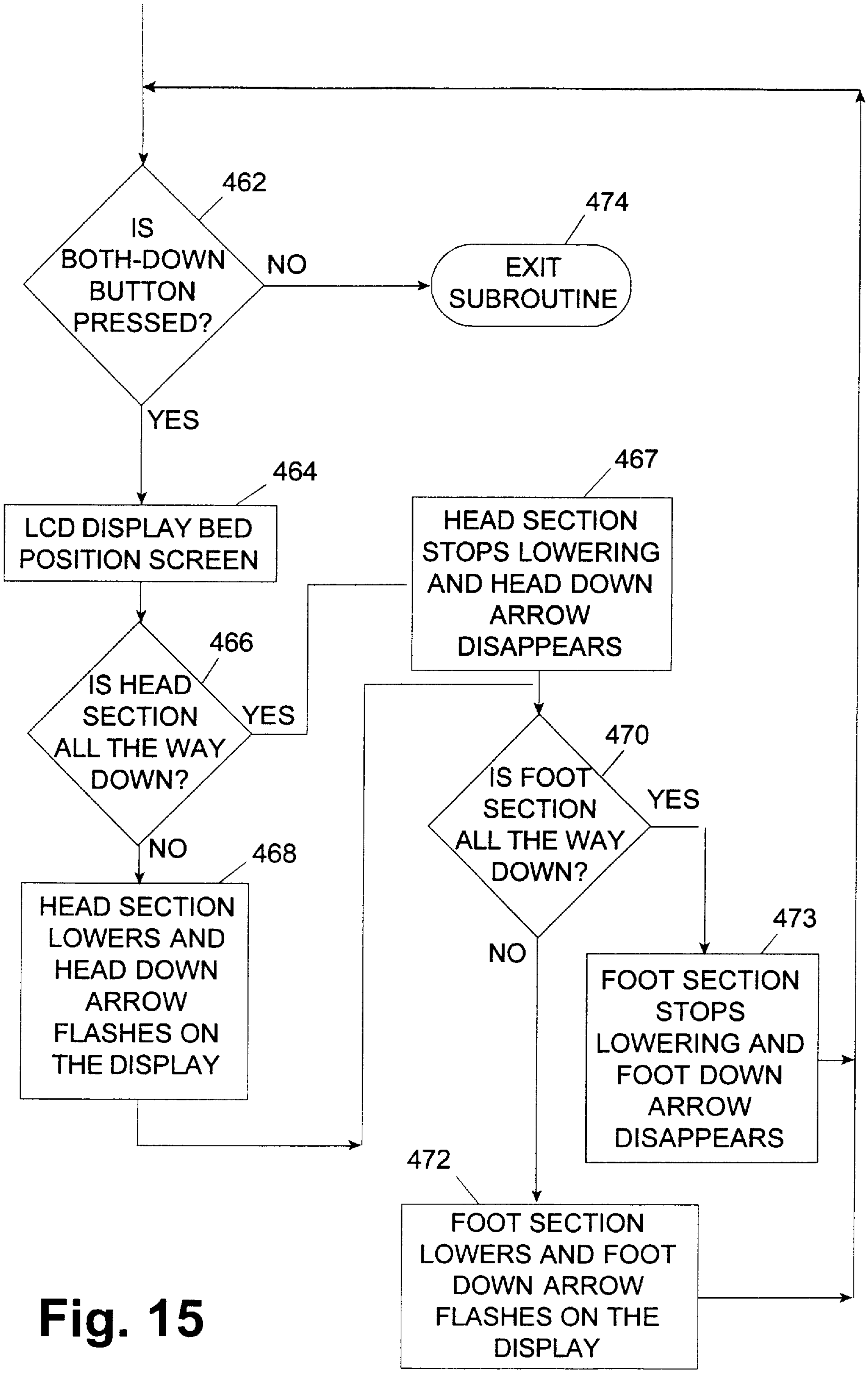
FIG. 15 is a flow chart showing the steps of a subroutine that is executed when a both-down button of the hand-held controller is pressed.

FIG. 15 is a flow chart of the steps performed by microprocessor 88 when both-down button 286 of hand-held controller 50 is pressed. As indicated at block 462, microprocessor 88 determines whether both-down button 286 is pressed, which will be the case when the head-down button subroutine of FIG. 15 is called initially, and thus, microprocessor 88 will send appropriate output signals so that the bed position screen will appear on display screen 86 showing icon 352, bar graphs 354, 356, and numbers 360, 362 as indicated at block 464. Microprocessor 88 then determines at block 466 whether head section 62 is all the way down to its lowered position and if not, microprocessor 88 sends appropriate signals to lower head section 62 and to flash head-down arrow 364 on display screen 86 as indicated at block 468.

If microprocessor 88 determines at block 466 that head section 62 is all the way down in its lowered position, microprocessor 88 sends the appropriate signals so that head section 62 stops lowering and so that head-down arrow 364 disappears from display screen 86 as indicated at block 467. After microprocessor 88 performs the steps associated with either of blocks 467, 468, microprocessor 88 determines whether foot section 66 is all the way down in its lowered position as indicated at block 470. If microprocessor 88 determines at block 470 that foot section 66 is not all the way down to its lowered position, microprocessor 88 sends appropriate signals to lower foot section 66 and to flash foot-down arrow 368 on display screen 86 as indicated at block 472.

If microprocessor 88 determines at block 470 that foot section 66 is all the way down in its lowered position, microprocessor 88 sends the appropriate signals so that foot section 66 stops lowering and so that foot-down arrow 368 disappears from display screen 86 as indicated at block 473. After microprocessor 88 performs the steps associated with either of blocks 472, 473, microprocessor 88 loops back to block 462 and proceeds from block 462 as described above. If both-down button 286 is not being pressed, as determined by microprocessor 88 at block 462, microprocessor 88 exits the both-down button subroutine as indicated at block 474.

Figure 16:
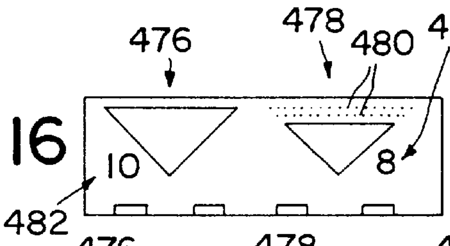
FIGS. 16–18 are each front views of the display screen of the hand-held controller showing various examples of graphical images and numerical data displayed on the display screen when any of the massage buttons are pressed to vibrate the associated bed frame sections.
Figure 17:
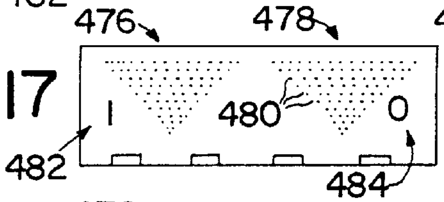
Figure 18:
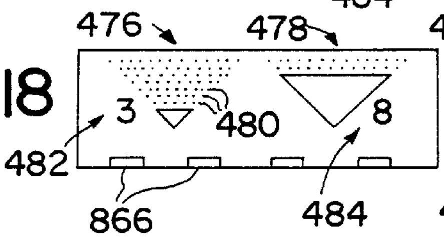

When any of massage buttons 288, 290, 292, 294 are pressed, microprocessor 88 sends appropriate signals so that a massage display screen, examples of which are shown in FIGS. 16–18, appears on display screen 86. The massage display screen includes a triangular, head-end bar graph 476 and a triangular, foot-end bar graph 478, each of which, in the illustrated embodiment, include ten rows of dots 480 that become filled to indicate the intensity at which massage motors 70, 72 operate. However, it is within the scope of the invention as presently perceived for microprocessor 88 to be programmed such that bar graphs 476, 478 have a shape other than triangular and have a pictorial representation different than rows of dots 480 that become filled.

The massage display screen further includes a head-end intensity level number 482 and a foot-end intensity level number 484, each of which vary between a lower limit, such as zero, when the respective massage motor 70, 72 is operating at a slowest speed, and an upper limit, such as ten or one hundred, when the respective massage motor 70, 72 is operating at a fastest speed. Thus, the massage display screen includes graphical images 476, 478 and numerical data 482, 484 that provide qualitative and quantitative feedback to the user regarding the operation of massage motors 70, 72 as shown in FIGS. 16–18.

Figure 19:
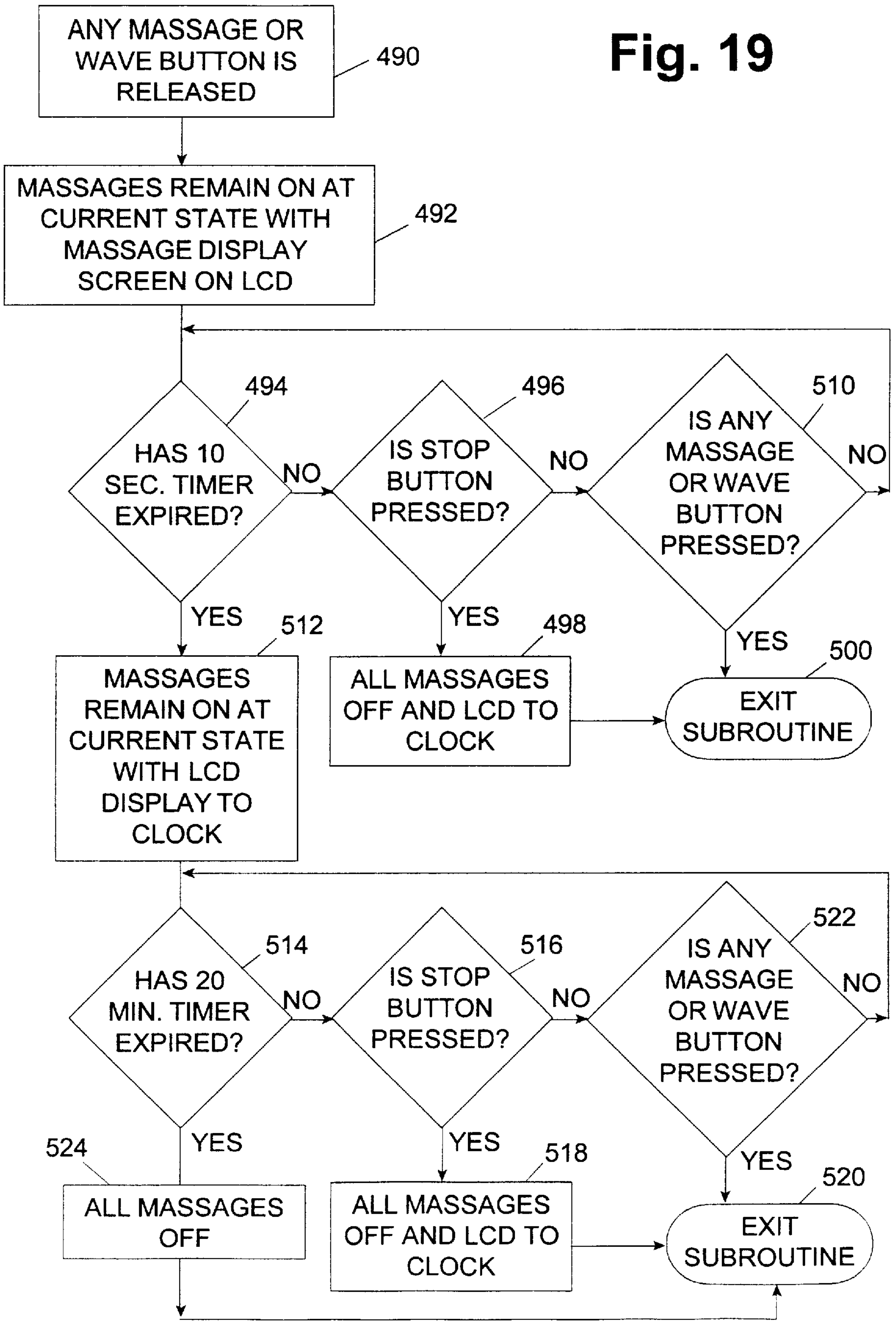
FIG. 19 is a flow chart showing the steps of a subroutine that is executed when any massage or wave button is released.

FIG. 19 is a flow chart of steps of a massage timer subroutine performed by microprocessor 88 when any of massage or wave buttons 288, 290, 292, 294, 296, 298 are released. As discussed below with reference to FIGS. 20–23, 27 and 28, massage motors 70, 72 are activated when the corresponding buttons 288, 290, 292, 294, 296, 298 are pressed. When any of buttons 288, 290, 292, 294, 296, 298 are released, as indicated at block 490 of FIG. 19, massage motors 70, 72 remain on at the current operational state with the massage display screen remaining on display screen 86 as indicated at block 492. Microprocessor 88 then determines at block 494 whether a ten second timer, which starts when any of buttons 288, 290, 292, 294, 296, are released, has expired. If microprocessor 88 determines at block 494 that the ten second timer has not expired, then microprocessor 88 determines at block 496 whether stop button 300 is pressed, and if so, microprocessor 88 sends appropriate signals so that motors 70, 72 turn off and so that the time-of-day 324 appears on display screen 86, as indicated at block 498, and then microprocessor 88 exits the massage timer subroutine of FIG. 19 as indicated at block 500.

If microprocessor 88 determines at block 496 that stop button 300 is not pressed, microprocessor 88 determines at block 510 whether any of buttons 288, 290, 292, 294, 296, 298 are pressed, and if so, microprocessor 88 exits the massage timer subroutine as indicated at block 500. If microprocessor 88 determines at block 510 that none of buttons 288, 290, 292, 294, 296, 298 are pressed, microprocessor 88 loops back to block 494. If microprocessor 88 determines at block 494 that the ten second timer has expired, motors 70, 72 remain on at the current operational state and the time-of-day 324 appears on display screen 86 as indicated at block 512.

After massage motors 70, 72 are operating with the time-of-day 324 appearing on display screen 86, microprocessor 88 determines at block 514 whether a twenty minute timer, which starts when any of buttons 288, 290, 292, 294, 296, 298 are released, has expired. If microprocessor 88 determines at block 514 that the twenty minute timer has not expired, then microprocessor 88 determines at block 516 whether stop button 300 is pressed, and if so, microprocessor 88 sends appropriate signals so that motors 70, 72 turn off and so that the time-of-day 324 appears on display screen 86, as indicated at block 518, and then microprocessor 88 exits the massage timer subroutine of FIG. 19 as indicated at block 520.

If microprocessor 88 determines at block 516 that stop button 300 is not pressed, microprocessor 88 determines at block 522 whether any of buttons 288, 290, 292, 294, 296, 298 are pressed, and if so, microprocessor 88 exits the massage timer subroutine as indicated at block 520. If microprocessor 88 determines at block 522 that none of buttons 288, 290, 292, 294, 296, 298 are pressed, microprocessor loops back to block 514. If microprocessor 88 determines at block 514 that the twenty minute timer has expired, microprocessor 88 sends appropriate signals so that motors 70, 72 turn off as indicated at block 524 and then microprocessor 88 exits the massage timer subroutine as indicated at block 520.

Figure 20:
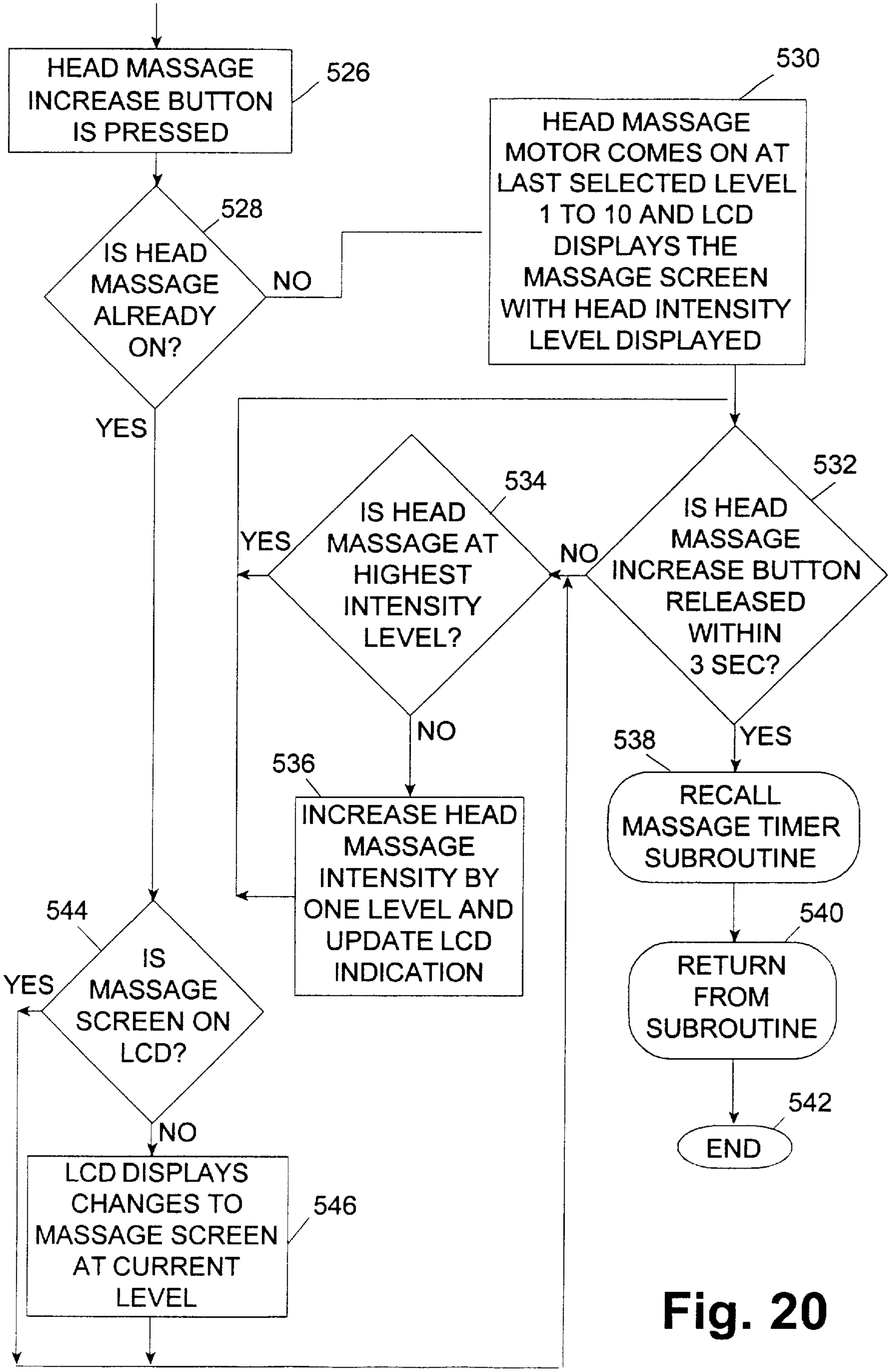
FIG. 20 is a flow chart showing the steps of a subroutine that is executed when a head-end massage increase button is pressed.

FIG. 20 is a flow chart of steps of a head massage increase subroutine performed by microprocessor 88 when head massage increase button 288 is pressed. When microprocessor 88 receives a signal that head massage increase button 288 is pressed as indicated at block 526, microprocessor 88 determines at block 528 whether head-end massage motor 70 is already on, and if not, microprocessor 88 sends the appropriate signals so that massage motor 70 comes on at the last selected level and so that the massage display screen appears on display screen 86 as indicated at block 530. Microprocessor 88 then determines at block 532 whether head massage increase button 288 has been released within three seconds.

If microprocessor 88 determines at block 532 that button 288 has not been released within three seconds, microprocessor 88 then determines at block 534 whether head-end massage motor 70 is operating at its highest intensity level and, if so, microprocessor loops back to block 532 as shown in FIG. 20. If microprocessor 88 determines at block 534 that motor 70 is not operating at its highest intensity level, microprocessor 88 sends the appropriate signals to increase the intensity at which motor 70 operates and correspondingly, updates bar graph 476 and head-end level intensity number 482, as indicated at block 536, and then microprocessor 88 loops back to block 532. If microprocessor 88 determines at block 532 that button 288 has been released within three seconds, microprocessor 88 recalls and runs the massage timer subroutine of FIG. 19 as indicated at block 538. After microprocessor 88 returns from running the massage timer subroutine of FIG. 19, as indicated at block 540, microprocessor 88 ends the head massage increase subroutine as indicated at block 542.

If microprocessor 88 determines at block 528 that head-end massage motor 70 is already on, microprocessor 88 then determines at block 544 whether the massage display screen appears on display screen 86 and if so, microprocessor 88 loops to block 534 and proceeds from block 534 in the manner described above. If microprocessor 88 determines at block 544 that the massage display screen does not appear on display screen 86, microprocessor 88 sends the appropriate signals so that the massage display screen appears on display screen 86, as indicated at block 546, and then microprocessor 88 loops to block 534 and proceeds from block 534 in the manner described above.

Figure 21:
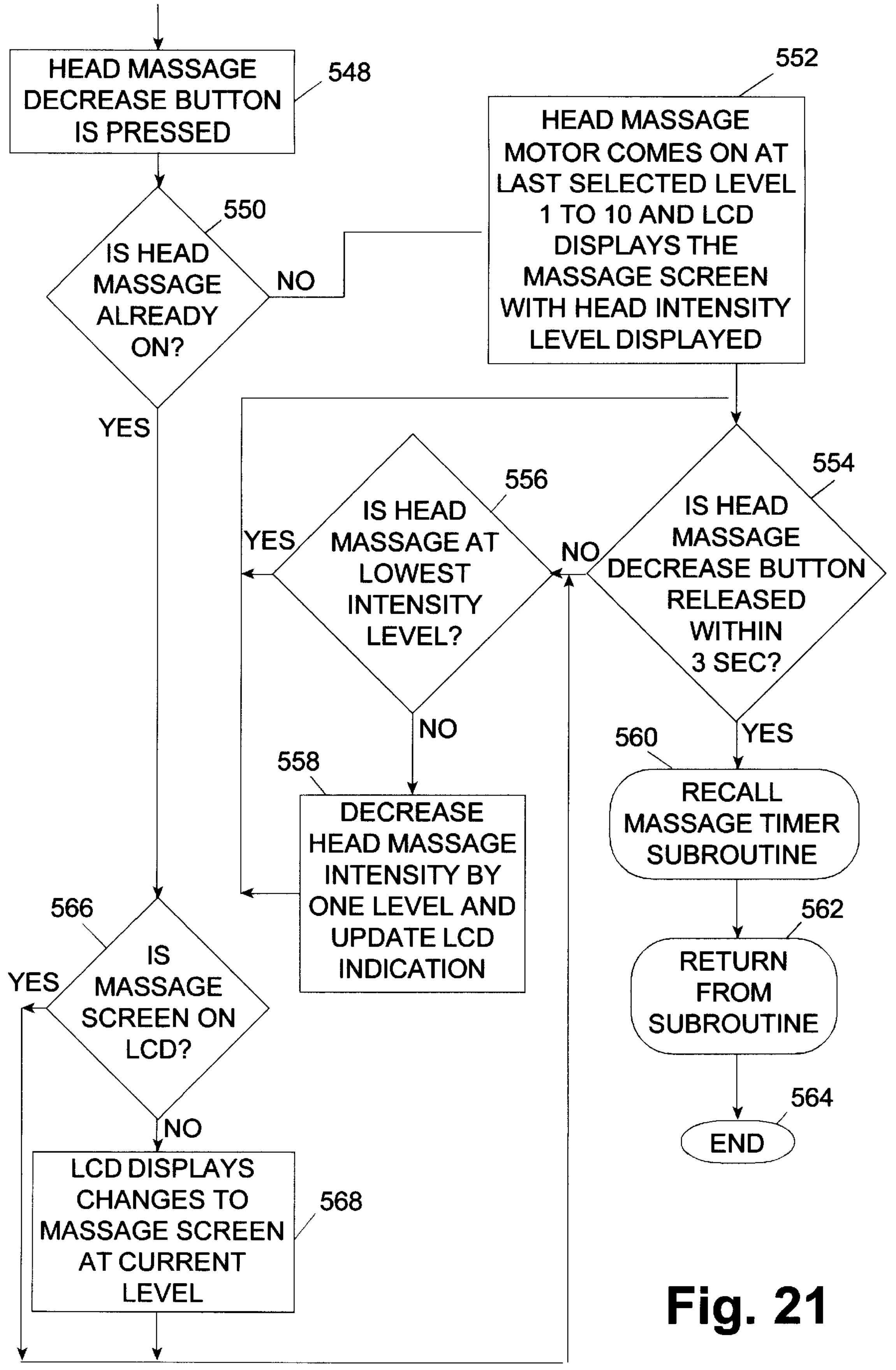
FIG. 21 is a flow chart showing the steps of a subroutine that is executed when a head-end massage decrease button is pressed.

FIG. 21 is a flow chart of steps of a head massage decrease subroutine performed by microprocessor 88 when head massage decrease button 290 is pressed. When microprocessor 88 receives a signal that head massage decrease button 290 is pressed as indicated at block 548, microprocessor 88 determines at block 550 whether head-end massage motor 70 is already on, and if not, microprocessor 88 sends the appropriate signals so that massage motor 70 comes on at the last selected level and so that the massage display screen appears on display screen 86 as indicated at block 552. Microprocessor 88 then determines at block 554 whether head massage decrease button 290 has been released within three seconds.

If microprocessor 88 determines at block 554 that button 290 has not been released within three seconds, microprocessor 88 then determines at block 556 whether head-end massage motor 70 is operating at its lowest intensity level and, if so, microprocessor loops back to block 554 as shown in FIG. 21. If microprocessor 88 determines at block 556 that motor 70 is not operating at its lowest intensity level, microprocessor 88 sends the appropriate signals to decrease the intensity at which motor 70 operates and correspondingly, updates bar graph 476 and head-end level intensity number 482, as indicated at block 558, and then microprocessor 88 loops back to block 554. If microprocessor 88 determines at block 554 that button 290 has been released within three seconds, microprocessor 88 recalls and runs the massage timer subroutine of FIG. 19 as indicated at block 560. After microprocessor 88 returns from running the massage timer subroutine of FIG. 19, as indicated at block 562, microprocessor 88 ends the head massage increase subroutine as indicated at block 564.

If microprocessor 88 determines at block 550 that head-end massage motor 70 is already on, microprocessor 88 then determines at block 566 whether the massage display screen appears on display screen 86 and if so, microprocessor 88 loops to block 556 and proceeds from block 556 in the manner described above. If microprocessor 88 determines at block 566 that the massage display screen does not appear on display screen 86, microprocessor 88 sends the appropriate signals so that the massage display screen appears on display screen 86, as indicated at block 568, and then microprocessor 88 loops to block 556 and proceeds from block 556 in the manner described above.

Figure 22:
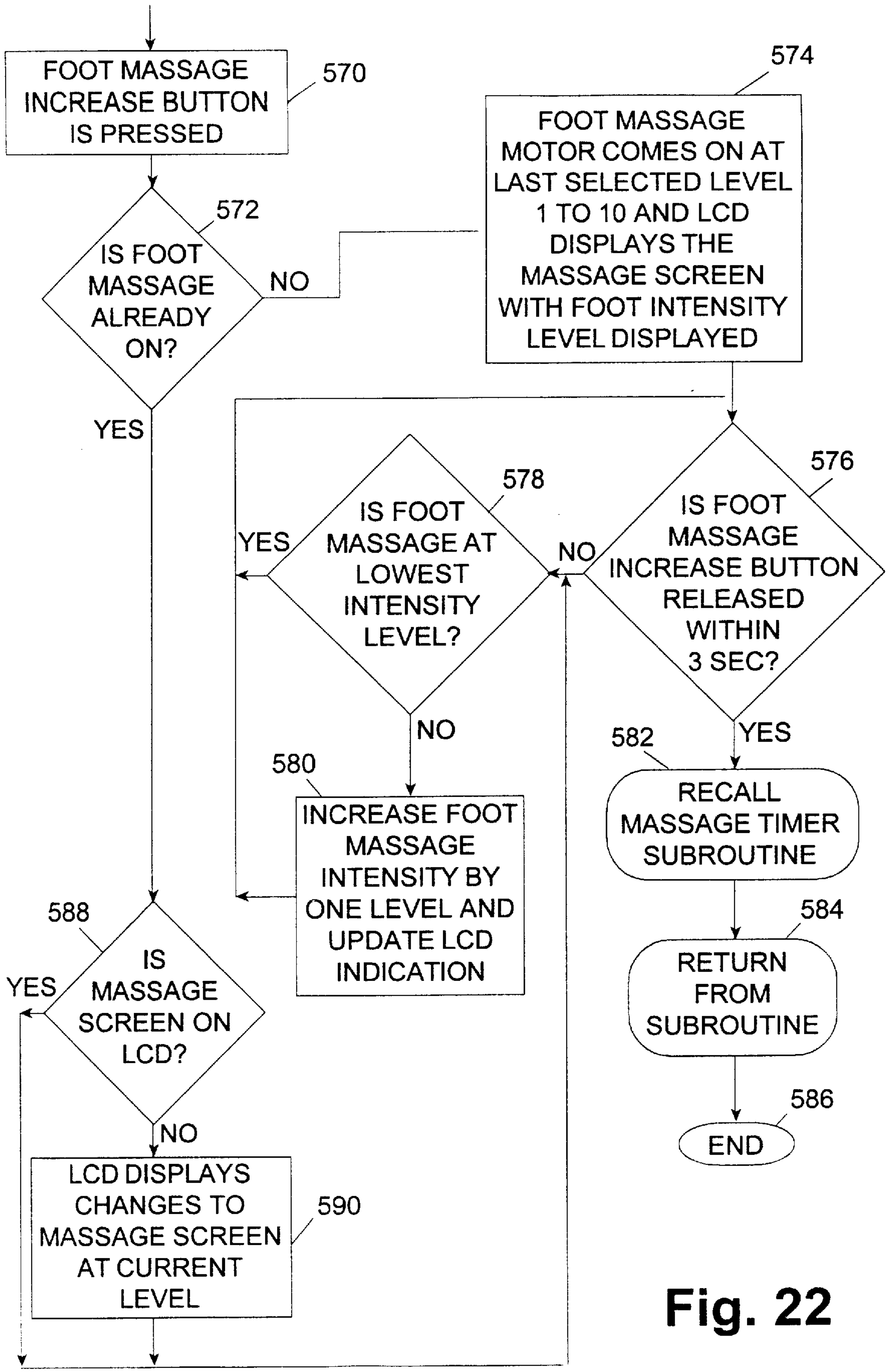
FIG. 22 is a flow chart showing the steps of a subroutine that is executed when a foot-end massage increase button is pressed.

FIG. 22 is a flow chart of steps of a foot massage increase subroutine performed by microprocessor 88 when foot massage increase button 292 is pressed. When microprocessor 88 receives a signal that foot massage increase button 292 is pressed as indicated at block 570, microprocessor 88 determines at block 572 whether foot-end massage motor 72 is already on, and if not, microprocessor 88 sends the appropriate signals so that massage motor 72 comes on at the last selected level and so that the massage display screen appears on display screen 86 as indicated at block 574. Microprocessor 88 then determines at block 576 whether foot massage increase button 292 has been released within three seconds.

If microprocessor 88 determines at block 576 that button 292 has not been released within three seconds, microprocessor 88 then determines at block 578 whether foot-end massage motor 72 is operating at its highest intensity level and, if so, microprocessor loops back to block 576 as shown in FIG. 22. If microprocessor 88 determines at block 578 that motor 72 is not operating at its highest intensity level, microprocessor 88 sends the appropriate signals to increase the intensity at which motor 72 operates and correspondingly, updates bar graph 476 and head-end level intensity number 482, as indicated at block 580, and then microprocessor 88 loops back to block 576. If microprocessor 88 determines at block 576 that button 292 has been released within three seconds, microprocessor 88 recalls and runs the massage timer subroutine of FIG. 19 as indicated at block 582. After microprocessor 88 returns from running the massage timer subroutine of FIG. 19, as indicated at block 584, microprocessor 88 ends the foot massage increase subroutine as indicated at block 586.

If microprocessor 88 determines at block 572 that foot-end massage motor 72 is already on, microprocessor 88 then determines at block 588 whether the massage display screen appears on display screen 86 and if so, microprocessor 88 loops to block 578 and proceeds from block 578 in the manner described above. If microprocessor 88 determines at block 588 that the massage display screen does not appear on display screen 86, microprocessor 88 sends the appropriate signals so that the massage display screen appears on display screen 86, as indicated at block 590, and then microprocessor 88 loops to block 578 and proceeds from block 578 in the manner described above.

Figure 23:
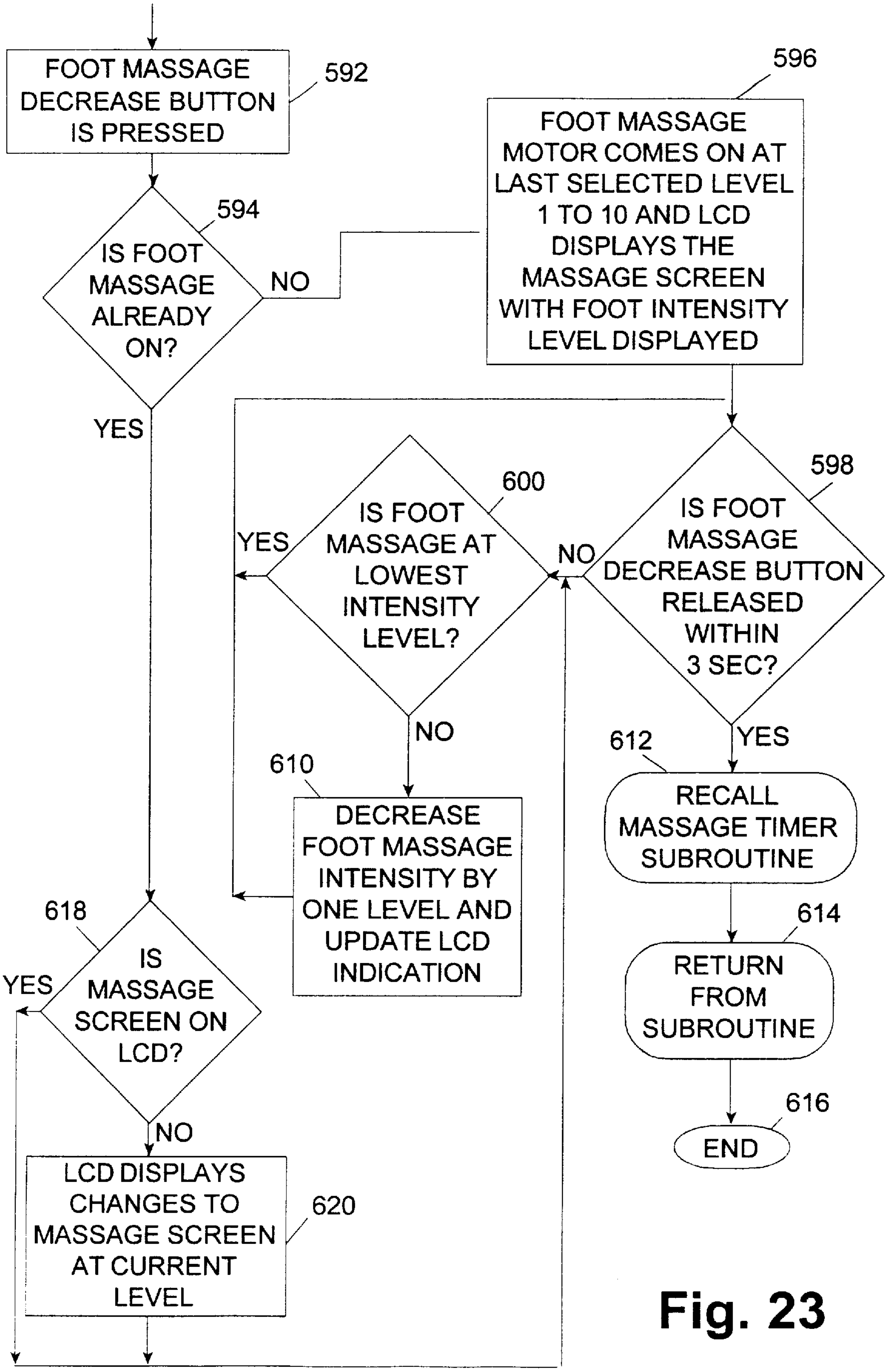
FIG. 23 is a flow chart showing the steps of a subroutine that is executed when a foot-end massage decrease button is pressed.

FIG. 23 is a flow chart of steps of a foot massage decrease subroutine performed by microprocessor 88 when foot massage decrease button 294 is pressed. When microprocessor 88 receives a signal that foot massage decrease button 294 is pressed as indicated at block 592, microprocessor 88 determines at block 594 whether foot-end massage motor 72 is already on, and if not, microprocessor 88 sends the appropriate signals so that massage motor 72 comes on at the last selected level and so that the massage display screen appears on display screen 86 as indicated at block 596. Microprocessor 88 then determines at block 598 whether foot massage decrease button 294 has been released within three seconds.

If microprocessor 88 determines at block 598 that button 294 has not been released within three seconds, microprocessor 88 then determines at block 600 whether foot-end massage motor 72 is operating at its lowest intensity level and, if so, microprocessor loops back to block 598 as shown in FIG. 23. If microprocessor 88 determines at block 600 that motor 72 is not operating at its lowest intensity level, microprocessor 88 sends the appropriate signals to decrease the intensity at which motor 72 operates and correspondingly, updates bar graph 476 and head-end level intensity number 482, as indicated at block 610, and then microprocessor 88 loops back to block 598. If microprocessor 88 determines at block 598 that button 294 has been released within three seconds, microprocessor 88 recalls and runs the massage timer subroutine of FIG. 19 as indicated at block 612. After microprocessor 88 returns from running the massage timer subroutine of FIG. 19, as indicated at block 614, microprocessor 88 ends the foot massage decrease subroutine as indicated at block 616.

If microprocessor 88 determines at block 594 that foot-end massage motor 72 is already on, microprocessor 88 then determines at block 618 whether the massage display screen appears on display screen 86 and if so, microprocessor 88 loops to block 600 and proceeds from block 578 in the manner described above. If microprocessor 88 determines at block 600 that the massage display screen does not appear on display screen 86, microprocessor 88 sends the appropriate signals so that the massage display screen appears on display screen 86, as indicated at block 620, and then microprocessor 88 loops to block 600 and proceeds from block 600 in the manner described above.

Figure 24:
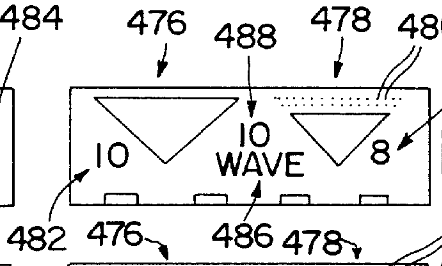
FIGS. 24–26 are each front views of the display screen of the hand-held controller showing various examples of graphical images and numerical data displayed on the display screen when any of the wave buttons are pressed to vibrate the associated bed frame sections.
Figure 25:
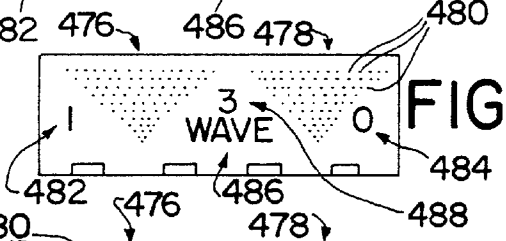
Figure 26:
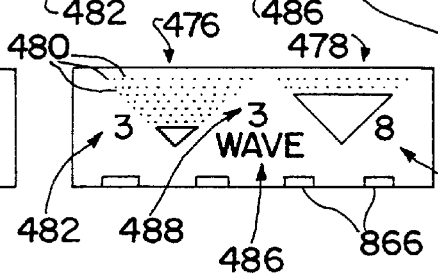

When either of wave buttons 296, 298 are pressed, microprocessor 88 sends appropriate signals so that the massage display screen, described above with reference to FIGS. 16–18, appears on display screen 86 along with wave mode information 486 as shown in FIGS. 24–26. The wave mode information 486 includes the word "WAVE" and a wave speed level number 488 thereabove. The wave speed level number 488 indicates the time period between the occurrences of the peak intensity levels of the respective massage motors 70, 72. The wave speed level number 488 may be programmed to vary between a lower limit, such as zero, when the time period between the occurrences of the peak intensity levels of massage motors 70, 72 is at a maximum, and an upper limit, such as ten or one hundred, when the time period between the occurrences of the peak intensity levels of massage motors 70, 72 is at a minimum. In alternative embodiments, bar graphs 476, 478 are programmed to pulse as the operational intensity of respective motors 70, 72 varies when operating in the wave mode.

Figure 27:
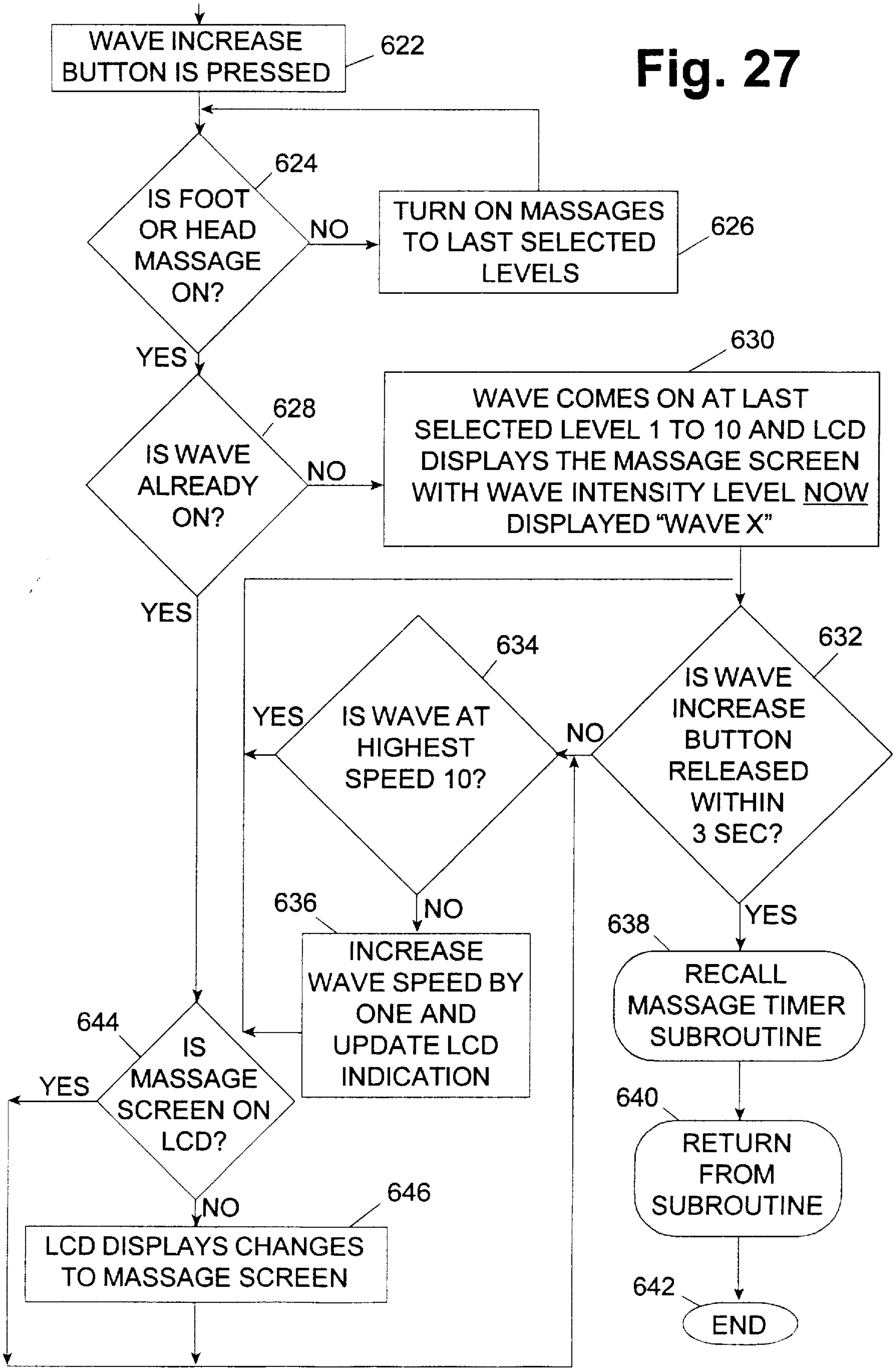
FIG. 27 is a flow chart showing the steps of a subroutine that is executed when a wave increase button is pressed.

FIG. 27 is a flow chart of steps of a wave increase subroutine performed by microprocessor 88 when wave increase button 296 is pressed. When microprocessor 88 receives a signal that wave increase button 296 is pressed as indicated at block 622, microprocessor determines at block 624 whether head-end and foot-end massage motors 70, 72 are already on, and if not, microprocessor 88 sends the appropriate signals so that massage motors 70, 72 turn on at the last selected levels as indicated at block 626. If microprocessor 88 determines at block 624 that motors 70, 72 are already on, microprocessor 88 then determines at block 628 whether motors 70, 72 are operating in the wave mode and if not, microprocessor 88 sends the appropriate signals so that motors 70, 72 are operated in the wave mode at the last selected speed level and so that the massage display screen appears on display screen 86 along with the wave speed as indicated at block 630. Microprocessor 88 then determines at block 632 whether wave increase button 296 has been released within three seconds.

If microprocessor 88 determines at block 632 that button 296 has not been released within three seconds, microprocessor 88 then determines at block 634 whether motors 70, 72 are alternately operating at the highest wave speed and, if so, microprocessor 88 loops back to block 632 as shown in FIG. 27. If microprocessor 88 determines at block 634 that motors 70, 72 are not alternately operating at the highest wave speed, microprocessor 88 sends the appropriate signals to increase the wave speed at which motors 70, 72 alternately operate and correspondingly, updates wave speed level number 488, as indicated at block 636, and then microprocessor 88 loops back to block 632. If microprocessor 88 determines at block 632 that button 296 has been released within three seconds, microprocessor 88 recalls and runs the massage timer subroutine of FIG. 19 as indicated at block 638. After microprocessor 88 returns from running the massage timer subroutine of FIG. 19, as indicated at block 640, microprocessor 88 ends the wave increase subroutine as indicated at block 642.

If microprocessor 88 determines at block 628 that motors 70, 72 are already operating in the wave mode, microprocessor 88 then determines at block 644 whether the massage display screen appears on display screen 86 and if so, microprocessor 88 loops to block 634 and proceeds from block 634 in the manner described above. If microprocessor 88 determines at block 644 that the massage display screen does not appear on display screen 86, microprocessor 88 sends the appropriate signals so that the massage display screen appears on display screen 86, as indicated at block 646, and then microprocessor 88 loops to block 634 and proceeds from block 634 in the manner described above.

Figure 28:
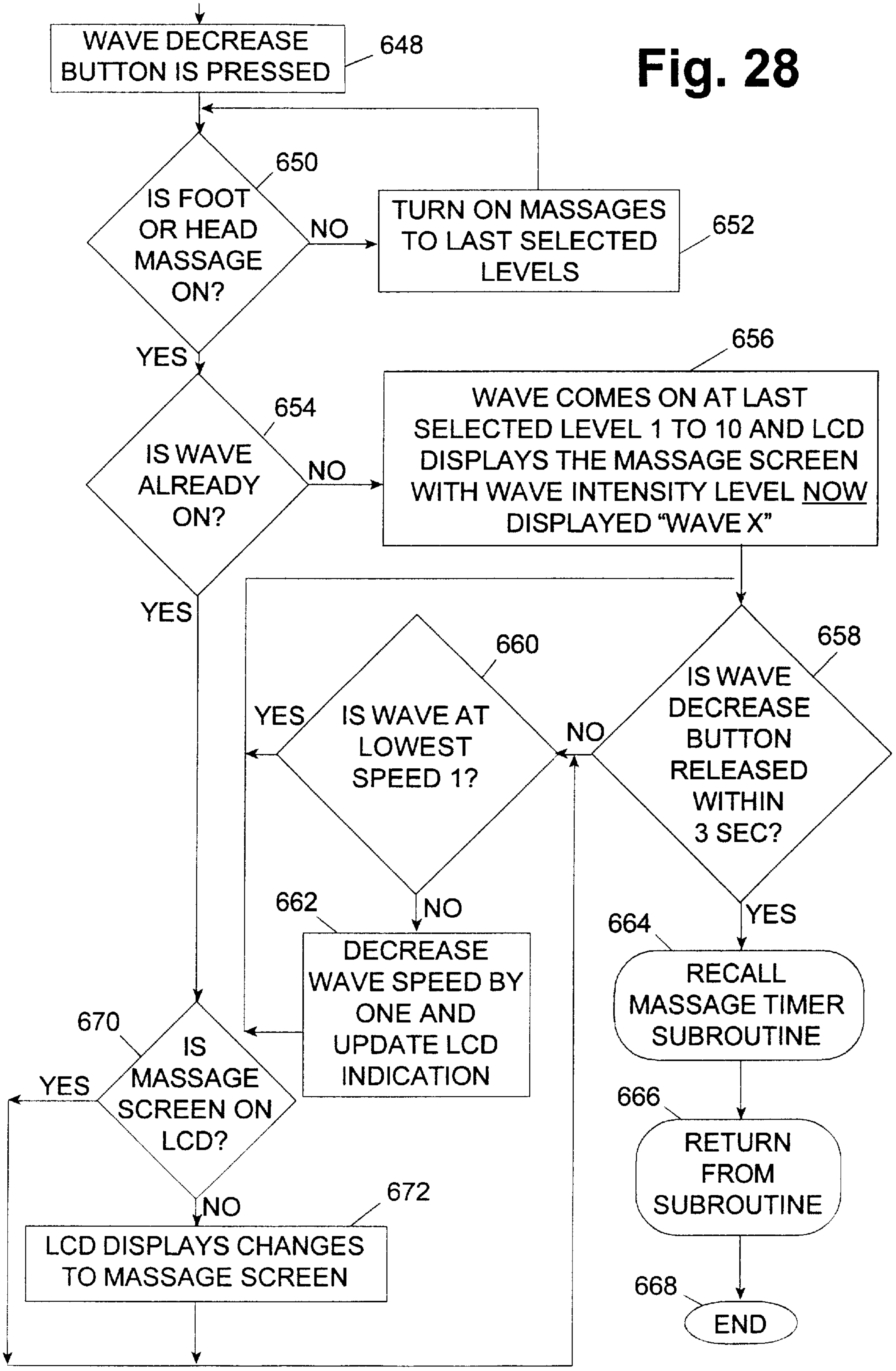
FIG. 28 is a flow chart showing the steps of a subroutine that is executed when a wave decrease button is pressed.

FIG. 28 is a flow chart of steps of a wave decrease subroutine performed by microprocessor 88 when wave decrease button 298 is pressed. When microprocessor 88 receives a signal that wave decrease button 298 is pressed as indicated at block 648, microprocessor determines at block 650 whether head-end and foot-end massage motors 70, 72 are already on, and if not, microprocessor 88 sends the appropriate signals so that massage motors 70, 72 turn on at the last selected levels as indicated at block 652. If microprocessor 88 determines at block 650 that motors 70, 72 are already on, microprocessor 88 then determines at block 654 whether motors 70, 72 are operating in the wave mode and if not, microprocessor 88 sends the appropriate signals so that motors 70, 72 are operated in the wave mode at the last selected speed level and so that the massage display screen appears on display screen 86 along with the wave speed as indicated at block 656. Microprocessor 88 then determines at block 658 whether wave decrease button 298 has been released within three seconds.

If microprocessor 88 determines at block 658 that button 298 has not been released within three seconds, microprocessor 88 then determines at block 660 whether motors 70, 72 are alternately operating at the lowest wave speed and, if so, microprocessor 88 loops back to block 658 as shown in FIG. 28. If microprocessor 88 determines at block 660 that motors 70, 72 are not alternately operating at the lowest wave speed, microprocessor 88 sends the appropriate signals to decrease the wave speed at which motors 70, 72 alternately operate and, correspondingly, updates wave speed level number 488, as indicated at block 662, and then microprocessor 88 loops back to block 658. If microprocessor 88 determines at block 658 that button 298 has been released within three seconds, microprocessor 88 recalls and runs the massage timer subroutine of FIG. 19 as indicated at block 664. After microprocessor 88 returns from running the massage timer subroutine of FIG. 19, as indicated at block

666, microprocessor 88 ends the wave increase subroutine as indicated at block 668.

If microprocessor 88 determines at block 654 that motors 70, 72 are already operating in the wave mode, microprocessor 88 then determines at block 670 whether the massage display screen appears on display screen 86 and if so, microprocessor 88 loops to block 660 and proceeds from block 660 in the manner described above. If microprocessor 88 determines at block 670 that the massage display screen does not appear on display screen 86, microprocessor 88 sends the appropriate signals so that the massage display screen appears on display screen 86, as indicated at block 672, and then microprocessor 88 loops to block 660 and proceeds from block 660 in the manner described above.

Figure 29:
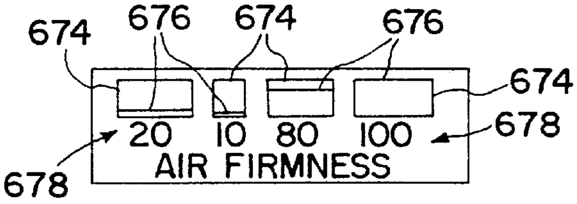
FIG. 29 is a front view of the display screen of the hand-held controller of FIG. 1 showing a fourth scene of the display screen including four rectangles representative of four zones of an air mattress, a solid-fill bar graph inside each respective rectangle indicating an inflation level of the associated air mattress zone, and a number beneath each respective rectangle indicating the inflation level of the associated air mattress zone.

When zone-selection button 310 is pressed, microprocessor 88 sends appropriate signals so that an air firmness screen, shown, for example, in FIG. 29, appears on display screen 86. The air firmness screen includes four rectangles or zone boxes 674, each of which correspond to a respective one of air bladders 74, 76, 78, 80. In the illustrated embodiment, the air firmness screen includes a solid-fill bar graph 676 in each of rectangles 674. The amount by which each bar graph 676 is "filled" represents the pressure level of the associated air bladder 74, 76, 78, 80. It is within the scope of the invention as presently perceived for microprocessor 88 to be programmed such that each of bar graphs 676 have a shape other than rectangular and have a pictorial representation other than solid-fill.

The air firmness screen further includes a set of air firmness numbers 678, each of which vary between a lower limit, such as zero, when the respective air bladder pressure is at a minimum, and an upper limit, such as ten or one hundred, when the respective air bladder pressure is at a maximum. Thus, the air firmness screen includes graphical images 674, 676 and numerical data 678 that provide qualitative and quantitative feedback to the user regarding the pressure levels of air bladders 74, 76, 78, 80.

Figure 30A:
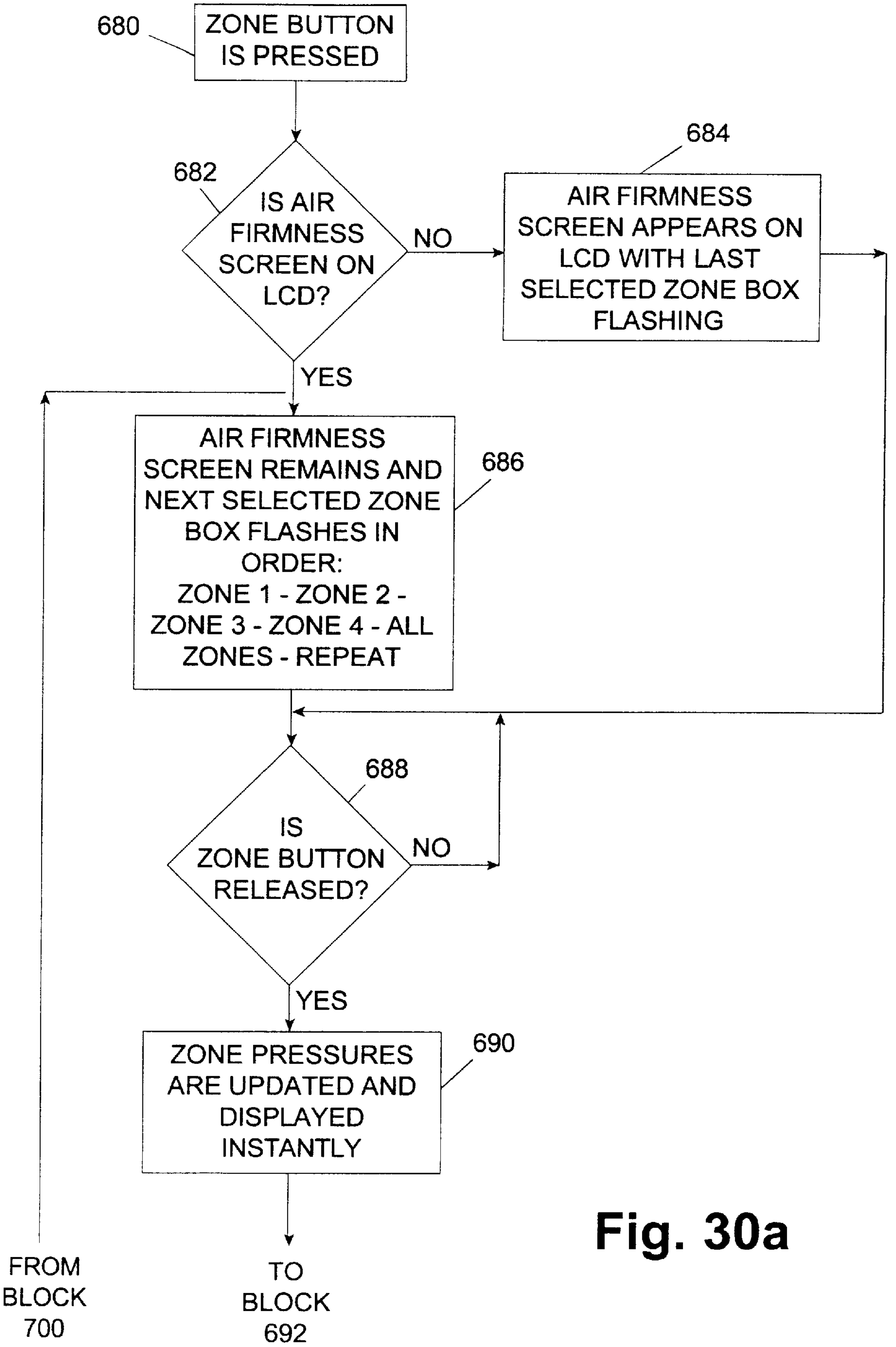
FIG. 30*a* is a flow chart showing some of the steps of a subroutine that is executed when the zone button is pressed.
Figure 30B:
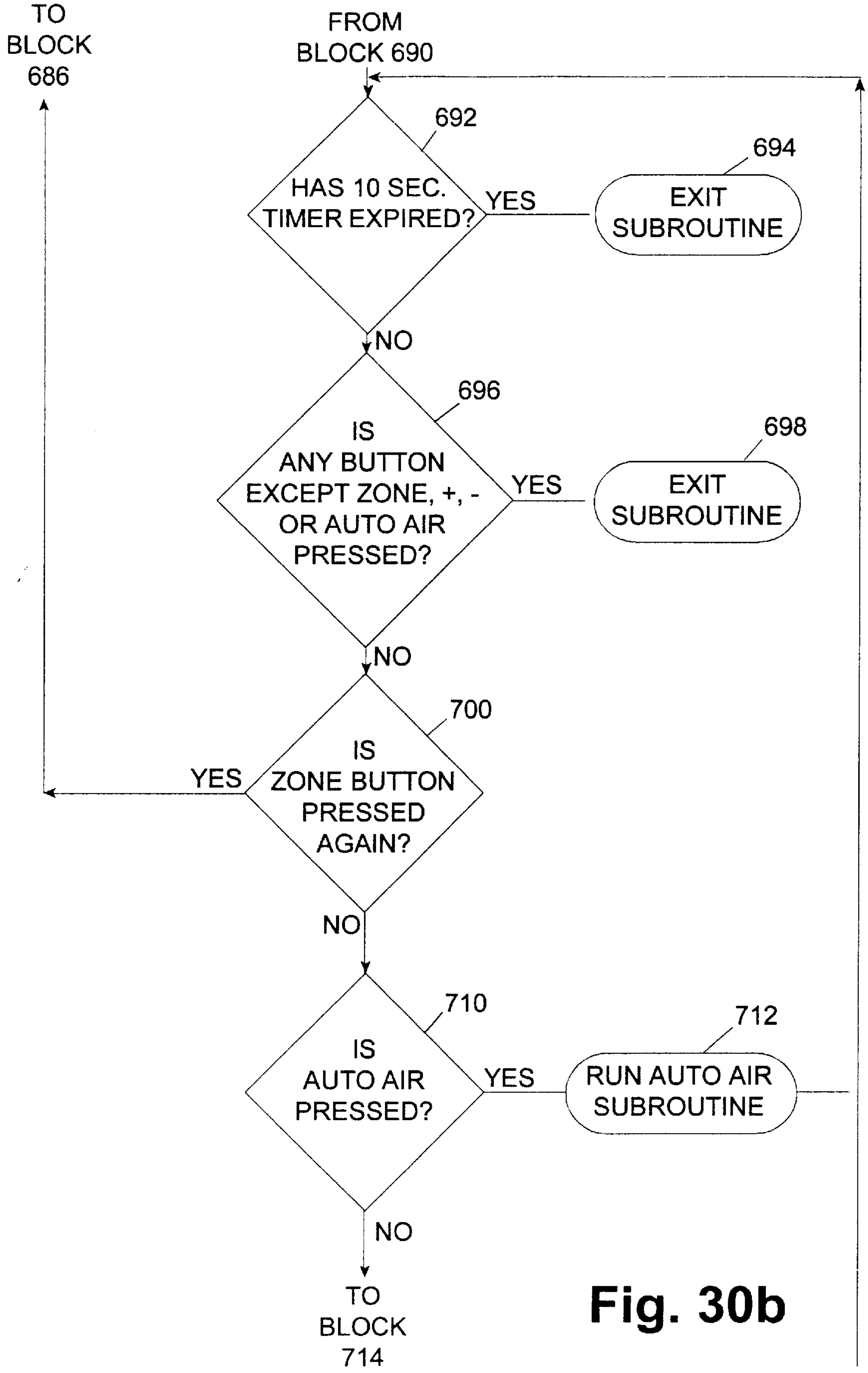
FIG. 30*b* is a flow chart showing some of the steps of a subroutine that is executed when the zone button is pressed.
Figure 30C:
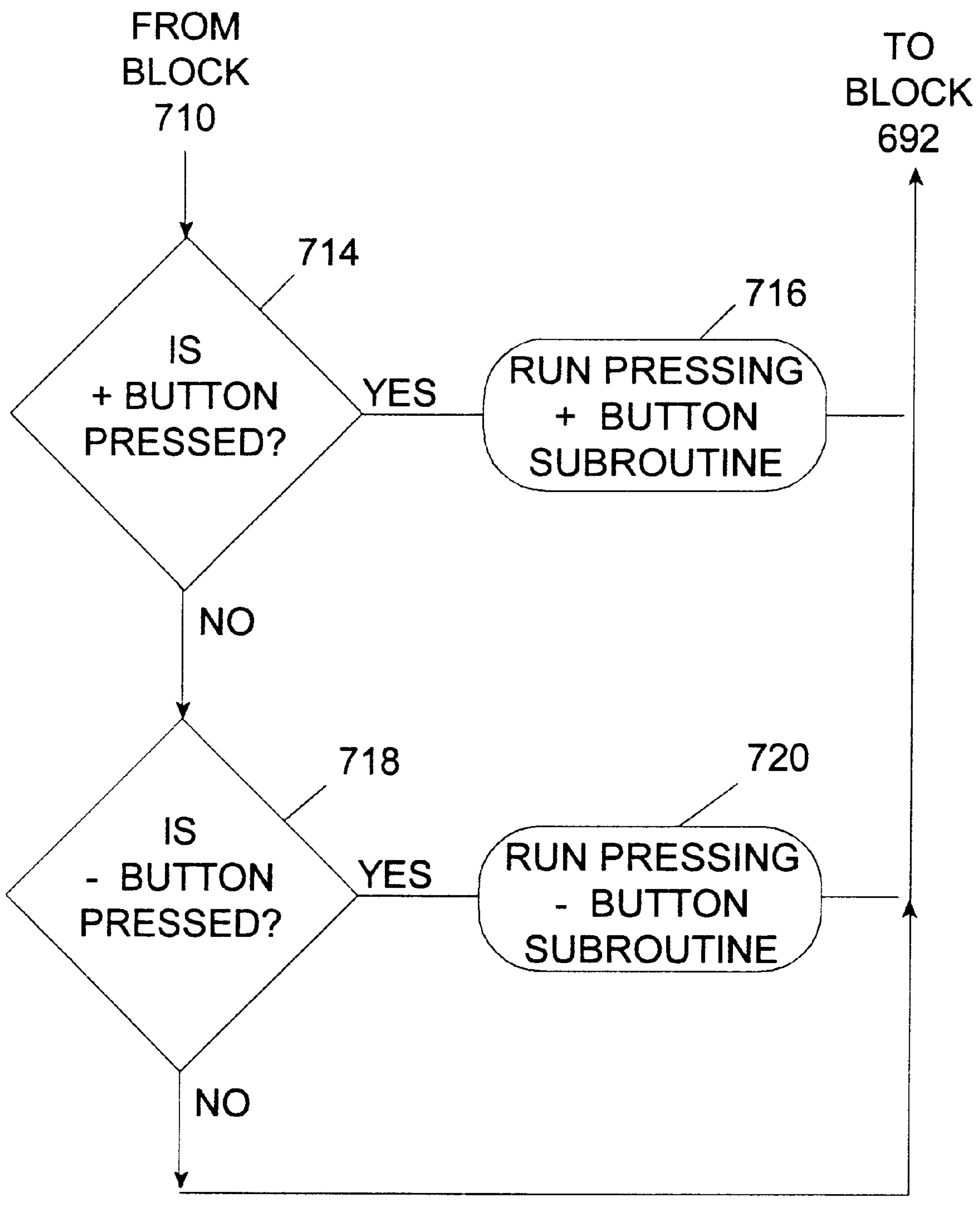
FIG. 30*c* is a flow chart showing some of the steps of a subroutine that is executed when the zone button is pressed.

FIGS. 30*a*, 30*b*, and 30*c* together show a flow chart of the steps that are performed by microprocessor 88 when zone-selection button 310 of hand-held controller 50 is pressed. After zone-selection button 310 is pressed, as indicated at block 680 of FIG. 30*a*, microprocessor 88 determines at block 682 whether the air firmness screen appears on display screen 86. If microprocessor 88 determines at block 682 that the air firmness screen does not appear on display screen 86, microprocessor 88 sends the appropriate signals so that the air firmness screen appears on display screen 86 with the last selected zone box 674 flashing as indicated at block 684. If microprocessor 88 determines at block 682 that the air firmness screen appears on display screen 86, microprocessor 88 continues to display the air firmness screen and microprocessor 88 sends the appropriate signals so that the next selected zone box 674 flashes.

If hand-held controller 50 is included in a king-size, twin-size, or full-size bed and mattress assembly, sequential momentary presses of zone-selection button 310 causes the following sequence of air bladder selections to take place: zone 1 (head), zone 2 (seat), zone 3 (thigh), zone 4 (foot), all zones (head, seat, thigh, foot). After all zones are selected, the next momentary press of zone-selection button 310 returns the sequence back to zone 1 (head). If hand-held controller 50 is included in a queen-size bed and mattress assembly, sequential momentary presses of zone-selection button 310 causes the following sequence of air bladder selections to take place: right-side zone 1 (head), right-side zone 2 (seat), right-side zone 3 (thigh), right-side zone 4 (foot), right-side all zones (head, seat, thigh, foot), left-side zone 1 (head), left-side zone 2 (seat), left-side zone 3 (thigh), left-side zone 4 (foot), and left-side all zones (head, seat, thigh, foot). After left-side all zones are selected, the next momentary press of zone-selection button 310 returns the sequence back to right-side zone 1 (head).

It should be understood that other sequences of zone selection are within the scope of the invention as presently perceived. In addition, in one alternative embodiment queen-size bed and mattress assembly, hand-held controller 50 is provided with a right-side/left-side switch that is movable to select which of the sets of air bladders are selected for pressure adjustment. In another alternative embodiment queen-size bed and mattress assembly, two hand-held controllers 50 are provided having one of the hand-held controllers 50 being a master controller capable of controlling all of the bed functions and the other of the hand-held controllers 50 being a slave controller capable only of adjusting pressure in the associated air bladders.

After microprocessor 88 executes either the steps associated with block 684 or the steps associated with block 686, microprocessor 88 then determines at block 688 whether zone-selection button 310 is released and if not, microprocessor 88 loops through block 688 until zone-selection button 310 is released. After button 310 is released, microprocessor 88 updates the bar graphs 676 and air firmness numbers 678 appearing on the air firmness screen as indicated at block 690.

After updating the air firmness screen at block 690, microprocessor 88 determines at block 692 of FIG. 30*b* whether a ten second timer, which starts each time zone-selection button 310 is released, has expired and if so, microprocessor 88 exits the zone selection subroutine of FIGS. 30*a*, 30*b*, 30*c* as indicated at block 694. If microprocessor 88 determines at block 692 that the ten second timer has not expired, microprocessor 88 determines at block 696 whether any buttons other than buttons 310, 312, 318 are pressed and if so, microprocessor 88 exits the zone selection subroutine as indicated at block 698. If microprocessor 88 determines at block 696 that no buttons other than buttons 310, 312, 318 are pressed, microprocessor 88 then determines at block 700 whether zone-selection 310 is pressed again and if so, microprocessor loops back to block 686 of FIG. 30*a* and proceeds from block 686 as previously described.

If microprocessor 88 determines at block 700 of FIG. 30*b* that zone-selection button 310 is not pressed again, microprocessor 88 then determines at block 710 whether auto air button 318 is pressed and if so, microprocessor 88 runs an auto air subroutine, as indicated at block 712 and as discussed below with reference to FIG. 33, and then microprocessor 88 loops back to block 692 as shown in FIG. 30*b*. If microprocessor 88 determines at block 710 that auto air button 318 is not pressed, microprocessor 88 then determines at block 714 whether plus side 314 of button 312 is pressed and if so, microprocessor 88 runs a plus button subroutine, as indicated at block 716 and as discussed below with reference to FIG. 31, and then microprocessor 88 loops back to block 692. If microprocessor 88 determines at block 714 that plus side 314 of button 312 is not pressed, microprocessor 88 then determines at block 718 whether minus side 316 of button 312 is pressed and if so, microprocessor 88 runs a minus button subroutine, as indicated at block 720 and as discussed below with reference to FIG. 32, and then microprocessor 88 loops back to block 692. If microprocessor 88 determines at block 718 that minus side 316 of button 312 is not pressed, microprocessor 88 loops back to block 692.

Figure 31:
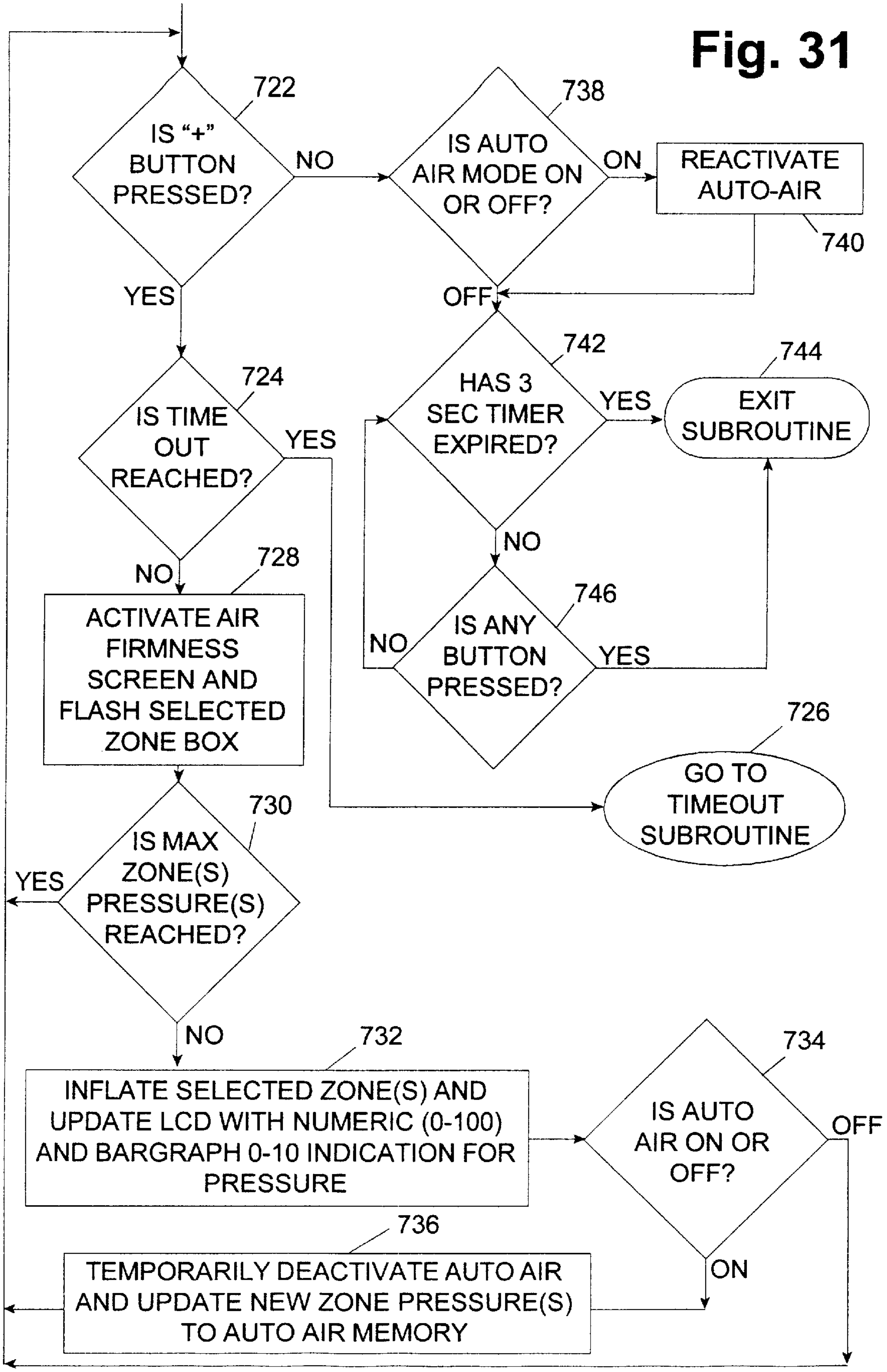
FIG. 31 is a flow chart showing the steps of a subroutine that is executed when the firm(+)/soft(−) button is pressed to increase pressure of a selected air mattress zone.

FIG. 31 is a flow chart of steps of a plus button subroutine executed by microprocessor 88 when the plus side 314 of button 312 is pressed to increase pressure of a selected air bladder 74, 76, 78, 80. As indicated at block 722, microprocessor 88 determines whether plus side 314 of button 312 is pressed, which will be the case when the plus button subroutine of FIG. 31 is called initially and thus, microprocessor 88 proceeds to block 724 to determine whether a time out condition has been reached. If microprocessor 88 determines at block 724 that the time out condition has been reached, microprocessor calls a time out subroutine (not shown) as indicated at block 726.

The time out subroutine is programmed to occur if an air system leak exists or if an overrun of any air function occurs. If microprocessors 134, 234 are signaled that air compressor 138 has been operating continuously or that valves 142, 146, 242, 246 have been energized continuously for a preset period of time, such as seven minutes, or for a duty cycle of fifty per cent or greater for a specified period of time, microprocessors 134, 234 send the appropriate signals to shut down the air system. The other functions of the associated bed and mattress assembly continue to be operable during the time out subroutine. Either one or both of microprocessors 134, 234 send a signal to microprocessor 88 to flash the words "Air System Fault" on display screen 86 while the time out subroutine is running.

If microprocessor 88 determines at block 724 that the time out condition has not been reached, microprocessor 88 sends the appropriate signals so that the air firmness screen appears on display screen 86 and so that the zone box 674 of the selected air bladder or air bladders 74, 76, 78, 80 flashes as indicated at block 728. After executing the steps associated with block 728, microprocessor 88 determines at block 730 whether the pressure(s) of the selected air bladder (s) are at a maximum pressure, and if so, microprocessor loops back to block 722 as shown in FIG. 31.

If microprocessor 88 determines at 730 that the pressure (s) of the selected air bladder(s) is/are not at the maximum pressure(s), microprocessor 88 sends the appropriate signals so that the selected air bladder(s) 74, 76, 78, 80 are inflated and so that bar graphs 676 and air firmness numbers 678 of the air pressure screen are updated as indicated at block 732. After microprocessor 88 executes the steps associated with block 732, microprocessor 88 then determines at block 734 whether an auto air function of the associated bed and mattress assembly is on or off. If microprocessor 88 determines at block 734 that the auto air function, which is discussed below with reference to FIG. 33, is off, microprocessor 88 loops back to block 722 as shown in FIG. 31. If microprocessor 88 determines at block 734 that the auto air function is on, microprocessor 88 sends the appropriate signals at block 736 so that the auto air function is deactivated temporarily and so that the new air bladder pressure settings are stored in auto air memory, which includes respective portions of memories 136, 236, and then microprocessor 88 loops back to block 722.

If microprocessor 88 determines at block 722 that plus side 314 of button 312 is not pressed, microprocessor 88 then determines at block 738 whether the auto air function is set to on or off. If microprocessor 88 determines at block 738 that the auto air function is set to on, microprocessor 88 sends the appropriate signals to reactivate the auto air function as indicated at block 740. If microprocessor 88 determines at block 738 that the auto air function is set to off or after the auto air function is reactivated at block 740, microprocessor 88 determines at block 742 whether a three second timer, which starts when plus side 314 of button 312 is pressed, has expired and if so, microprocessor 88 exits the plus button subroutine as indicated at block 744. If microprocessor 88 determines at block 742 that the three second timer has not expired, microprocessor 88 then determines at block 746 whether any button is pressed and if so, microprocessor 88 exits the plus button subroutine as indicated at block 744. If microprocessor 88 determines at block 746 that no buttons are pressed, microprocessor 88 loops back to block 742 as shown in FIG. 31.

Figure 32:
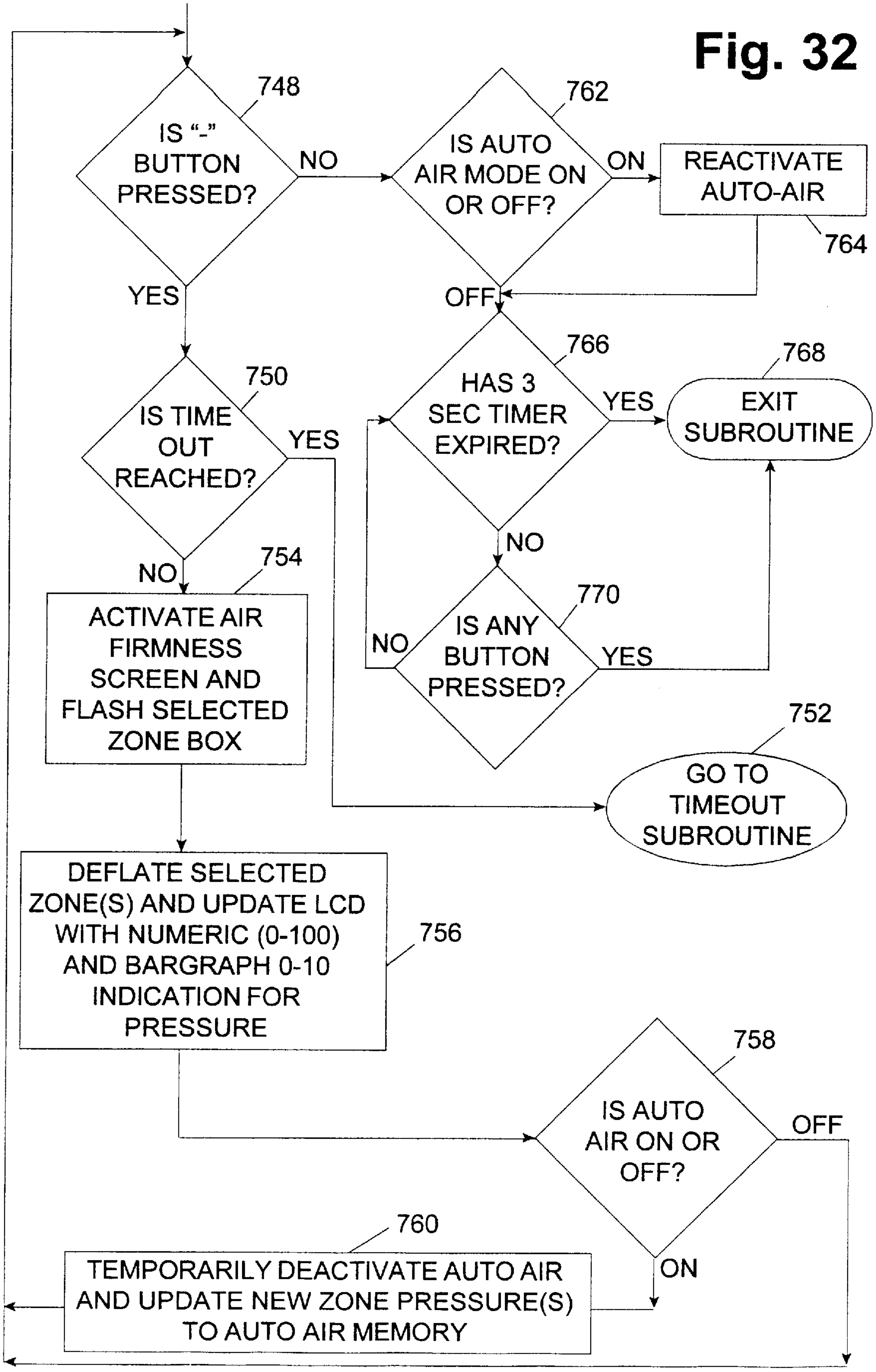
FIG. 32 is a flow chart showing the steps of a subroutine that is executed when the firm(+)/soft(−) button is pressed to decrease pressure of a selected air mattress zone.

FIG. 32 is a flow chart of steps of a minus button subroutine executed by microprocessor 88 when the minus side 316 of button 312 is pressed to decrease pressure of a selected air bladder 74, 76, 78, 80. As indicated at block 748, microprocessor 88 determines whether minus side 316 of button 312 is pressed, which will be the case when the minus button subroutine of FIG. 32 is called initially and thus, microprocessor 88 proceeds to block 750 to determine whether the time out condition has been reached. If microprocessor 88 determines at block 750 that the time out condition has been reached, microprocessor calls the time out subroutine (not shown) as indicated at block 752 and as discussed above with reference to FIG. 31.

If microprocessor 88 determines at block 750 that the time out condition has not been reached, microprocessor 88 sends the appropriate signals so that the air firmness screen appears on display screen 86 and so that the zone box 674 of the selected air bladder or air bladders 74, 76, 78, 80 flashes as indicated at block 754. After executing the steps associated with block 754, microprocessor 88 sends the appropriate signals so that the selected air bladder(s) 74, 76, 78, 80 are deflated and so that bar graphs 676 and air firmness numbers 678 of the air pressure screen are updated as indicated at block 756. After microprocessor 88 executes the steps associated with block 756, microprocessor 88 then determines at block 758 whether the auto air function is on or off. If microprocessor 88 determines at block 758 that the auto air function is off, microprocessor 88 loops back to block 748 as shown in FIG. 32. If microprocessor 88 determines at block 758 that the auto air function is on, microprocessor 88 sends the appropriate signals at block 760 so that the auto air function is deactivated temporarily and so that the new air bladder pressure settings are stored in auto air memory, which includes respective portions of memories 136, 236 as previously described, and then microprocessor 88 loops back to block 748.

If microprocessor 88 determines at block 748 that minus side 316 of button 312 is not pressed, microprocessor 88 then determines at block 762 whether the auto air function is set to on or off. If microprocessor 88 determines at block 762 that the auto air function is set to on, microprocessor 88 sends the appropriate signals to reactivate the auto air function as indicated at block 764. If microprocessor 88 determines at block 762 that the auto air function is set to off or after the auto air function is reactivated at block 764, microprocessor 88 determines at block 766 whether a three second timer, which starts when minus side 316 of button 312 is pressed, has expired and if so, microprocessor 88 exits the minus button subroutine as indicated at block 768. If microprocessor 88 determines at block 766 that the three second timer has not expired, microprocessor 88 then determines at block 770 whether any button is pressed and if so, microprocessor 88 exits the minus button subroutine as indicated at block 768. If microprocessor 88 determines at block 770 that no buttons are pressed, microprocessor 88 loops back to block 766 as shown in FIG. 32.

Figure 33:
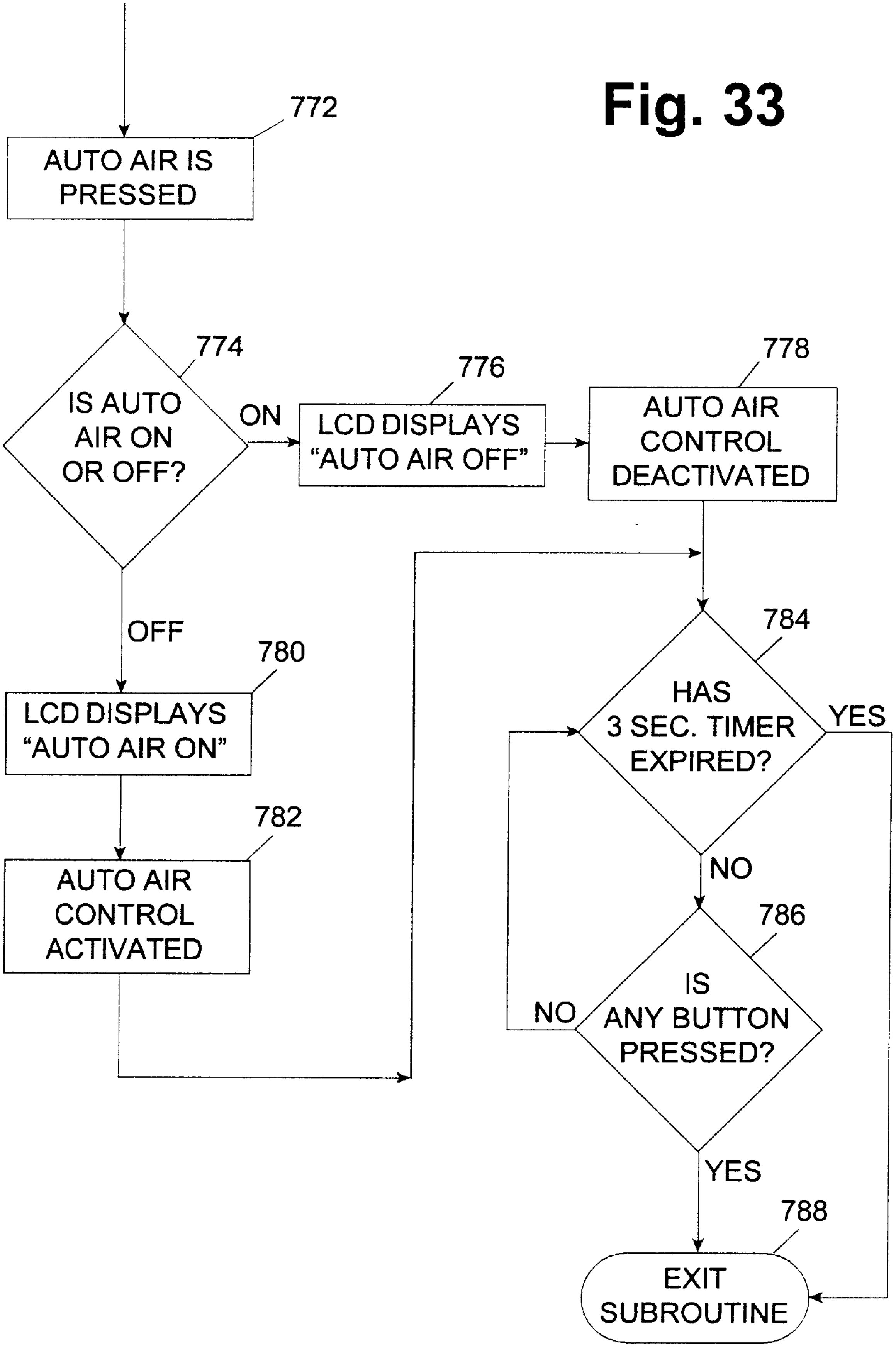
FIG. 33 is a flow chart showing the steps of a subroutine that is executed when the auto air button is pressed.

FIG. 33 is a flow chart of the steps of an auto air subroutine that is executed by microprocessor 88 when auto air button 318 is pressed. After auto air button 318 is pressed, as indicated at block 772 of FIG. 33, microprocessor 88 determines at block 774 whether the auto air function is on or off. When the auto air function is on, microprocessors 134, 234 receive feedback pressure signals from respective pressure sensors 148, 248 and then, based on the pressure signals, microprocessors 134, 234 send the appropriate signals to adjust valves 144, 146, 244, 246 and to operate air compressor 138 so that selected pressure levels are maintained in air bladders 74, 76, 78, 80.

If microprocessor 88 determines at block 774 that the auto air function is on, microprocessor 88 sends the appropriate signals so that the words "AUTO AIR OFF" appears on display screen 86, as indicated at block 776, and then microprocessor 88 sends the appropriate signals to microprocessors 134, 234 which, in turn, deactivate the auto air function, as indicated at block 778. If microprocessor 88 determines at block 774 that the auto air function is off, microprocessor 88 sends the appropriate signals so that the words "AUTO AIR ON" appears on display screen 86, as indicated at block 780, and then microprocessor 88 sends the appropriate signals to microprocessors 134, 234 which, in turn, activate the auto air function, as indicated at block 782.

After microprocessor 88 either deactivates the auto air function at block 778 or activates the auto air function at block 782, microprocessor 88 then determines at block 784 whether a three second timer, which starts when auto air button 318 is pressed, has expired and if so, microprocessor 88 exits the auto air subroutine as indicated at block 788. If microprocessor 88 determines at block 784 that the three second timer has not expired, microprocessor 88 then determines at block 786 whether any button is pressed, and if so, microprocessor exits the auto air subroutine as indicated at block 788. If microprocessor 88 determines at block 786 that no buttons are pressed, microprocessor 88 then loops back to block 784. Thus, pressing the auto air button 318 when the auto air function is on, turns the auto air function off, and pressing the auto air button 318 when the auto air function is off, turns the auto air function on.

Hand-held controller 50 includes memory buttons 270, 272, 274 and set button 322 as previously described. Hand-held controller 50 also includes mode indicia 266, which indicate the various programming modes of hand-held controller 50, and mode button 320. Depending on the sequence of button presses of mode and set buttons 320, 322, as well as button presses of other appropriate buttons of hand-held controller 50, various functions of the associated bed and mattress assembly 52 are programmed.

Figure 34A:
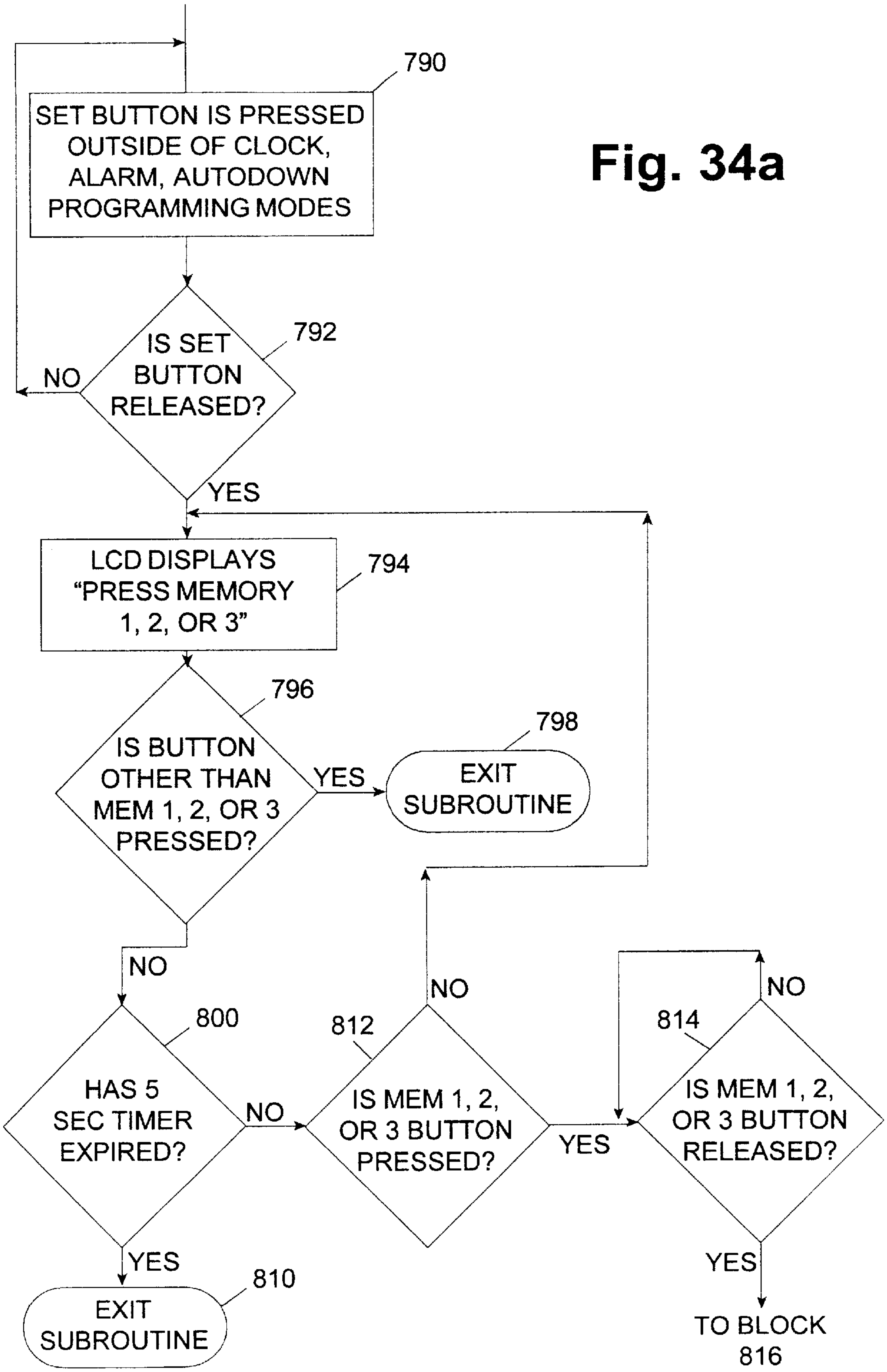
FIG. 34*a* is a flow chart showing some of the steps of a subroutine that is executed when the set button and one of the memory buttons are pressed to store bed and mattress assembly settings in memory.
Figure 34B:
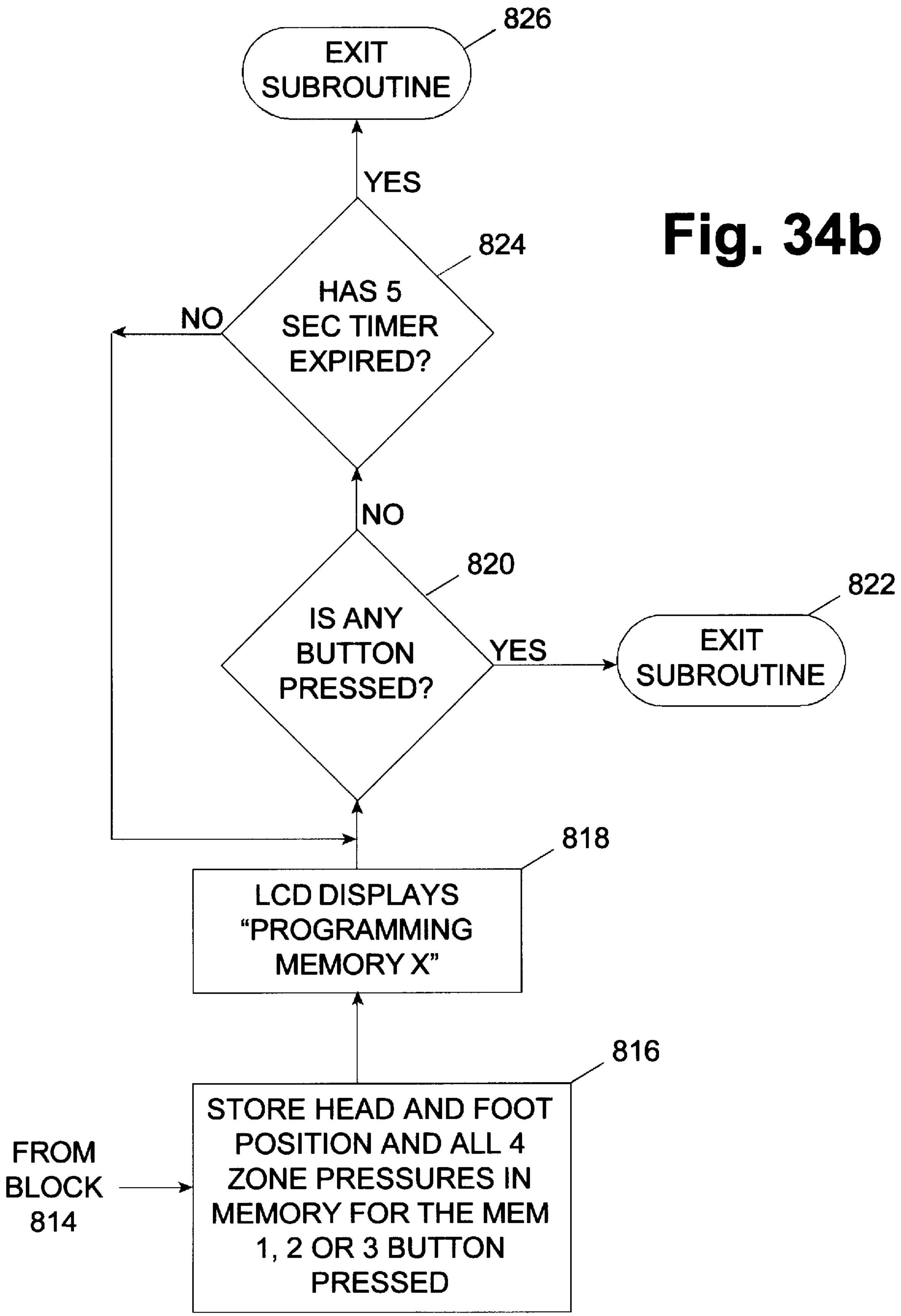
FIG. 34*b* is a flow chart showing some of the steps of a subroutine that is executed when the set button and one of the memory buttons are pressed to store bed and mattress assembly settings in memory.

FIGS. 34*a* and 34*b* together are a flow chart of the steps performed by microprocessor 88 when set button 322 and one of memory buttons 270, 272, 274 are pressed to store in memory 96 the settings related to the position of frame sections 91, 93 and related to the pressures within air bladders 74, 76, 78, 80. After set button 322 is pressed outside of the programming modes, as indicated at block 790 of FIG. 34*a*, microprocessor 88 determines at block 792 whether set button 322 is released and if not, microprocessor 88 loops through blocks 790, 792 until set button 322 is released. After set button 322 is released, microprocessor 88 sends the appropriate signals so that the message "PRESS MEMORY 1, 2, OR 3" appears on display screen 86, as indicated at block 794, and then microprocessor 88 determines at block 796 whether a button other than one of memory buttons 270, 272, 274 are pressed.

If microprocessor 88 determines at block 796 that a button other than one of memory buttons 270, 272, 274 is pressed, microprocessor 88 exits the subroutine of FIGS. 34*a* and 34*b* as indicated at block 798. If microprocessor 88 determines at block 796 that a button other than memory buttons 270, 272, 274 is not pressed, microprocessor then determines at block 800 whether a five second timer, which starts when set button 322 is released, has expired and if so, microprocessor 88 exits the subroutine of FIGS. 34*a* and 34*b* as indicated at block 810. If microprocessor 88 determines at block 800 that the five second timer has not expired, microprocessor 88 then determines at block 812 whether one of memory buttons 270, 272, 274 is pressed, and if not, microprocessor 88 loops back to block 794 as shown in FIG. 34*a*.

If microprocessor 88 determines at block 812 that one of memory buttons 270, 272, 274 is pressed, microprocessor 88 determines at block 814 whether the pressed one of memory buttons 270, 272, 274 is released and if not, microprocessor 88 loops through block 814 until the pressed one of memory buttons 270, 272, 274 is released. After the pressed one of memory buttons 270, 272, 274 is released, as determined by microprocessor 88 at block 814, microprocessor 88 stores in memory 96 the position of frame sections 91, 93 and the pressures within air bladders 74, 76, 78, 80 for the memory button 270, 272, 274 pressed as indicated at block 816 of FIG. 34*b*. In the illustrated embodiment bed and mattress assembly 52, the position of frame sections 91, 93 is based upon feedback information received from actuators 60, 61 relating to the position of an output component of the respective actuator 60, 61.

After microprocessor 88 performs the steps associated with block 816, microprocessor 88 sends the appropriate signals so that the message "PROGRAMMING MEMORY X" (X being 1 if button 270 is pressed, 2 if button 272 is pressed, and 3 if button 274 is pressed) appears on display screen 86 as indicated at block 818, and then microprocessor 88 determines at block 820 whether any button is pressed while memory 96 is being programmed. If a button is pressed while memory 96 is being programmed, microprocessor 88 exits the subroutine of FIGS. 34*a* and 34*b* as indicated at block 822. If microprocessor 88 determines at block 820 that a button is not pressed, microprocessor 88 then determines at block 824 whether a five second timer, which starts when the pressed one of buttons 270, 272, 274 is released, has expired and if so, microprocessor 88 exits the subroutine of FIGS. 34*a* and 34*b* as indicated at block 826. If microprocessor 88 determines at block 824 that the five second timer has not expired, microprocessor 88 then loops back to block 820 as shown in FIG. 34*b*.

Figure 35A:
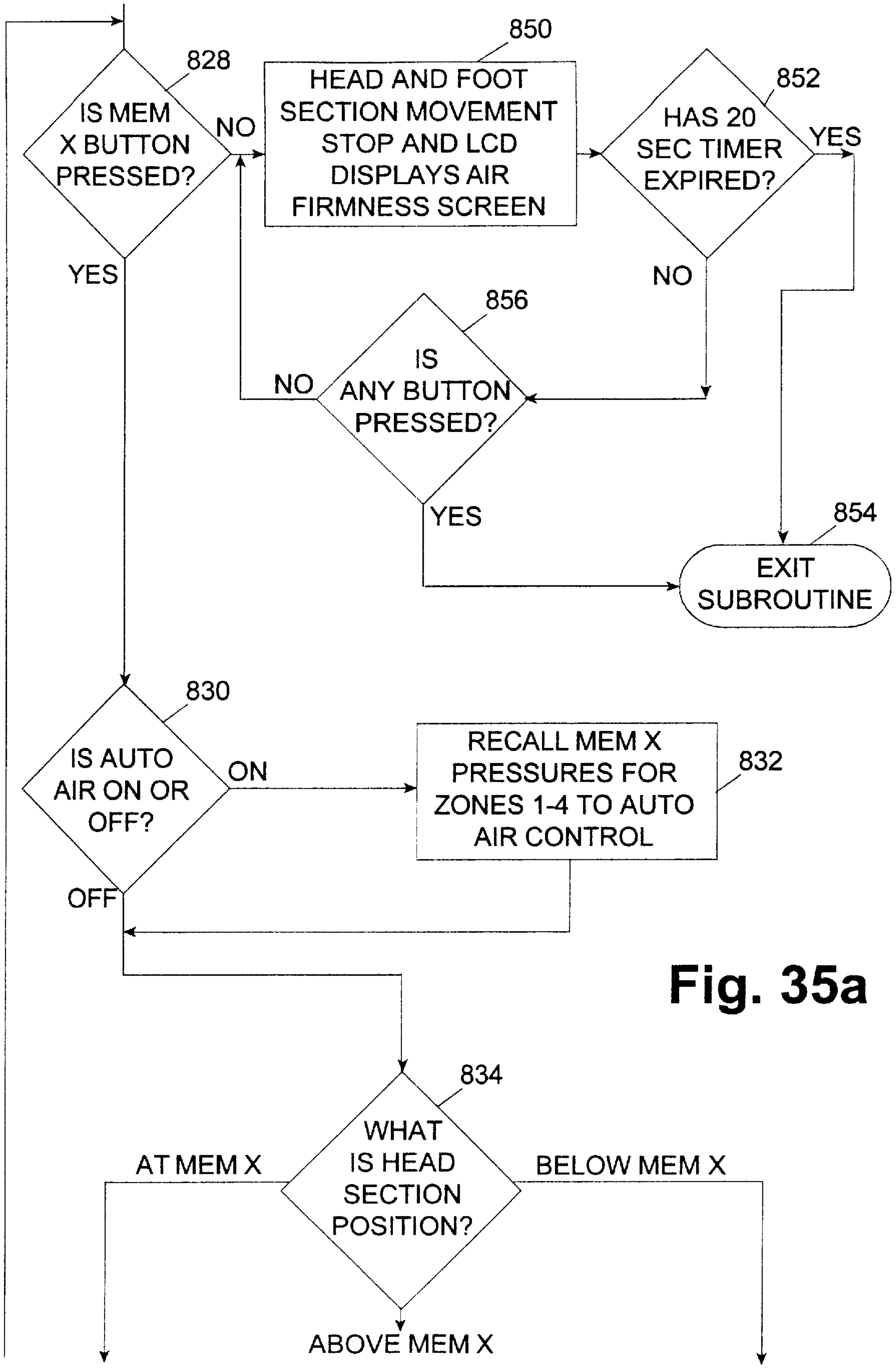
FIG. 35*a* is a flow chart showing some of the steps of a subroutine that is executed when one of the memory buttons is pressed to recall bed and mattress settings stored in memory.
Figure 35B:
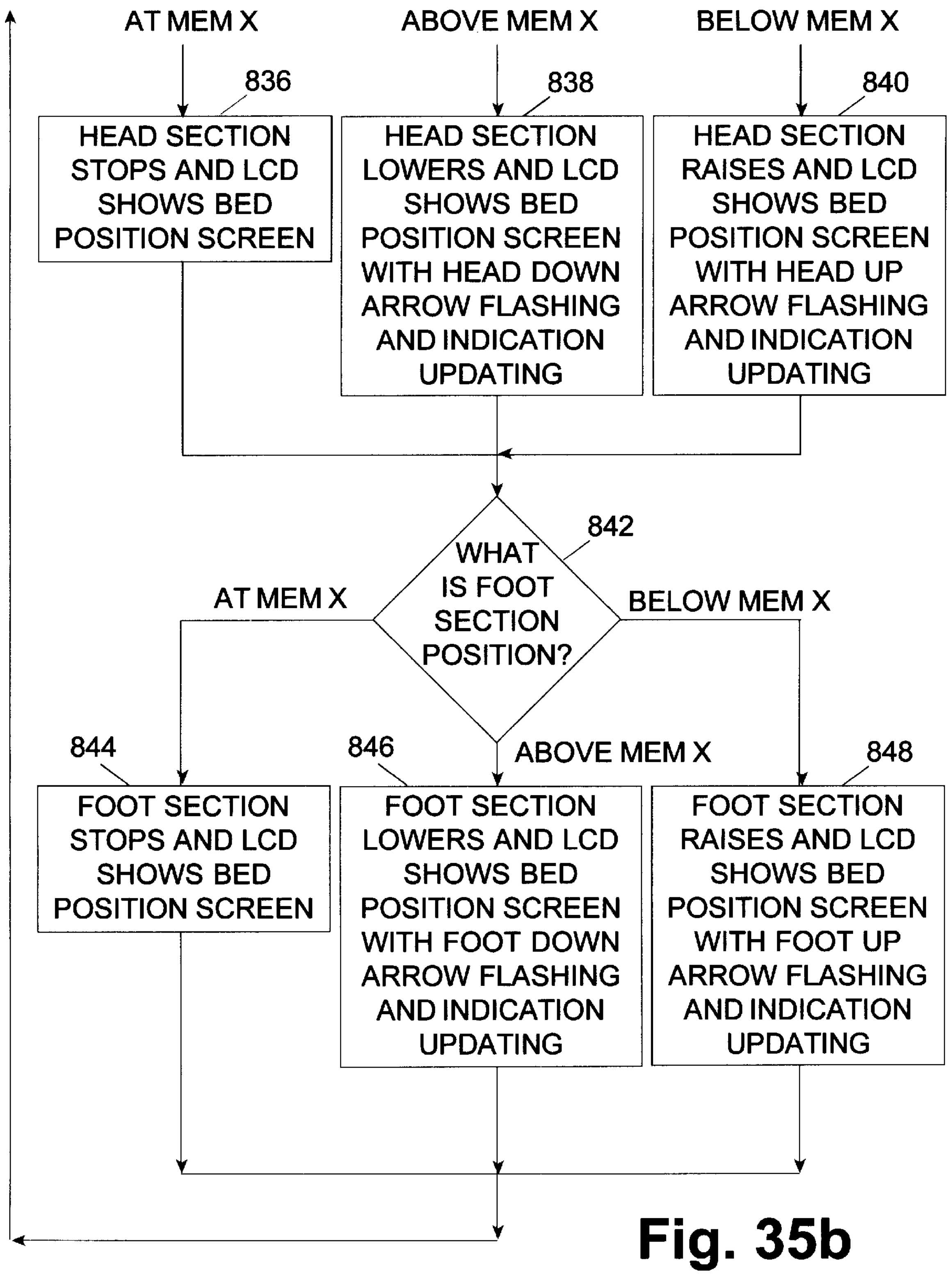
FIG. 35*b* is a flow chart showing some of the steps of a subroutine that is executed when one of the memory buttons is pressed to recall bed and mattress settings stored in memory.

FIGS. 35*a* and 35*b* together are a flow chart showing the steps performed by microprocessor 88 when one of memory buttons 270, 272, 274 is pressed to recall the settings that are stored in memory 96 related to the position of frame sections 91, 93 and related to the pressures within air bladders 74, 76, 78, 80. As indicated at block 828, microprocessor 88 determines whether one of memory buttons 270, 272, 274 is pressed, which will be the case when the memory button subroutine of FIGS. 35*a* and 35*b* is called initially, and then microprocessor 88 determines at block 830 whether the auto air function is on or off. If microprocessor 88 determines at block 830 that the auto air function is on, microprocessor 88 recalls from memories 136, 236 the pressures of air bladders 74, 76, 78, 80 so that, as the auto air function is executed by microprocessor 88, the pressures in bladders 74, 76, 78, 80 are maintained at the programmed pressures as indicated at block 832.

After microprocessor 88 recalls from memory 96 the pressures of air bladders 74, 76, 78, 80 at block 832, or if microprocessor 88 determines at block 830 that the auto air function is off, microprocessor 88 then determines at block 834 the position of frame section 91 relative to the programmed position of frame section 91 for the pressed one of memory buttons 270, 272, 274. If microprocessor 88 determines at block 834 that frame section 91 is at the programmed position, microprocessor 88 then sends the appropriate signals so that frame section 91 stops moving and so that the bed position screen appears on display screen 86 as indicated at block 836 of FIG. 35*b*.

If microprocessor 88 determines at block 834 that frame section 91 is above the programmed position, microprocessor 88 then sends the appropriate signals so that frame section 91 lowers and so that the bed position screen appears on display screen 86 with head-down arrow 364 flashing, bar graph 354 being updated, and head-end position number 360 being updated as indicated at block 838 of FIG. 35*b*. If microprocessor 88 determines at block 834 that frame section 91 is below the programmed position, microprocessor 88 then sends the appropriate signals so that frame section 91 raises and so that the bed position screen appears on display screen 86 with head-up arrow 366 flashing, bar graph 354 being updated, and head-end position number 360 being updated as indicated at block 840 of FIG. 35*b*.

After microprocessor 88 performs the steps associated with the appropriate one of blocks 836, 838, 840, microprocessor 88 then determines at block 842 the position of frame section 93 relative to the programmed position of frame section 93 for the pressed one of memory buttons 270, 272, 274. If microprocessor 88 determines at block 842 that frame section 93 is at the programmed position, microprocessor 88 then sends the appropriate signals so that frame section 93 stops moving and so that the bed position screen appears on display screen 86 as indicated at block 844. If microprocessor 88 determines at block 842 that frame section 93 is above the programmed position, microprocessor 88 then sends the appropriate signals so that frame section 93 lowers and so that the bed position screen appears on display screen 86 with foot-down arrow 368 flashing, bar graph 356 being updated, and foot-end position number 362 being updated as indicated at block 846. If microprocessor 88 determines at block 842 that frame section 93 is below the programmed position, microprocessor 88 then sends the appropriate signals so that frame section 93 raises and so that the bed position screen appears on display screen 86 with foot-up arrow 370 flashing, bar graph 356 being updated, and foot-end position number 362 being updated as indicated at block 844.

After microprocessor 88 performs the steps associated with the appropriate one of blocks 844, 846, 848 of FIG. 35*b*, microprocessor 88 then loops back to block 828 of FIG. 35*a*. If microprocessor 88 determines at block 828 that one of memory buttons 270, 272, 274 is not pressed, microprocessor 88 sends the appropriate signals so that frame sections 91, 93 stop moving and so that the air firmness screen appears on display screen 86 as indicated at block 850. After microprocessor 88 performs the steps associated with block 850, microprocessor 88 then determines at block 852 whether a twenty second timer, which starts when the pressed one of memory buttons 270, 272, 274 is released, has expired and if so, microprocessor 88 exits the subroutine of FIGS. 35*a* and 35*b* as indicated at block 854.

If microprocessor 88 determines at block 852 that the twenty second timer has not expired, microprocessor 88 then determines at block 856 whether any button is pressed, and if so, microprocessor 88 exits the subroutine of FIGS. 35*a* and 35*b* as indicated at block 854. If microprocessor 88 determines at block 856 that no buttons are pressed, microprocessor loops back to block 850 as shown in FIG. 35a.

Hand-held controller 50 includes mode indicia 266 which indicate the various programming modes of hand-held controller 50 as previously described. Mode indicia 266 includes a clock icon 858, a massage alarm icon 860, an auto down icon 862, and an Auto Air label 864 as shown in FIG. 3. Microprocessor 88 is programmed so that a set of status indicators 866 appear on display screen 86, each status indicator 866 appearing just above the associated icon 858, 860, 862 and label 864. In the illustrated hand-held controller 50 of FIG. 3, each status indicator 866 is a box that is either filled-in, empty, or flashing.

When the box of a respective status indicator 866 is filled in, the associated function is on and when the box of a respective status indicator 866 is empty, the associated function is off. When the box of a respective status indicator 866 is flashing, the associated function of bed and mattress assembly 52 may be programmed by appropriate button presses as discussed below with reference to FIGS. 36*a*–42.

Figure 36A:
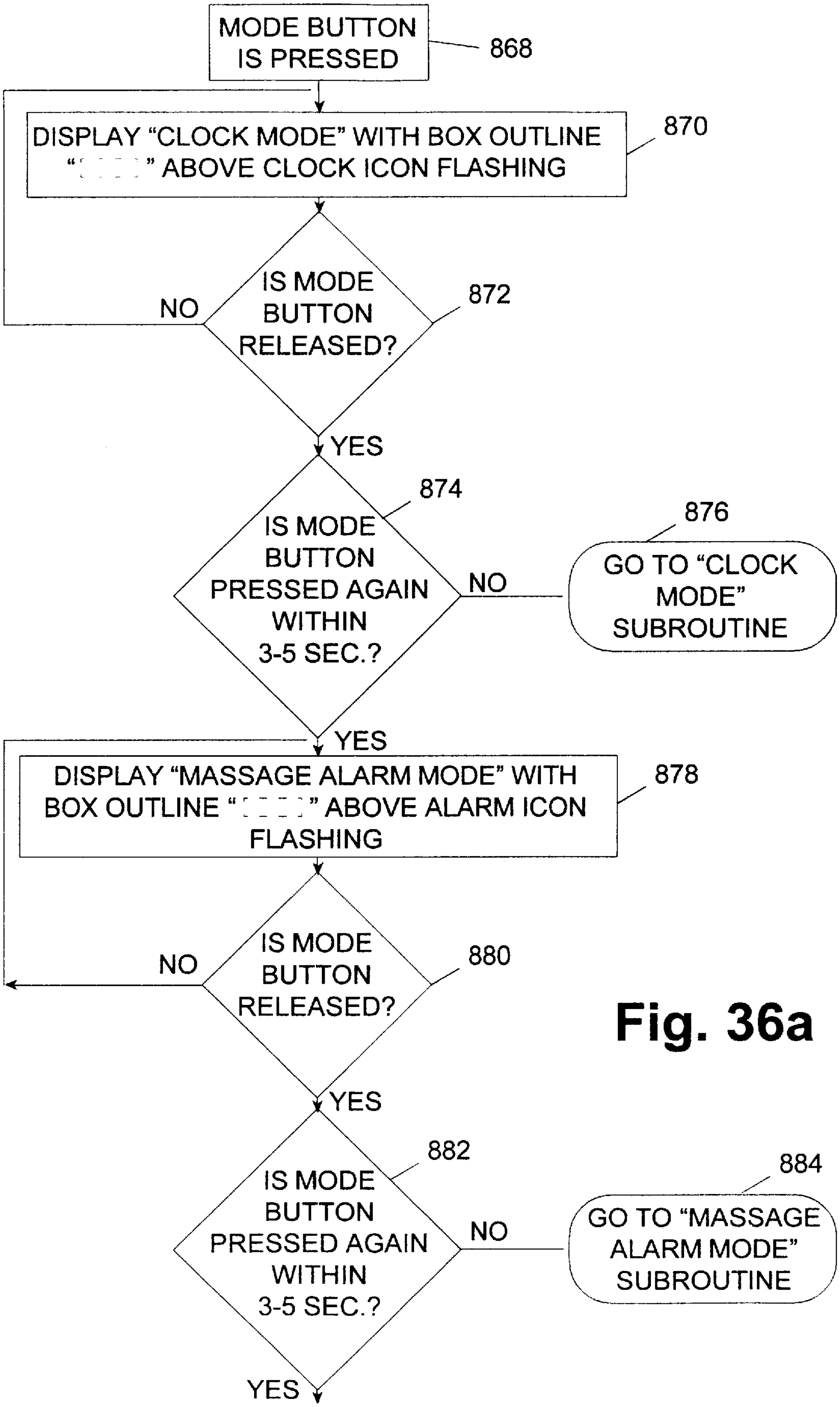
FIG. 36*a* is a flow chart showing some of the steps of a subroutine that is executed when the mode button is pressed to scroll through various programing modes to select a desired one of the programming modes.
Figure 36B:
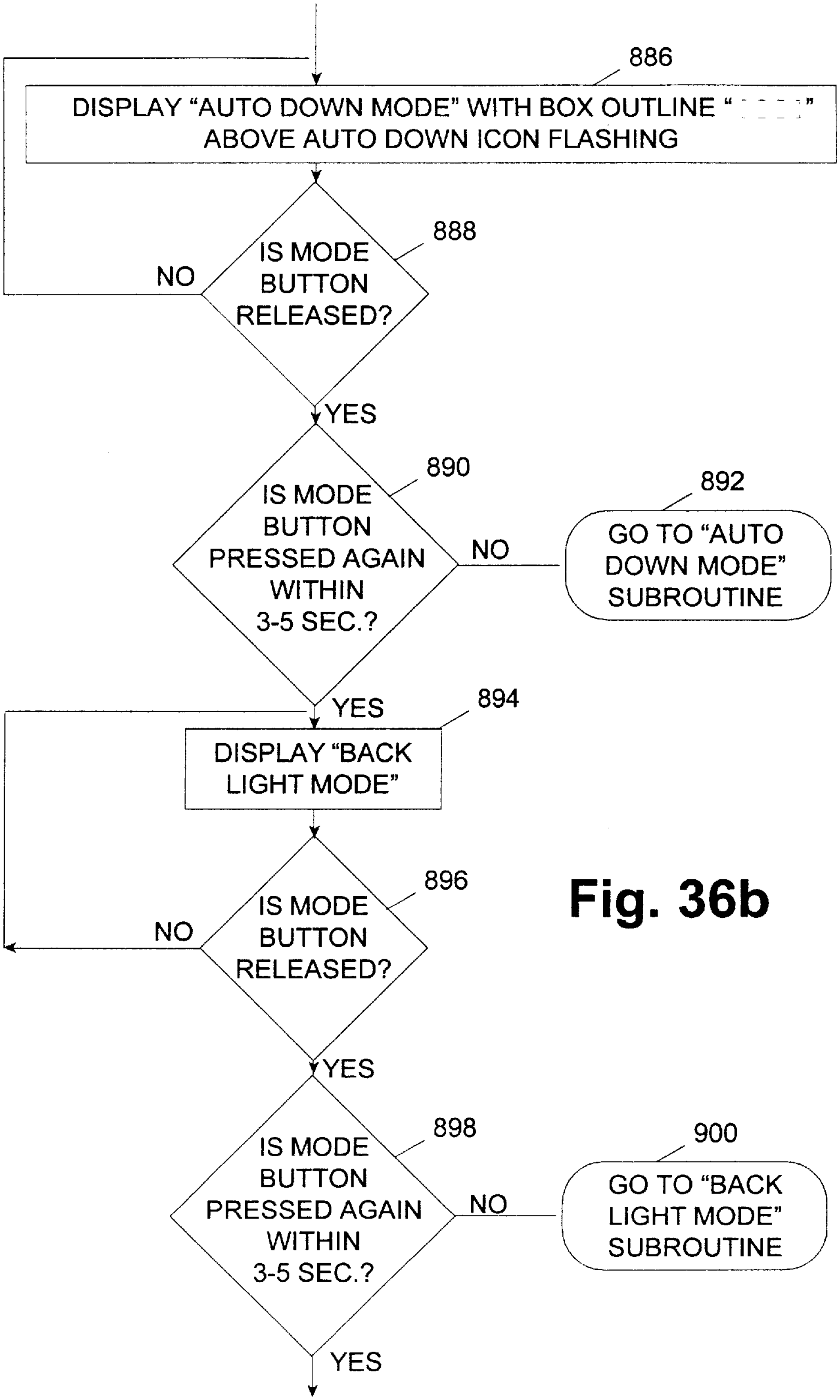
FIG. 36*b* is a flow chart showing some of the steps of a subroutine that is executed when the mode button is pressed to scroll through various programing modes to select a desired one of the programming modes.
Figure 36C:
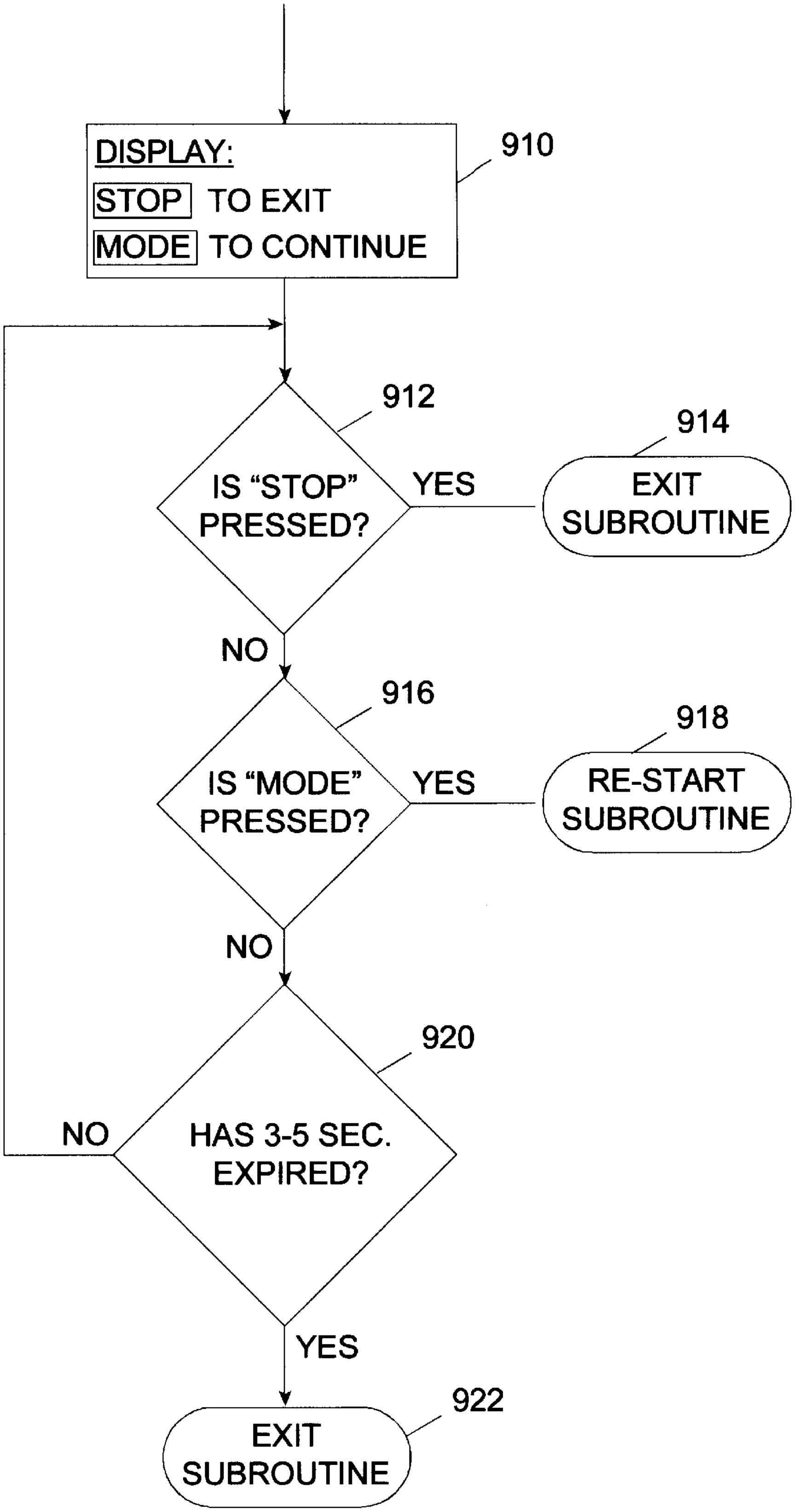
FIG. 36*c* is a flow chart showing some of the steps of a subroutine that is executed when the mode button is pressed to scroll through various programing modes to select a desired one of the programming modes.

FIGS. 36*a*, 36*b*, and 36*c* together are a flow chart of steps performed by microprocessor 88 when mode button 320 is pressed to scroll through various programing modes to select a desired one of the programming modes of hand-held controller 50. When mode button 320 is pressed, as indicated at block 868, microprocessor 88 sends the appropriate signals so that the message "CLOCK MODE" appears on display screen 86 and so that the status indicator 866 above clock icon 858 flashes as indicated at block 870 of FIG. 36*a*. After microprocessor 88 performs the steps associated with block 870, microprocessor 88 then determines at block 872 whether mode button 320 is released and if not, microprocessor 88 loops through block 870, 872 until mode button 320 is released.

If microprocessor 88 determines at block 872 that mode button 320 is released, microprocessor 88 then determines at block 874 whether mode button 320 is pressed again before a time period of three to five seconds has elapsed since the release of mode button 320. If microprocessor 88 determines at block 874 that mode button 320 has not been pressed again before expiration of the three to five second time period, microprocessor 88 then goes to a clock mode subroutine as indicated at block 876. If microprocessor 88 determines at block 874 that mode button 320 has been pressed again before expiration of the three to five second time period, microprocessor 88 sends the appropriate signals so that the message "MASSAGE ALARM MODE" appears on display screen 86 and so that the status indicator 866 above massage alarm icon 860 flashes as indicated at block 878 of FIG. 36*a*. After microprocessor 88 performs the steps associated with block 878, microprocessor 88 then determines at block 880 whether mode button 320 is released and if not, microprocessor 88 loops through block 878, 880 until mode button 320 is released.

If microprocessor 88 determines at block 880 that mode button 320 is released, microprocessor 88 then determines at block 882 whether mode button 320 is pressed again before a time period of three to five seconds has elapsed since the release of mode button 320. If microprocessor 88 determines at block 882 that mode button 320 has not been pressed again before expiration of the three to five second time period, microprocessor 88 then goes to a massage alarm mode subroutine as indicated at block 884. If microprocessor 88 determines at block 882 that mode button 320 has been pressed again before expiration of the three to five second time period, microprocessor 88 sends the appropriate signals so that the message "AUTO DOWN MODE" appears on display screen 86 and so that the status indicator 866 above auto down icon 862 flashes as indicated at block 886 of FIG. 36*b*. After microprocessor 88 performs the steps associated with block 886, microprocessor 88 then determines at block 888 whether mode button 320 is released and if not, microprocessor 88 loops through block 886, 888 until mode button 320 is released.

If microprocessor 88 determines at block 888 that mode button 320 is released, microprocessor 88 then determines at block 890 whether mode button 320 is pressed again before a time period of three to five seconds has elapsed since the release of mode button 320. If microprocessor 88 determines at block 890 that mode button 320 has not been pressed again before expiration of the three to five second time period, microprocessor 88 then goes to an auto down mode subroutine as indicated at block 892. If microprocessor 88 determines at block 890 that mode button 320 has been pressed again before expiration of the three to five second time period, microprocessor 88 sends the appropriate signals so that the message "BACK LIGHT MODE" appears on display screen 86 as indicated at block 894 of FIG. 36*b*. After microprocessor 88 performs the steps associated with block 894, microprocessor 88 then determines at block 896 whether mode button 320 is released and if not, microprocessor 88 loops through block 894, 896 until mode button 320 is released.

If microprocessor 88 determines at block 896 that mode button 320 is released, microprocessor 88 then determines at block 898 whether mode button 320 is pressed again before a time period of three to five seconds has elapsed since the release of mode button 320. If microprocessor 88 determines at block 898 that mode button 320 has not been pressed again before expiration of the three to five second time period, microprocessor 88 then goes to a back light mode subroutine as indicated at block 900. If microprocessor 88 determines at block 898 that mode button 320 has been pressed again before expiration of the three to five second time period, microprocessor 88 sends the appropriate signals so that the message "STOP TO EXIT, MODE TO CONTINUE" appears on display screen 86 as indicated at block 910 of FIG. 36*c*.

After microprocessor 88 performs the steps associated with block 910, microprocessor 88 then determines at block 912 whether stop button 300 is pressed and if so, microprocessor 88 exits the subroutine of FIGS. 36*a*, 36*b*, 36*c* as indicated at block 914. If microprocessor 88 determines at block 912 that stop button 300 is not pressed, microprocessor 88 then determines at block 916 whether mode button 320 is pressed and if so, microprocessor 88 re-starts the subroutine of FIGS. 36*a*, 36*b*, 36*c* as indicated at block 918. If microprocessor 88 determines at block 916 that mode button 320 is not pressed, microprocessor 88 then determines at block 920 whether a time period of three to five seconds, which begins when mode button 320 is pressed at block 898, has expired and if so, microprocessor exits the subroutine of FIGS. 36*a*, 36*b*, 36*c* as indicated at block 922. If microprocessor 88 determines at block 920 that the three to five second time period has not expired, microprocessor 88 then loops back to block 912 as shown in FIG. 36*c*.

Figure 37A:
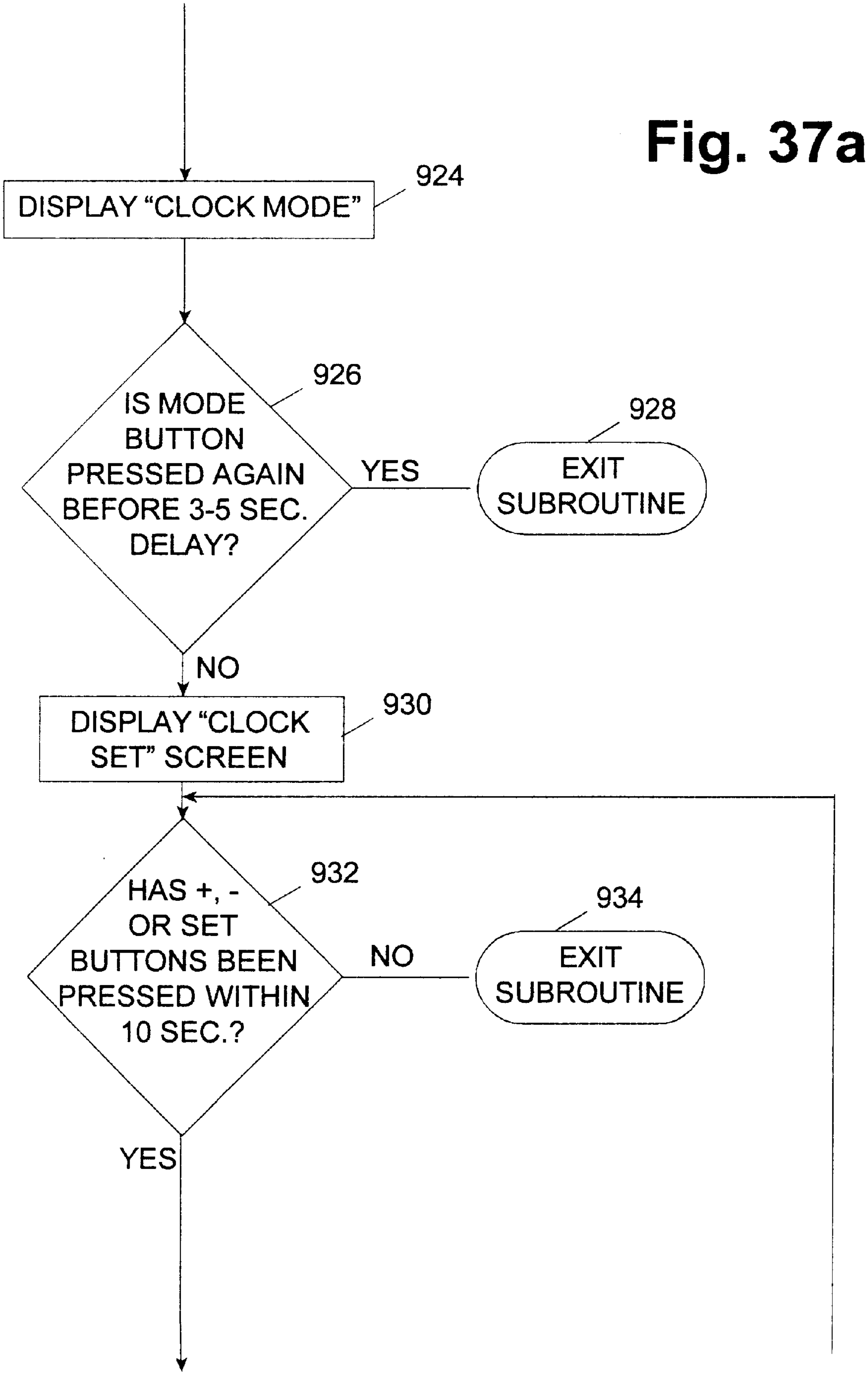
FIG. 37*a* is a flow chart showing some of the steps performed during a clock programming subroutine.
Figure 37B:
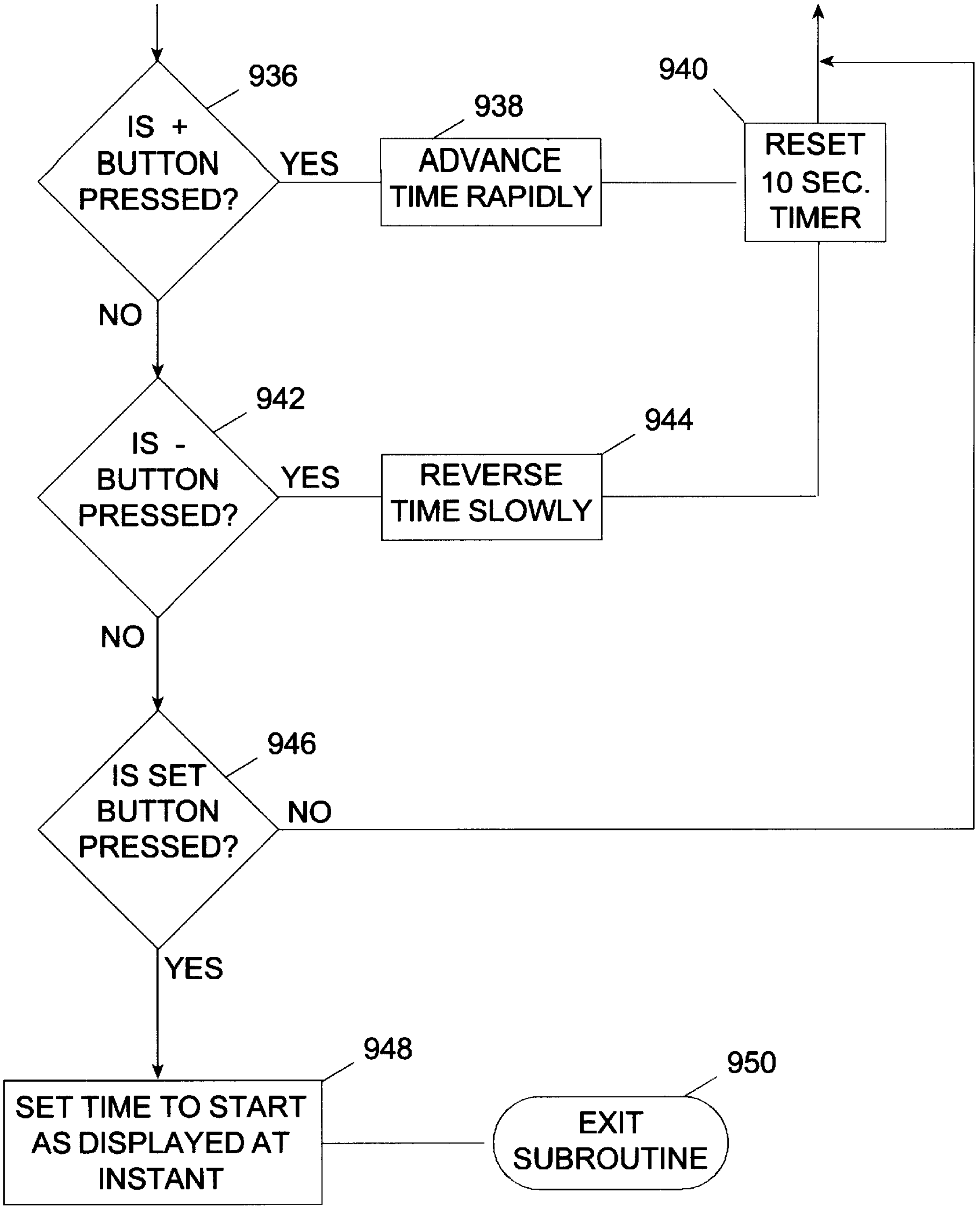
FIG. 37*b* is a flow chart showing some of the steps performed during the clock programming subroutine.

FIGS. 37*a* and 37*b* together are a flow chart of the steps performed by microprocessor 88 during a clock mode subroutine that runs when microprocessor 88 reaches block 876 of FIG. 36*a*. When microprocessor 88 reaches the clock mode subroutine, microprocessor 88 sends the appropriate signals so that a "CLOCK MODE" message appears on display screen 86 as indicated at block 924. After microprocessor 88 performs the steps associated with block 924, microprocessor 88 then determines at block 926 whether mode button 320 is pressed again before a three to five second delay and if so, microprocessor 88 exits the clock mode subroutine as indicated at block 928.

If microprocessor 88 determines at block 926 that mode button 320 is not pressed again before the three to five second delay, microprocessor 88 then sends the appropriate signals so that a "clock set" screen (not shown) appears on display screen 86 as indicated at block 930. The clock set screen includes the time-of-day 324 at its current time, a message which indicates that pressing plus side 314 of button 312 advances the time-of-day 324 and that pressing minus side 316 of button 312 reverses the time-of-day, and a message that indicates that set button 322 should be pressed when the time-of-day is programmed to a desired time.

After microprocessor 88 performs the steps associated with block 930, microprocessor 88 then determines at block 932 whether any of buttons 312, 322 are pressed within a ten second time period which begins when the clock set screen appears on display screen 86. If microprocessor 88 determines at block 932 that none of buttons 312, 322 have been pressed within the ten second time period, microprocessor 88 exits the clock mode subroutine as indicated at block 934. If microprocessor 88 determines at block 932 that one of buttons 312, 322 have been pressed within the ten second time period, microprocessor 88 then determines at block 936 of FIG. 37*b* whether plus side 314 of button 312 is pressed and if so, microprocessor 88 sends the appropriate signals to advance the time-of-day rapidly as indicated at block 938. After microprocessor 88 performs the steps associated with block 938, microprocessor 88 resets a ten second timer which keeps track of the ten second time period, as indicated at block 940, and then microprocessor 88 loops back to block 932 of FIG. 37*a*.

If microprocessor 88 determines at block 936 that plus side 314 of button 312 is not pressed, microprocessor 88 then determines at block 942 whether minus side 316 of button 312 and if so, microprocessor 88 sends the appropriate signals to reverse the time-of-day slowly as indicated at block 944. After microprocessor 88 performs the steps associated with block 944, microprocessor 88 resets the ten second timer, as indicated at block 940, and then microprocessor 88 loops back to block 932 of FIG. 37*a*. If microprocessor 88 determines at block 942 that minus side 316 of button 312 is not pressed, microprocessor 88 then determines at block 946 whether set button 322 is pressed and if not, microprocessor 88 loops back to block 932 of FIG. 37*a*. If microprocessor 88 determines at block 946 that set button 322 is pressed, microprocessor 88 sends the appropriate signals so that the time-of-day 324 starts at the displayed program time the instant that the set button is pressed, as indicated at block 948, and then microprocessor 88 exits the clock mode subroutine as indicated at block 950.

Figure 38A:
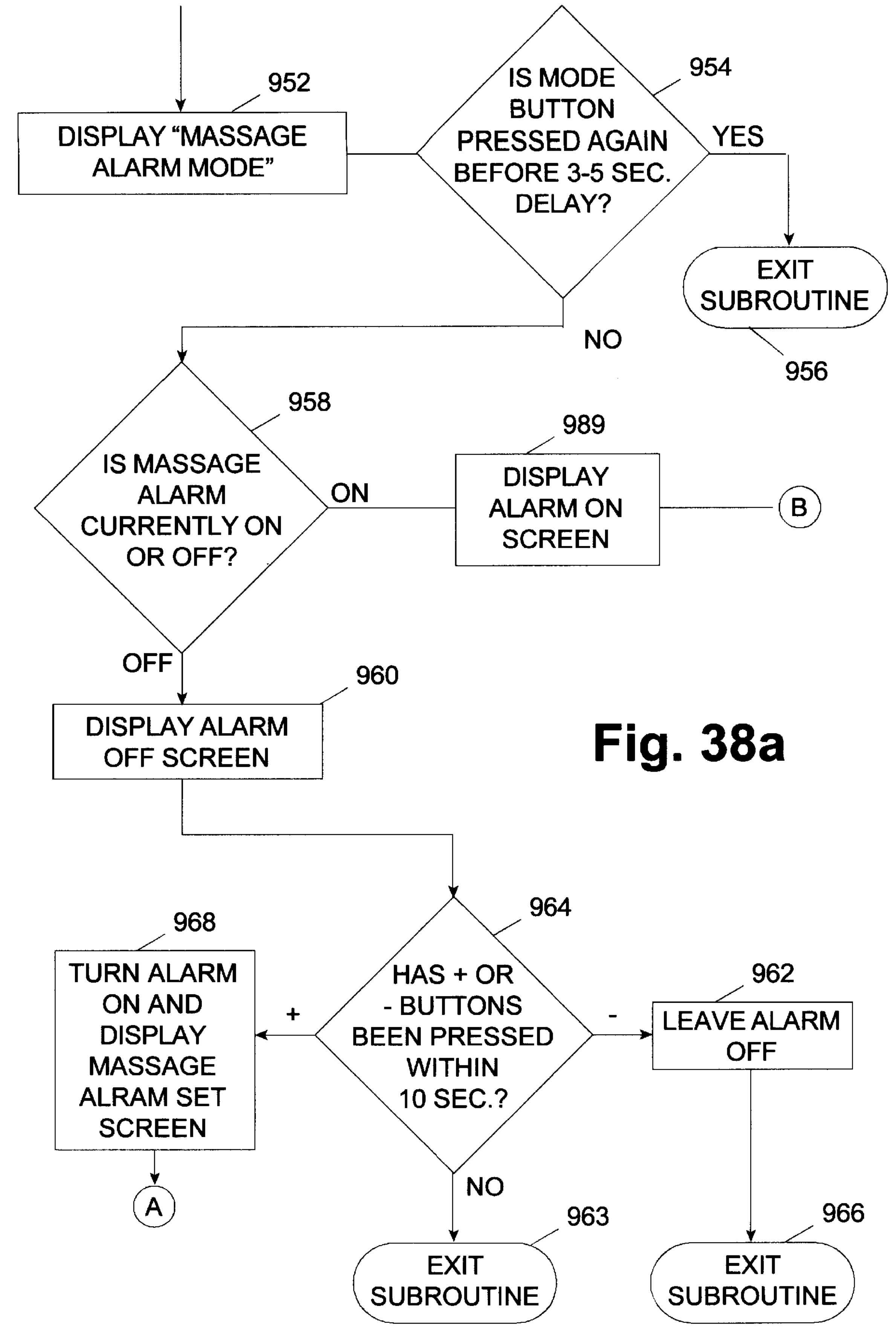
FIG. 38*a* is a flow chart showing some of the steps performed during a massage alarm programming subroutine.
Figure 38B:
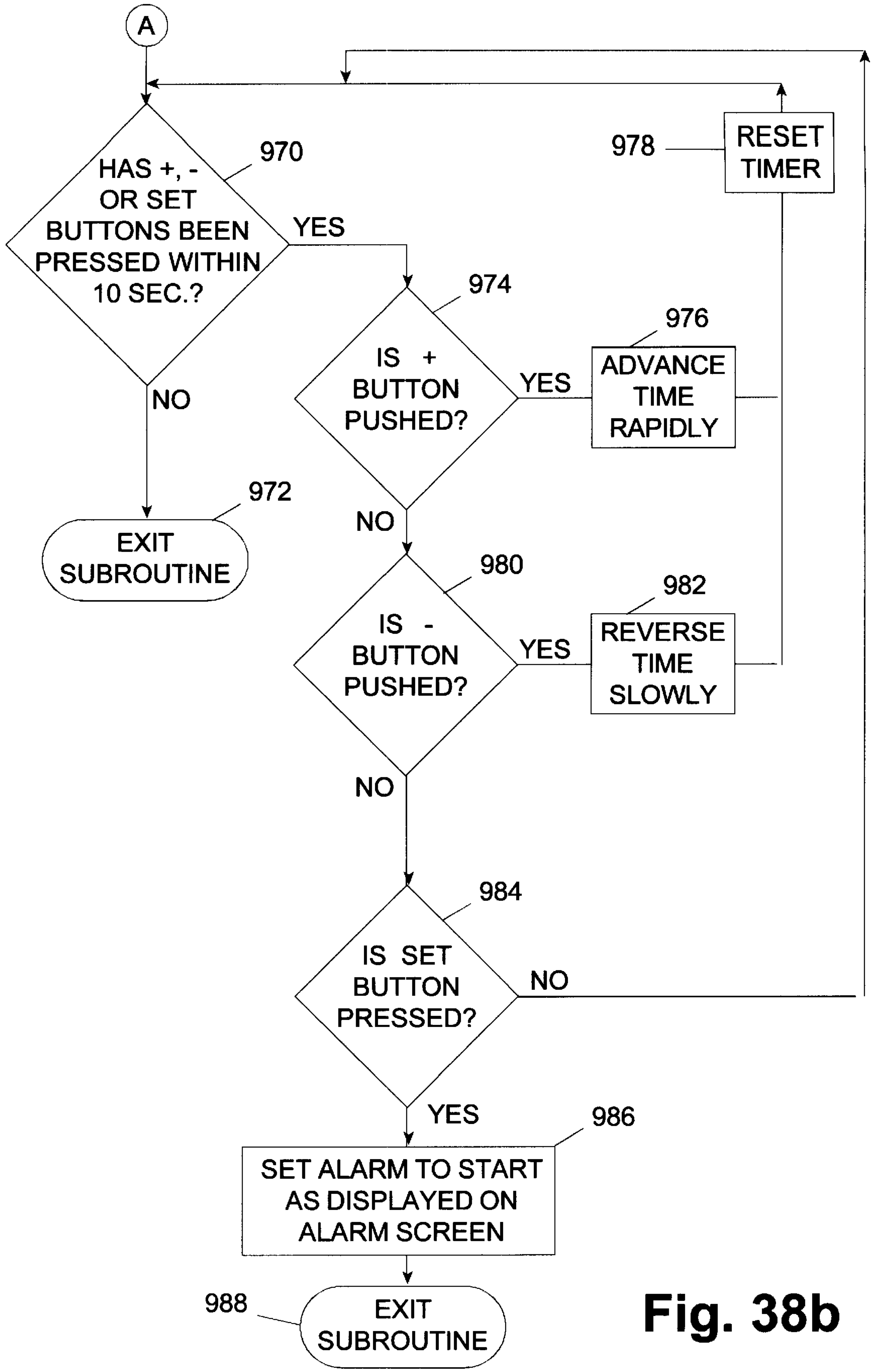
FIG. 38*b* is a flow chart showing some of the steps performed during the massage alarm programming subroutine.
Figure 38C:
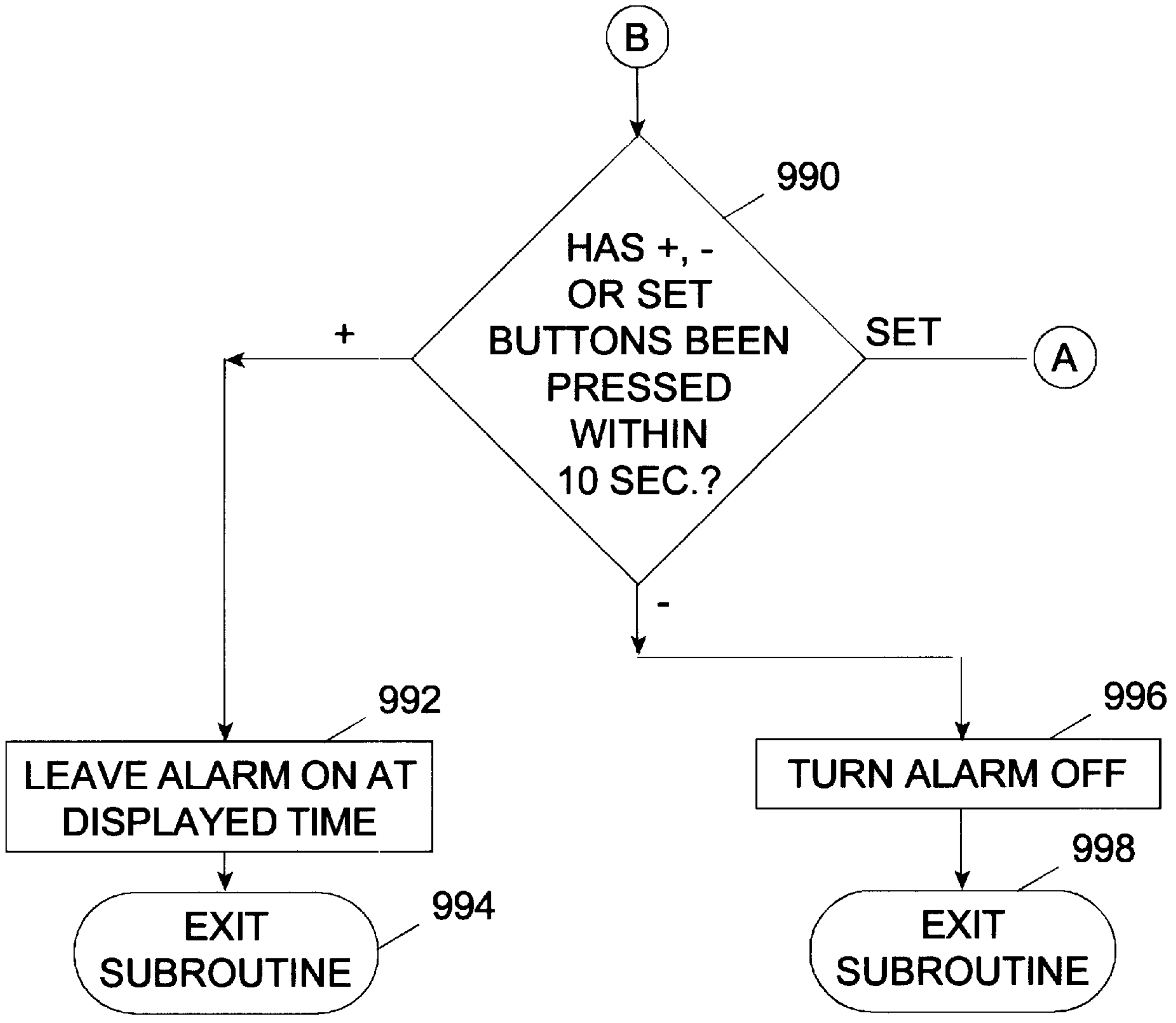
FIG. 38*c* is a flow chart showing some of the steps performed during the massage alarm programming subroutine.

FIGS. 38*a*, 38*b*, and 38*c* together are a flow chart of the steps performed by microprocessor 88 during a massage alarm mode subroutine that runs when microprocessor 88 reaches block 884 of FIG. 36*a*. When microprocessor 88 reaches the massage alarm mode subroutine, microprocessor 88 sends the appropriate signals so that a "MASSAGE ALARM MODE" message appears on display screen 86 as indicated at block 952. After microprocessor 88 performs the steps associated with block 952, microprocessor 88 then determines at block 954 whether mode button 320 is pressed again before a three to five second delay and if so, microprocessor 88 exits the massage alarm mode subroutine as indicated at block 956.

If microprocessor 88 determines at block 954 that mode button 320 is not pressed again before the three to five second delay, microprocessor 88 then determines at block 958 whether the massage alarm is currently on or off. If microprocessor 88 determines at block 958 that the massage alarm is off, microprocessor 88 displays an "alarm off" screen (not shown) as indicated at block 960. The alarm off screen includes a message which indicates that pressing plus side 314 of button 312 turns the massage alarm on and which indicates that pressing the minus side 316 of button 312 turns the massage alarm off.

After microprocessor 88 performs the steps associated with block 960, microprocessor 88 then determines at block 962 whether plus side 314 or minus side 316 of button 312 is pressed within a ten second time period which begins when the alarm off screen appears on display screen 86. If microprocessor 88 determines at block 962 that neither plus side 314 nor minus side 316 of button 312 are pressed within the ten second time period, microprocessor 88 exits the massage alarm mode subroutine as indicated at block 963. If microprocessor 88 determines at block 962 that minus side 316 of button 312 is pressed within the ten second time period, microprocessor 88 continues to leave the massage alarm off, as indicated at block 964, and then microprocessor exits the massage alarm subroutine as indicated at block 966.

If microprocessor 88 determines at block 962 of FIG. 38*a* that plus side 314 of button 312 is pressed, microprocessor 88 turns the massage alarm on and displays an "massage alarm set" screen (not shown) as indicated at block 968. The massage alarm set screen includes an alarm time which indicates when the massage alarm is set to occur, a message which indicates that pressing plus side 314 of button 312 advances the alarm time and that pressing minus side 316 of button 312 reverses the alarm time, and a message that indicates that set button 322 should be pressed when the alarm time is programmed to a desired time.

After microprocessor 88 performs the steps associated with block 968 of FIG. 38*a,* microprocessor 88 then determines at block 970 of FIG. 38*b* whether any of buttons 312, 322 are pressed within a ten second time period which begins when the massage alarm set screen appears on display screen 86. If microprocessor 88 determines at block 970 that none of buttons 312, 322 have been pressed within the ten second time period, microprocessor 88 exits the massage alarm mode subroutine as indicated at block 972. If microprocessor 88 determines at block 970 that one of buttons 312, 322 have been pressed within the ten second time period, microprocessor 88 then determines at block 974 of FIG. 38*b* whether plus side 314 of button 312 is pressed and if so, microprocessor 88 sends the appropriate signals to advance the alarm time rapidly as indicated at block 976. After microprocessor 88 performs the steps associated with block 976, microprocessor 88 resets a ten second timer which keeps track of the ten second time period, as indicated at block 978, and then microprocessor 88 loops back to block 970.

If microprocessor 88 determines at block 974 that plus side 314 of button 312 is not pressed, microprocessor 88 then determines at block 980 whether minus side 316 of button 312 and if so, microprocessor 88 sends the appropriate signals to reverse the alarm time slowly as indicated at block 982. After microprocessor 88 performs the steps associated with block 982, microprocessor 88 resets the ten second timer, as indicated at block 978, and then microprocessor 88 loops back to block 970. If microprocessor 88 determines at block 980 that minus side 316 of button 312 is not pressed, microprocessor 88 then determines at block 984 whether set button 322 is pressed and if not, microprocessor 88 loops back to block 970. If microprocessor 88 determines at block 984 that set button 322 is pressed, microprocessor 88 sends the appropriate signals so that the massage alarm is set to start at the displayed alarm time, as indicated at block 986, and then microprocessor 88 exits the massage alarm mode subroutine as indicated at block 988.

If microprocessor 88 determines at block 958 of FIG. 38*a* that the massage alarm is on, microprocessor 88 displays an "alarm on" screen (not shown) as indicated at block 989. The alarm on screen includes the alarm time at which the massage alarm is set to occur, a message which indicates that pressing plus side 314 of button 312 turns the massage alarm on, a message that indicates that pressing minus side 316 of button 312 turns the massage alarm off, and a message that indicates that set button 322 should be pressed to program the alarm time to a desired time.

After microprocessor 88 performs the steps associated with block 989, microprocessor 88 then determines at block 990 of FIG. 38*c* whether any of buttons 312, 322 are pressed within a ten second time period which begins when the alarm on screen appears on display screen 86. If microprocessor 88 determines at block 990 that plus side 314 of button 312 is pressed within the ten second time period, microprocessor 88 leaves the alarm on at the displayed alarm time, as indicated at block 992, and then microprocessor 88 exits the massage alarm mode subroutine as indicated at block 994. If microprocessor 88 determines at block 990 that minus side 316 of button 312 is pressed within the ten second time period, microprocessor 88 turns the massage alarm off, as indicated at block 996, and then microprocessor exits the massage alarm subroutine as indicated at block 998. If microprocessor 88 determines at block 990 that set button 322 is pressed, microprocessor 88 then loops to block 970 and proceeds from block 970 as described above.

Figure 39:
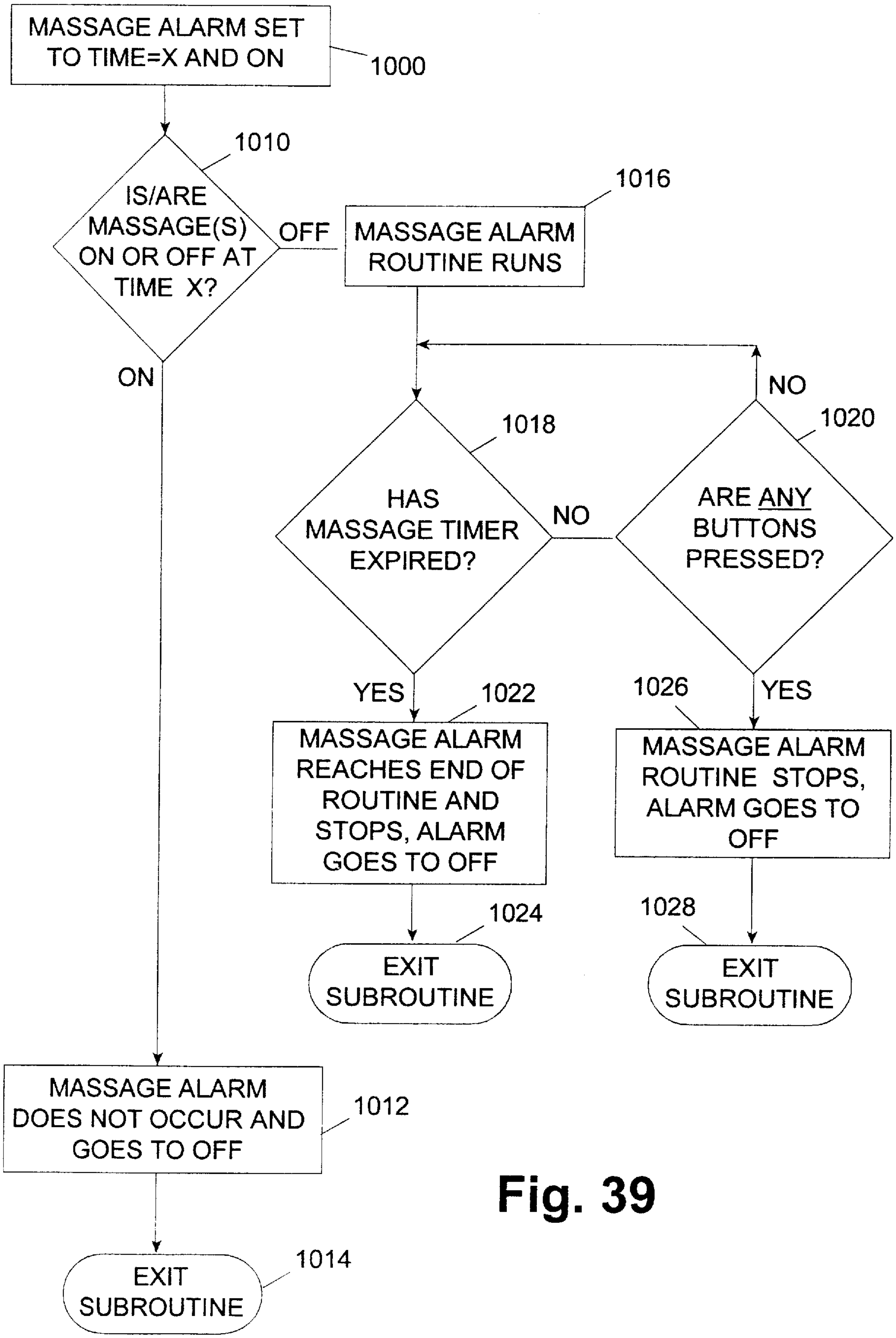
FIG. 39 is a flow chart showing the steps that are executed when the massage alarm is set.

FIG. 39 is a flow chart showing the steps performed by microprocessor 88 when the massage alarm is set during the massage alarm subroutine of FIGS. 38*a,* 38*b,* 38*c*. When time-of-day 324 matches the alarm time and the massage alarm is on, as indicated at block 1000, microprocessor 88 determines at block 1010 whether massage motors 70, 72 are on or off at the alarm time. If microprocessor 88 determines at block 1010 that massage motors 70, 72 are already on at the alarm time, the massage alarm does not occur and microprocessor 88 turns the massage alarm off, indicated at block 1012, and then microprocessor exits the FIG. 39 subroutine, as indicated at block 1014.

If microprocessor 88 determines at block 1010 that massage motors 70, 72 are both off at the alarm time, then microprocessor 88 runs a massage alarm routine (not shown) as indicated at block 1016. As microprocessor 88 executes the massage alarm routine, massage motors 70, 72 are stepped up in operational intensity over a period of time. For example, in one embodiment of hand-held controller 50, the massage alarm period lasts for twenty minutes during which microprocessor 88 sends the appropriate signals so that motor 70 increases its operational intensity by one level every minute until motor 70 reaches level five intensity, so that motor 72 turns one when motor 70 reaches intensity level 3, and so that motor 72 increases its operational intensity by one level every minute until motor 72 reaches level three intensity. One application of the massage alarm mode of hand-held controller 50 is to provide an alarm for deaf persons.

While the massage alarm routine is being executed, as indicated at block 1016, microprocessor determines at block 1018 whether a massage timer, which keeps track of the massage alarm period, has expired and if not, microprocessor 88 determines at block 1020 whether any buttons are pressed. If microprocessor 88 determines at block 1020 that no buttons are pressed, microprocessor 88 loops back to block 1018 and continues to run the massage alarm routine. If microprocessor 88 determines at block 1018 that the massage timer has expired, microprocessor 88 sends the appropriate signals so that motors 70, 72 stop and so that the massage alarm is no longer set to occur, as indicated at block 1022, and then microprocessor 88 exits the FIG. 39 subroutine, as indicated at block 1024. If microprocessor 88 determines at block 1020 that any button of hand-held controller 50 is pressed, microprocessor 88 sends the appropriate signals so that motors 70, 72 stop and so that the massage alarm is no longer set to occur, as indicated at block 1026, and then microprocessor 88 exits the FIG. 39 subroutine, as indicated at block 1028.

Figure 40A:
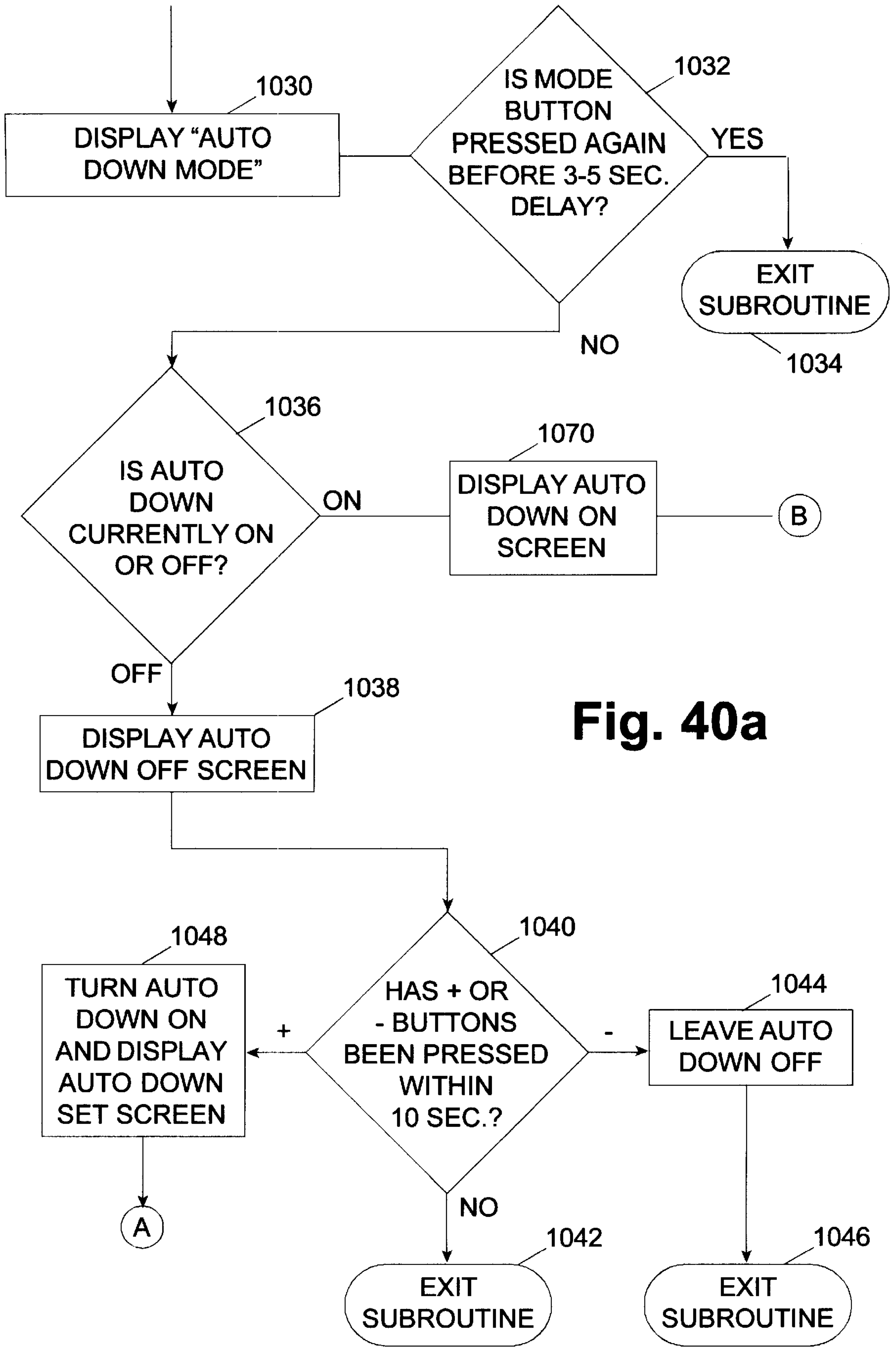
FIG. 40*a* is a flow chart showing some of the steps performed during an auto down programming subroutine.
Figure 40B:
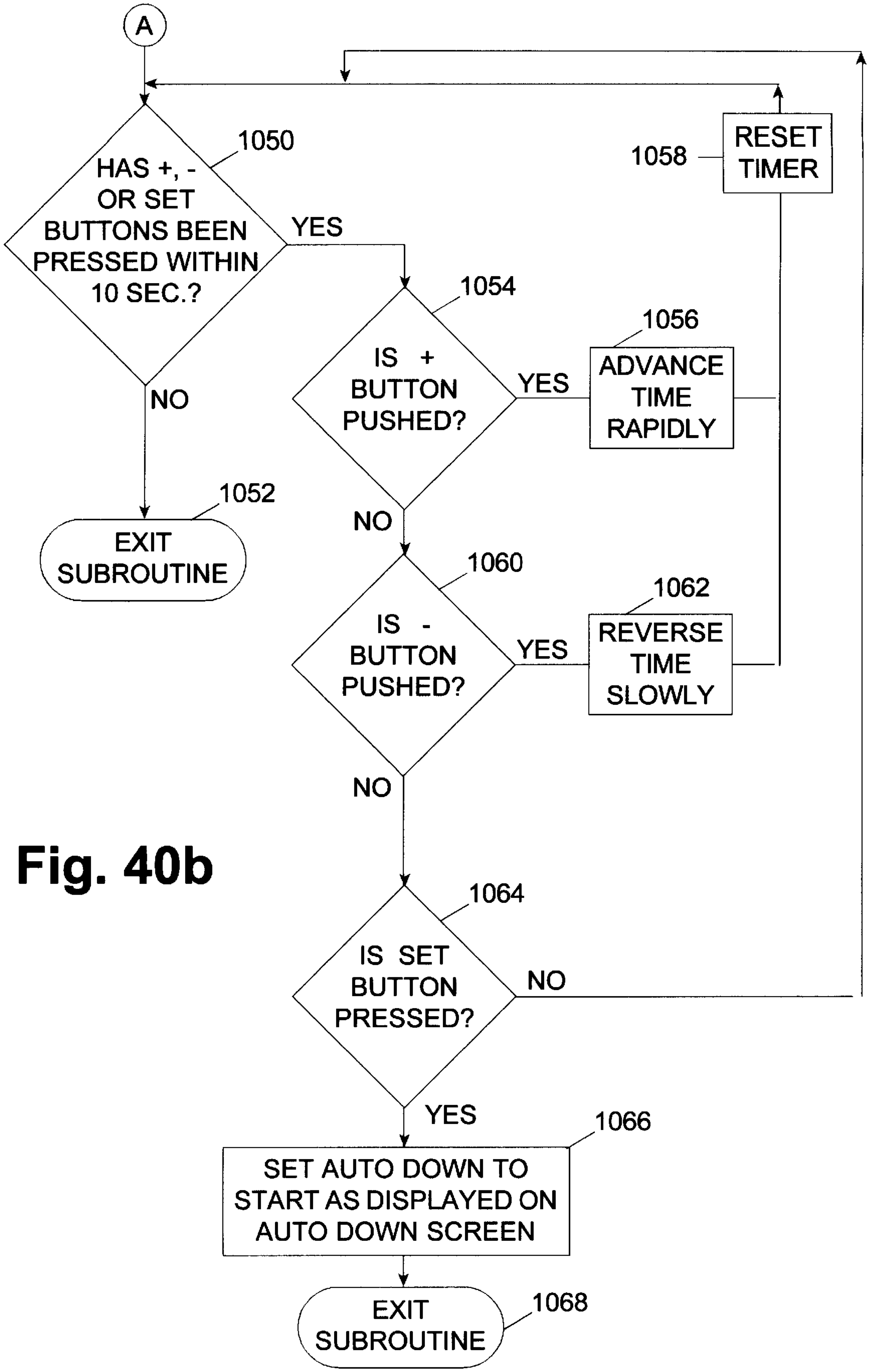
FIG. 40*b* is a flow chart showing some of the steps performed during the auto down programming subroutine.
Figure 40C:
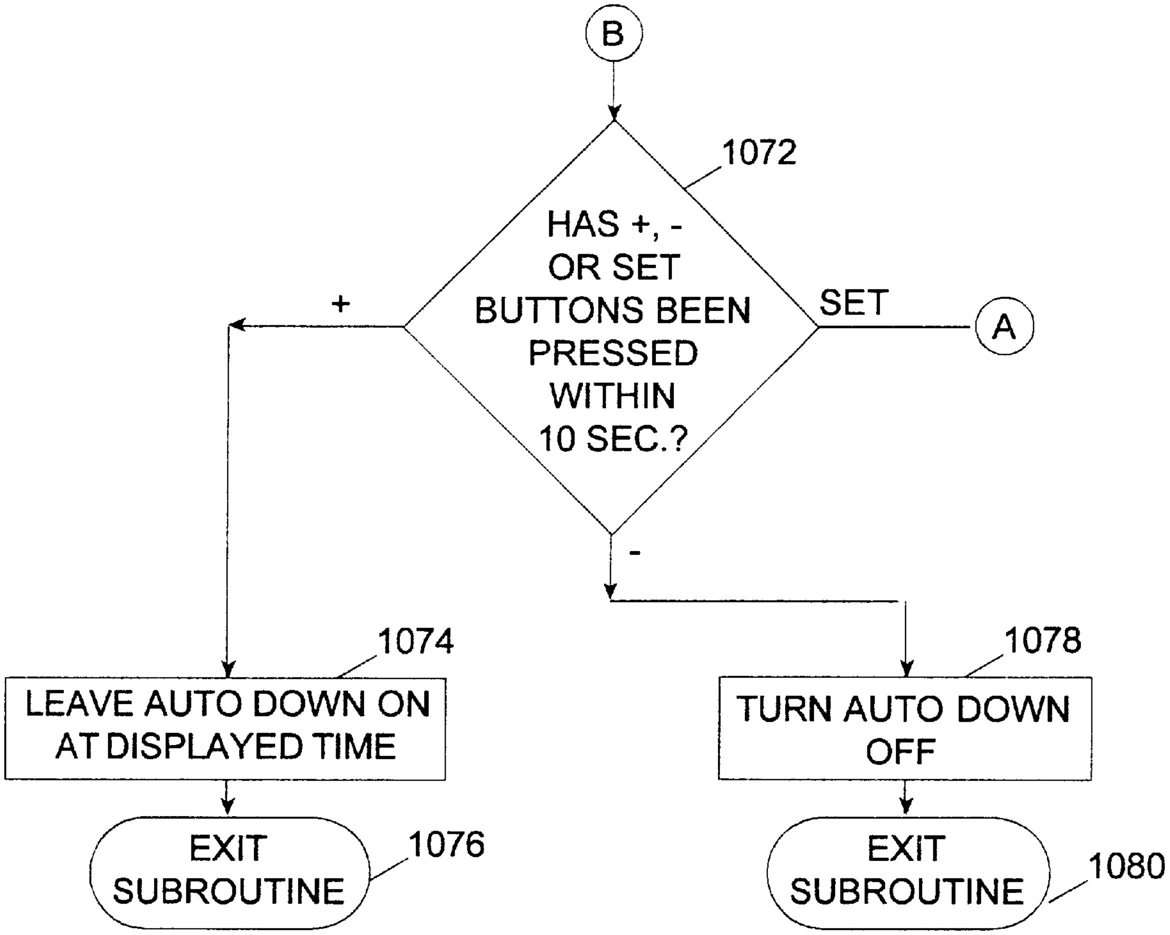
FIG. 40*c* is a flow chart showing some of the steps performed during the auto down programming subroutine.

FIGS. 40*a*, 40*b*, and 40*c* together are a flow chart of the steps performed by microprocessor 88 during an auto down mode subroutine that runs when microprocessor 88 reaches block 892 of FIG. 36*b*. When microprocessor 88 reaches the auto down mode subroutine, microprocessor 88 sends the appropriate signals so that an "AUTO DOWN MODE" message appears on display screen 86 as indicated at lock 1030. After microprocessor 88 performs the steps associated with block 1030, microprocessor 88 then determines at block 1032 whether mode button 320 is pressed again before a three to five second delay and if so, microprocessor 88 exits the auto down mode subroutine as indicated at block 1034.

If microprocessor 88 determines at block 1032 that mode button 320 is not pressed again before the three to five second delay, microprocessor 88 then determines at block 1036 whether the auto down function is currently on or off. If microprocessor 88 determines at block 1036 that the auto down function is off, microprocessor 88 displays an "auto down off" screen (not shown) as indicated at block 1038. The auto down off screen includes a message which indicates that pressing plus side 314 of button 312 turns the auto down function on and which indicates that pressing the minus side 316 of button 312 turns the auto down function off.

After microprocessor 88 performs the steps associated with block 1038, microprocessor 88 then determines at block 1040 whether plus side 314 or minus side 316 of button 312 is pressed within a ten second time period which begins when the auto down off screen appears on display screen 86. If microprocessor 88 determines at block 1040 that neither plus side 314 nor minus side 316 of button 312 are pressed within the ten second time period, microprocessor 88 exits the auto down mode subroutine as indicated at block 1042. If microprocessor 88 determines at block 1040 that minus side 316 of button 312 is pressed within the ten second time period, microprocessor 88 continues to leave the auto down function off, as indicated at block 1044, and then microprocessor 88 exits the auto down subroutine as indicated at block 1046.

If microprocessor 88 determines at block 1040 of FIG. 40*a* that plus side 314 of button 312 is pressed, microprocessor 88 turns the auto down function on and displays an "auto down set" screen (not shown) as indicated at block 1048. The auto down set screen includes an auto down time which indicates when the auto down function is set to occur, a message which indicates that pressing plus side 314 of button 312 advances the auto down time and that pressing minus side 316 of button 312 reverses the auto down time, and a message that indicates that set button 322 should be pressed when the auto down time is programmed to a desired time.

After microprocessor 88 performs the steps associated with block 1048 of FIG. 40*a*, microprocessor 88 then determines at block 1050 of FIG. 40*b* whether any of buttons 312, 322 are pressed within a ten second time period which begins when the auto down set screen appears on display screen 86. If microprocessor 88 determines at block 1050 that none of buttons 312, 322 have been pressed within the ten second time period, microprocessor 88 exits the massage auto down subroutine as indicated at block 1052. If microprocessor 88 determines at block 1050 that one of buttons 312, 322 have been pressed within the ten second time period, microprocessor 88 then determines at block 1054 of FIG. 40*b* whether plus side 314 of button 312 is pressed and if so, microprocessor 88 sends the appropriate signals to advance the auto down time rapidly as indicated at block 1056. After microprocessor 88 performs the steps associated with block 1056, microprocessor 88 resets a timer which keeps track of the ten second time period, as indicated at block 1058, and then microprocessor 88 loops back to block 1050.

If microprocessor 88 determines at block 1054 that plus side 314 of button 312 is not pressed, microprocessor 88 then determines at block 1060 whether minus side 316 of button 312 is pressed and if so, microprocessor 88 sends the appropriate signals to reverse the auto down time slowly as indicated at block 1062. After microprocessor 88 performs the steps associated with block 1062, microprocessor 88 resets the timer, as indicated at block 1058, and then microprocessor 88 loops back to block 1050. If microprocessor 88 determines at block 1060 that minus side 316 of button 312 is not pressed, microprocessor 88 then determines at block 1064 whether set button 322 is pressed and if not, microprocessor 88 loops back to block 1050. If microprocessor 88 determines at block 1064 that set button 322 is pressed, microprocessor 88 sends the appropriate signals so that the auto down function is set to start at the displayed auto down time, as indicated at block 1066, and then microprocessor 88 exits the auto down mode subroutine as indicated at block 1068.

If microprocessor 88 determines at block 1036 of FIG. 40*a* that the massage alarm is on, microprocessor 88 displays an "auto down on" screen (not shown) as indicated at block 1070. The auto down on screen includes the auto down time at which the auto down function is set to occur, a message which indicates that pressing plus side 314 of button 312 turns the auto down function on, a message that indicates that pressing minus side 316 of button 312 turns the auto down function off, and a message that indicates that set button 322 should be pressed to program the auto down time to a desired time.

After microprocessor 88 performs the steps associated with block 1070 of FIG. 40*a*, microprocessor 88 then determines at block 1072 of FIG. 40*c* whether any of buttons 312, 322 are pressed within a ten second time period which begins when the auto down on screen appears on display screen 86. If microprocessor 88 determines at block 1072 that plus side 314 of button 312 is pressed within the ten second time period, microprocessor 88 leaves the auto down function on at the displayed auto down time, as indicated at block 1074, and then microprocessor 88 exits the auto down mode subroutine as indicated at block 1076. If microprocessor 88 determines at block 1072 that minus side 316 of button 312 is pressed within the ten second time period, microprocessor 88 turns the auto down function off, as indicated at block 1078, and then microprocessor 88 exits the auto down subroutine as indicated at block 1080. If microprocessor 88 determines at block 1072 that set button 322 is pressed, microprocessor 88 then loops to block 1050 and proceeds from block 1050 as described above.

Figure 41:
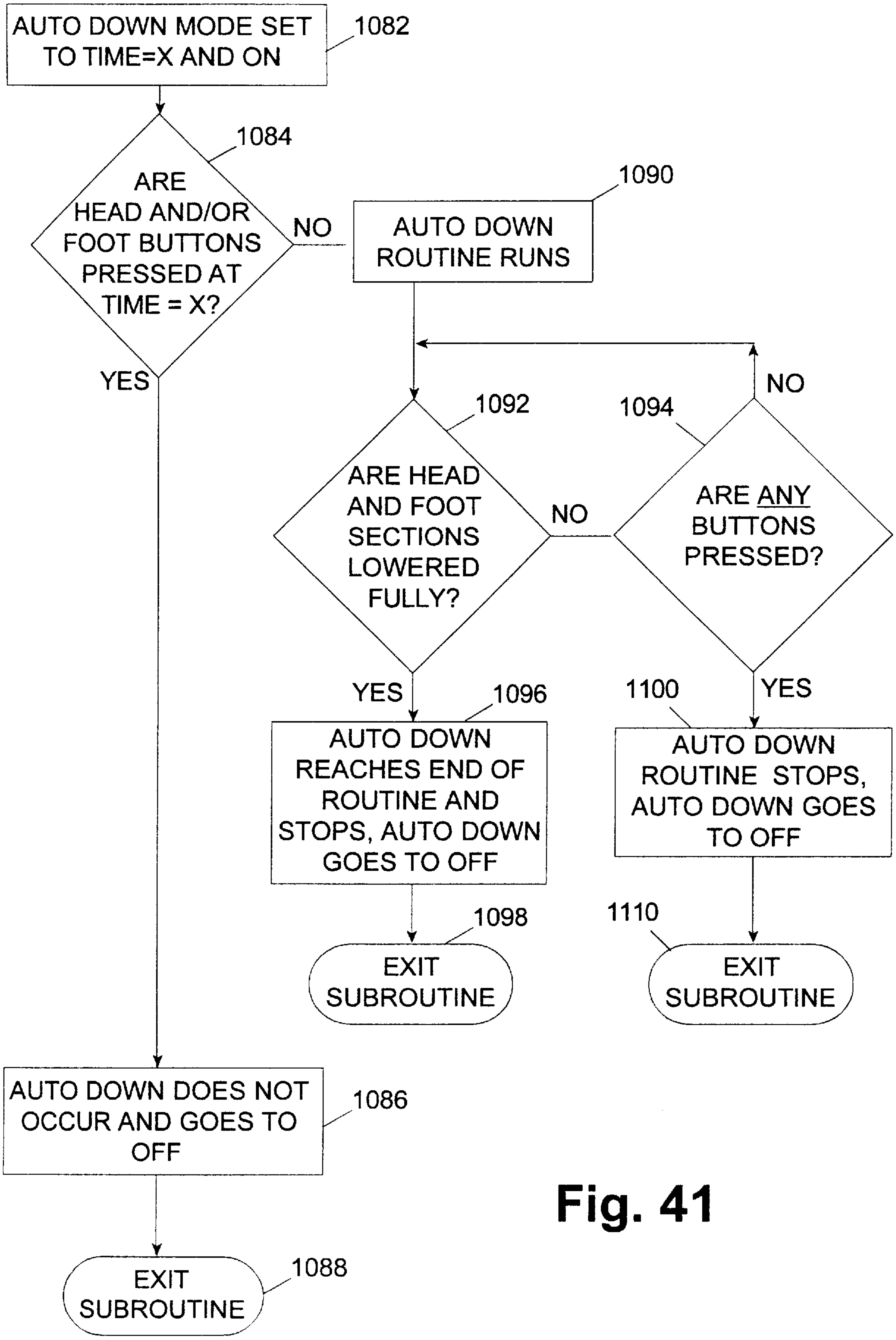
FIG. 41 is a flow chart showing the steps that are executed when the auto down function is set.

FIG. 41 is a flow chart showing the steps performed by microprocessor 88 when the auto down function is set to occur during the auto down subroutine of FIGS. 40*a*, 40*b*, 40*c*. When time-of-day 324 matches the auto down time and the auto down function is on, as indicated at block 1082, microprocessor 88 determines at block 1084 whether any of articulation buttons 276, 278, 280, 282, 284, 286 are pressed at the auto down time. If microprocessor 88 determines at block 1084 that any of buttons 276, 278, 280, 282, 284, 286 are pressed at the auto down time, the auto down function does not occur and microprocessor 88 turns the auto down function off, as indicated at block 1086, and then microprocessor 88 exits the FIG. 41 subroutine, as indicated at block 1088.

If microprocessor 88 determines at block 1084 that none of buttons 276, 278, 280, 282, 284, 286 are pressed at the auto down time, then microprocessor executes an auto down routine (not shown) as indicated at block 1090. As microprocessor 88 executes the auto down routine, articulation motors 60, 61 are operated so as to move frame sections 91, 93, 94 to a substantially horizontal position. One application of the auto down mode of hand-held controller 50 is so that mattress 56 moves automatically to a horizontal sleeping position at a programmed time if a person on bed and mattress assembly 52 falls asleep while, for example, watching television with mattress 56 in a sitting-up position.

While the auto down routine is being executed, as indicated at block 1090, microprocessor 88 determines at block 1092 whether both frame sections 91, 93 are lowered fully and if not, microprocessor 88 determines at block 1094 whether any buttons are pressed. If microprocessor 88 determines at block 1094 that no buttons are pressed, microprocessor 88 loops back to block 1092 and continues to run the auto down routine. If microprocessor 88 determines at block 1092 that both frame sections 91, 93 are lowered filly, microprocessor 88 sends the appropriate signals so that motors 60, 61 stop and so that the auto down function is no longer set to occur, as indicated at block 1096, and then microprocessor 88 exits the FIG. 41 subroutine, as indicated at block 1098. If microprocessor 88 determines at block 1094 that any button of hand-held controller 50 is pressed, microprocessor 88 sends the appropriate signals so that motors 60, 61 stop and so that the auto down function is no longer set to occur, as indicated at block 1100, and then microprocessor 88 exits the FIG. 41 subroutine, as indicated at block 1110.

Figure 42:
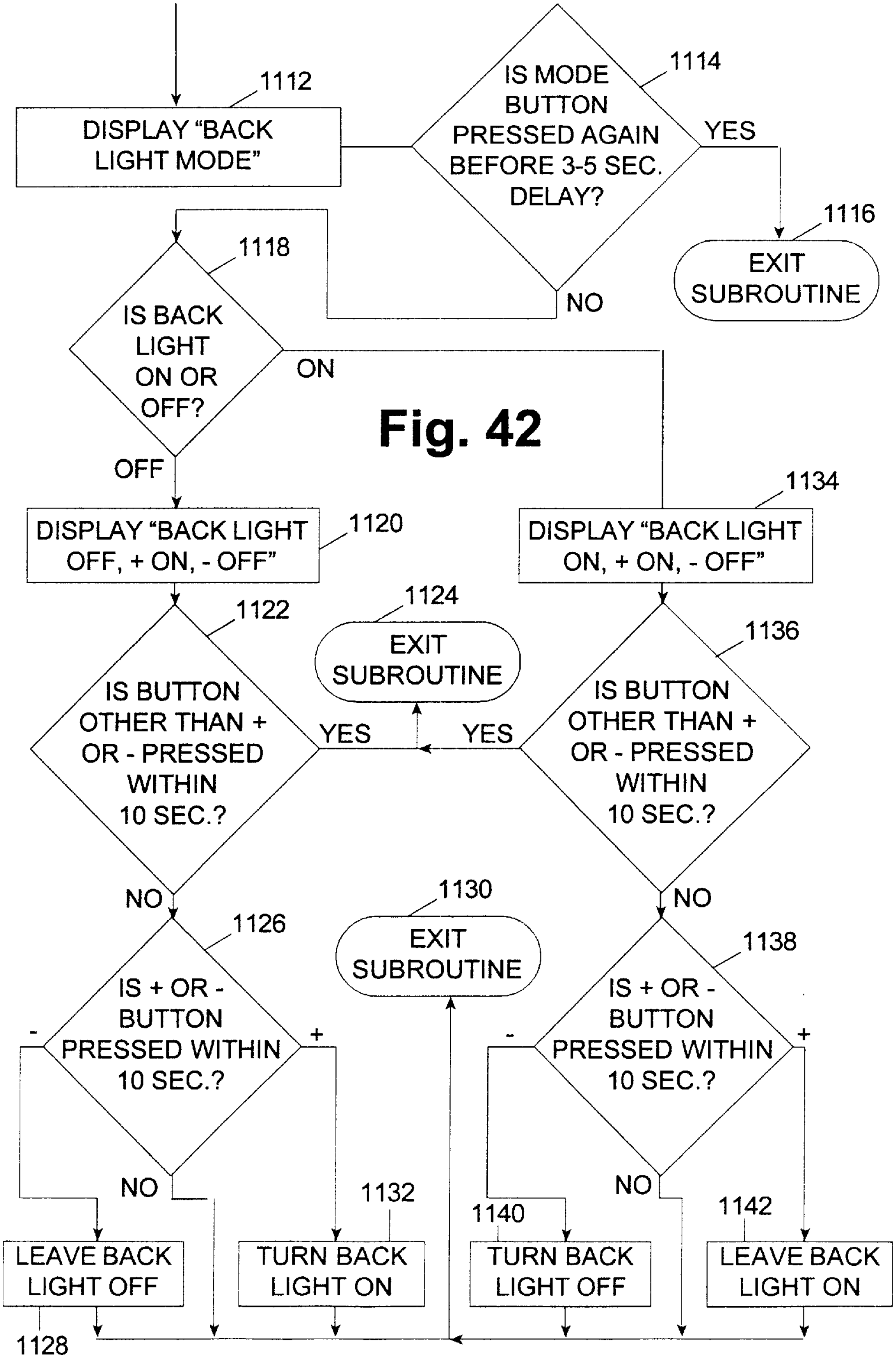
FIG. 42 is a flow chart showing the steps that are executed during a back light programming mode.

FIG. 42 is a flow chart of the steps performed by microprocessor 88 during a back light mode subroutine that runs when microprocessor 88 reaches block 900 of FIG. 36*b*. When microprocessor 88 reaches the back light mode subroutine, microprocessor 88 sends the appropriate signals so that a "BACK LIGHT MODE" message appears on display screen 86 as indicated at block 1112. After microprocessor 88 performs the steps associated with block 1112, microprocessor 88 then determines at block 1114 whether mode button 320 is pressed again before a three to five second delay and if so, microprocessor 88 exits the back light mode subroutine as indicated at block 1116.

If microprocessor 88 determines at block 1114 that mode button 320 is not pressed again before the three to five second delay, microprocessor 88 then determines at block 1118 whether a back light, which illuminates the buttons of handheld-controller 50, is currently on or off. If microprocessor 88 determines at block 1118 that the back light is off, microprocessor 88 displays a "BACK LIGHT OFF, +ON, −OFF" message on display screen 86 as indicated at block 1120. After microprocessor 88 performs the steps associated with block 1120, microprocessor 88 then determines at block 1122 whether any button other than button 312 is pressed within a ten second period and if so, microprocessor 88 exits the back light mode subroutine as indicated at block 1124.

If microprocessor 88 determines at block 1122 that no button other than button 312 is pressed, microprocessor 88 then determines at block 1126 whether plus side 314 of button 312 is pressed, whether minus side 316 of button 312 is pressed, or whether neither of sides 314, 316 of button 312 are pressed. If microprocessor 88 determines at block 1126 that minus side 316 of button 312 is pressed, microprocessor 88 sends the appropriate signals to leave the back light off, as indicated at block 1128, and then microprocessor 88 exits the back light mode subroutine as indicated at block 1130. If microprocessor 88 determines at block 1126 that plus side 314 of button 312 is pressed, microprocessor 88 sends the appropriate signals to turn the back light on, as indicated at block 1132, and then microprocessor 88 exits the back light mode subroutine as indicated at block 1130. If microprocessor 88 determines at block 1126 that neither side 314, 316 of button 312 is pressed, microprocessor 88 exits the back light mode subroutine as indicated at block 1130.

If microprocessor 88 determines at block 1118 that the back light is on, microprocessor 88 displays a "BACK LIGHT ON, +ON, −OFF" message on display screen 86 as indicated at block 1134. After microprocessor 88 performs the steps associated with block 1134, microprocessor 88 then determines at block 1136 whether any button other than button 312 is pressed within a ten second period and if so, microprocessor 88 exits the back light mode subroutine as indicated at block 1124.

If microprocessor 88 determines at block 1136 that no button other than button 312 is pressed, microprocessor 88 then determines at block 1138 whether plus side 314 of button 312 is pressed, whether minus side 316 of button 312 is pressed, or whether neither of sides 314, 316 of button 312 are pressed. If microprocessor 88 determines at block 1138 that minus side 316 of button 312 is pressed, microprocessor 88 sends the appropriate signals to turn the back light off, as indicated at block 1140, and then microprocessor 88 exits the back light mode subroutine as indicated at block 1130. If microprocessor 88 determines at block 1138 that plus side 314 of button 312 is pressed, microprocessor 88 sends the appropriate signals to leave the back light on, as indicated at block 1142, and then microprocessor 88 exits the back light mode subroutine as indicated at block 1130. If microprocessor 88 determines at block 1138 that neither side 314, 316 of button 312 is pressed, microprocessor 88 exits the back light mode subroutine as indicated at block 1130.

Although hand-held controller 50 has been described in detail above as being operable to control and program, for example, the manner in which motors 60, 61 of bed and mattress assembly 52 operate and the manner in which massage motors 70, 72 operate, it is within the scope of the invention as presently perceived for a handheld controller, similar to hand-held controller 50, to be provided with additional buttons that are engageable to program other functions of the associated bed and mattress assembly. For example, alternative embodiment bed and mattress assemblies may include a heater (not shown) that is either built into or supported atop an associated mattress. In one such alternative embodiment, the heater may be provided with separate zones that are controllable with the associated hand-held controller. In addition, one or more of the separate heater zones may be programmed to heat up to a preprogrammed heater level at a preprogrammed time.

In an illustrated embodiment of hand-held controller 50, display screen 86 is a Power Tip (Okaya), model no. PG9832LRS-ANN-B LCD, although any type of display having the capability of adequately displaying the desired information could be used. Display screen 86 provides both alpha numeric and graphical images for displaying information related to the particular function of the bed that is currently active. In addition, the display screen 86 is used to display prompts and other instructions to permit a user to program various features of the bed as discussed above. Illustratively, display screen 86 includes a 98×32 array of pixels. This pixel array permits the display of numbers, letters, and graphical information or figures related to features of the bed such as shown, for example, in FIGS. 6–9, 16–18, 24–26, and 29. It is understood that a different size array of pixels may be used in accordance with the display screen 86 of the present invention. This improved display screen 86 for providing both alpha numeric and graphical images is an improvement over known displays on hand-held controllers such as shown in U.S. Pat. No. 5,509,154 which includes only a liquid crystal display for providing two digits ranging from 0 to 9 and a half digit that can be only a 1 or unilluminated.

In addition, although hand-held controller 50 is illustrated as a "wired" remote control, it is within the scope of the invention as presently perceived for hand-held controller 50 to be a "wireless" remote control having components such as a transmitter, a receiver, and/or a transceiver associated therewith for signal communication. Other features of hand-held controller 50 and bed and mattress assembly 52, as well as alternative embodiments, are described in detail in U.S. Provisional Patent Application, Serial No. 60/075,085, entitled Liquid Crystal Display Hand Controller, to which this application claims priority, and the subject matter of which is hereby incorporated by reference herein.

Although the invention has been described in detail with reference to certain preferred embodiments, variations and modifications exist within the scope and spirit of the invention as described and defined in the following claims.

We claim:

1. A hand-held controller for controlling at least one function of a bed and mattress assembly, the hand-held controller comprising:

a button engageable to control the at least one function of the bed and mattress assembly, and a display configured to provide feedback to a user regarding the at least one function, the display simultaneously displaying a graphical image and numerical data when the button is engaged.

2. The hand-held controller of claim 1, wherein the display defaults to a clock displaying a time-of-day when the button is disengaged.

3. The hand-held controller of claim 2, further comprising a casing to which the button and the display are coupled and a stand coupled to the casing, the stand being moveable between a first position in which the stand is adjacent to the casing and a second position in which at least a portion of the stand is spaced apart from the casing, and the stand cooperating with the casing to support the display at an angle that facilitates observing the clock when the stand is in the second position.

4. The hand-held controller of claim 1, wherein the graphical image includes an icon representing articulating sections of the bed and mattress assembly.

5. The hand-held controller of claim 4, wherein the numerical data includes a first number that correlates to a first angular position of a first section of the bed and mattress assembly.

6. The hand-held controller of claim 5, wherein the numerical data includes a second number that correlates to a second angular position of a second section of the bed and mattress assembly.

7. The hand-held controller of claim 5, wherein the first number ranges between zero and one hundred.

8. The hand-held controller of claim 4, wherein the graphical image further includes a first bar graph that correlates to a first angular position of a first section of the bed and mattress assembly.

9. The hand-held controller of claim 8, wherein the graphical image further includes a second bar graph that correlates to a second angular position of a second section of the bed and mattress assembly.

10. The hand-held controller of claim 8, wherein the first bar graph includes ten vertically spaced bars.

11. The hand-held controller of claim 4, wherein the graphical image further includes one of a first up arrow that indicates raising of a first section of the bed and mattress assembly and a first down arrow that indicates lowering of the first section of the bed and mattress assembly.

12. The hand-held controller of claim 11, wherein the graphical image further includes one of a second up arrow that indicates raising of a second section of the bed and mattress assembly and a second down arrow that indicates lowering of the second section of the bed and mattress assembly.

13. The hand-held controller of claim 1, wherein the graphical image includes a set of icons representing inflatable zones of a mattress of the bed and mattress assembly.

14. The hand-held controller of claim 13, wherein the numerical data includes a first number that correlates to a first pneumatic pressure of a first zone of the inflatable zones.

15. The hand-held controller of claim 14, wherein the numerical data includes a second number that correlates to a second pneumatic pressure of a second zone of the inflatable zones.

16. The hand-held controller of claim 14, wherein the first number ranges between zero and one hundred.

17. The hand-held controller of claim 13, wherein each icon of the set of icons is a rectangle containing a bar graph representative of a pneumatic pressure of the respective inflatable zone.

18. The hand-held controller of claim 1, wherein the graphical image includes an icon representing a massage intensity at which a massage motor of the bed and mattress assembly operates.

19. The hand-held controller of claim 18, wherein the numerical data includes a number that correlates to the massage intensity.

20. The hand-held controller of claim 19, wherein the number ranges between zero and an upper limit including one of ten and one hundred.

21. The hand-held controller of claim 18, wherein the icon is substantially triangular and contains a bar graph representative of the massage intensity.

22. The hand-held controller of claim 1, wherein the graphical image includes a set of icons representing a wave intensity at which a set of vibratory motors of the bed and mattress assembly operate.

23. The hand-held controller of claim 22, wherein the numerical data includes a number that correlates to a wave speed of the set of vibratory motors.

24. The hand-held controller of claim 23, wherein each number of the set of numbers ranges between zero and an upper limit including one of ten and one hundred.

25. The hand-held controller of claim 22, wherein each icon of the set of icons is substantially triangular and contains a bar graph representative of the wave intensity of the respective vibratory motor of the set of vibratory motors.

26. The hand-held controller of claim 1, wherein the display includes an array of pixels to permit the display of both alpha numeric and graphical images.

27. The hand-held controller of claim 1, further comprising a casing to which the button and display are coupled and an indicia on the casing adjacent to the display, the indicia representing a programming option of the at least one function, and wherein the graphical image includes a programming icon adjacent to the indicia, the programming icon has an appearance that depends upon a status of the programming option of the at least one function.

28. The hand-held controller of claim 1, wherein the graphical image includes an icon representing zones of a heater coupled to a mattress of the bed and mattress assembly.

29. A hand-held controller for controlling at least one function of a bed and mattress assembly, the hand-held controller comprising:

a clock operating to keep track of time, at least one button engageable to program the at least one function of the bed and mattress assembly to occur at a programmed time, and a display configured to provide feedback to a user regarding the at least one function, the display simultaneously displaying a graphical image and numerical data related to the at least one function when the at least one function occurs.

30. The hand-held controller of claim 29, wherein the at least one function includes vibrating at least a portion of the bed and mattress assembly.

31. The hand-held controller of claim 29, wherein the at least one function includes producing a wave-effect motion between a head end and a foot end of the bed and mattress assembly.

32. The hand-held controller of claim 29, wherein the at least one function includes articulating a section of the bed and mattress assembly between first and second positions.

33. The hand-held controller of claim 29, wherein the at least one function includes heating at least a portion of the bed and mattress assembly.

34. The hand-controller of claim 29, further comprising a display that displays the time.

35. A hand-held controller for controlling at least one function of a bed and mattress assembly, the hand-held controller comprising:

a button engageable to control the at least one function of the bed and mattress assembly, and a display configured to provide feedback to a user regarding the at least one function, the display displaying a graphical image when the button is engaged.

36. The hand-held controller of claim 35, wherein the display defaults to a clock displaying a time-of-day when the button is disengaged.

37. The hand-held controller of claim 35, wherein the graphical image includes an icon representing articulating sections of the bed and mattress assembly.

38. The hand-held controller of claim 37, wherein the graphical image further includes a bar graph that correlates to an angular position of one of the articulating sections of the bed and mattress assembly.

39. The hand-held controller of claim 37, wherein the graphical image further includes an arrow that indicates directional movement of one of the articulating sections of the bed and mattress assembly.

40. The hand-held controller of claim 35, wherein the graphical image includes an icon representing inflatable zones of a mattress of the bed and mattress assembly.

41. The hand-held controller of claim 40, wherein the graphical image further includes a bar graph representative of a pneumatic pressure within one of the respective inflatable zones.

42. The hand-held controller of claim 35, wherein the graphical image includes an icon representing a massage intensity at which a massage motor of the bed and mattress assembly operates.

43. The hand-held controller of claim 42, wherein the graphical image further includes a bar graph representative of the massage intensity.

44. The hand-held controller of claim 35, wherein the graphical image includes an icon representing zones of a heater coupled to a mattress of the bed and mattress assembly.

45. The hand-held controller of claim 35, wherein the display is configured to display numerical data simultaneously with the graphical image.

46. The hand-held controller of claim 45, wherein the numerical data correlates to an angular position of an articulating section of the bed and mattress assembly.

47. The hand-held controller of claim 45, wherein the numerical data correlates to a pneumatic pressure of an inflatable zone of a mattress of the bed and mattress assembly.

48. The hand-held controller of claim 45, wherein the numerical data includes a number that correlates to an intensity at which a massage motor of the bed and mattress assembly operates to vibrate a section of the bed and mattress assembly.

49. The hand-held controller of claim 45, wherein the numerical data correlates to a wave intensity at which a set of vibratory motors operate to alternately vibrate respective sections of the bed and mattress assembly.

50. The hand-held controller of claim 45, wherein the numerical data correlates to a speed with which a set of vibratory motors operate to alternately vibrate respective sections of the bed and mattress assembly.

51. The hand-held controller of claim 35, wherein the display includes an array of pixels to permit the display of both alpha numeric and graphical images.

* * * * *